Nov. 10, 1959          C. E. LOMAX          2,912,505

MULTI-OFFICE METERING TELEPHONE SYSTEM

Original Filed May 23, 1955          20 Sheets-Sheet 1

INVENTOR.
CLARENCE E. LOMAX
BY
ATTY.

Nov. 10, 1959  C. E. LOMAX  2,912,505
MULTI-OFFICE METERING TELEPHONE SYSTEM
Original Filed May 23, 1955  20 Sheets-Sheet 2
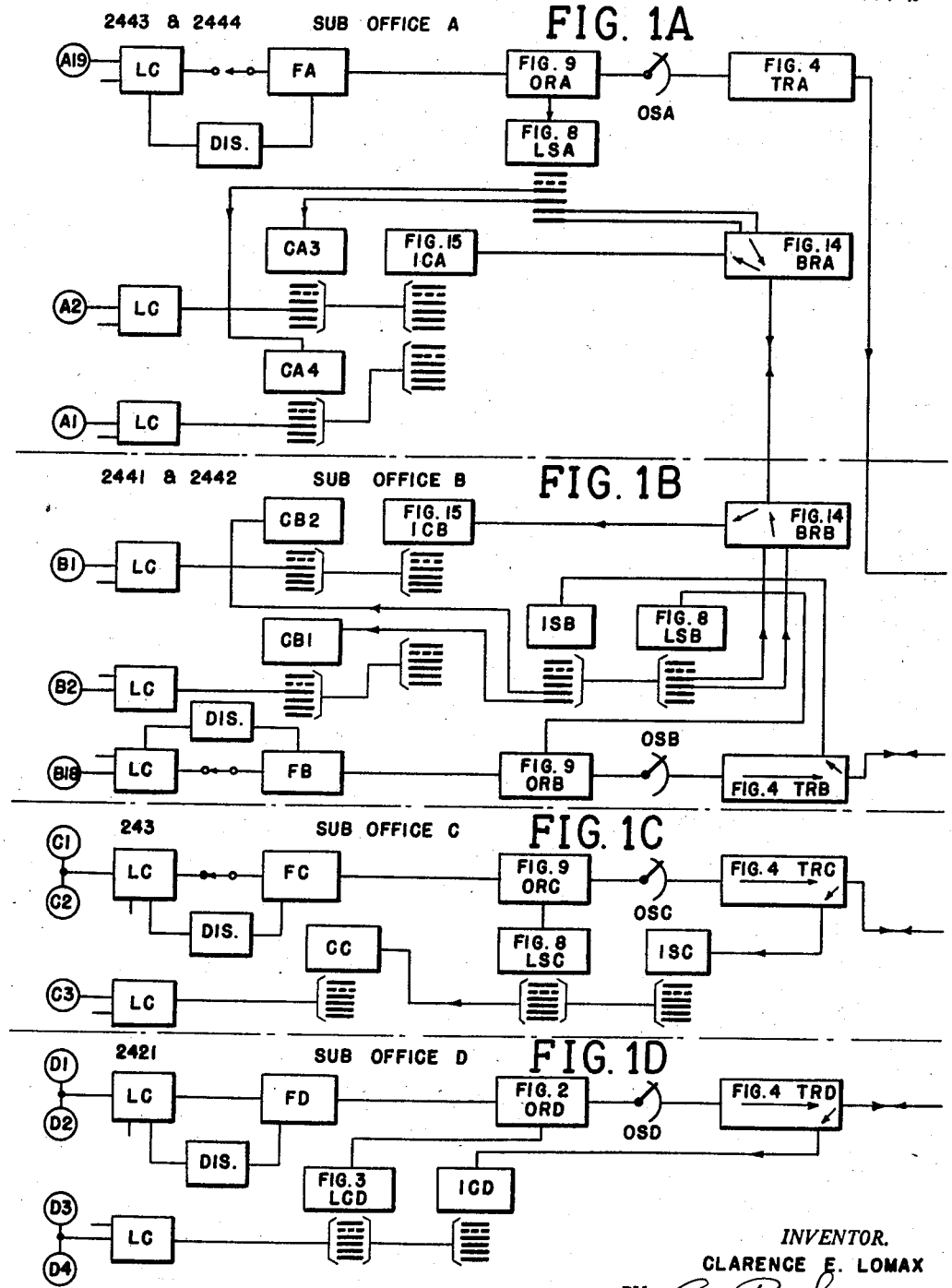
INVENTOR.
CLARENCE E. LOMAX
BY
ATTY.

Nov. 10, 1959 C. E. LOMAX 2,912,505
MULTI-OFFICE METERING TELEPHONE SYSTEM
Original Filed May 23, 1955 20 Sheets-Sheet 3

INVENTOR.
CLARENCE E. LOMAX
BY C. R. Sipe
ATTY.

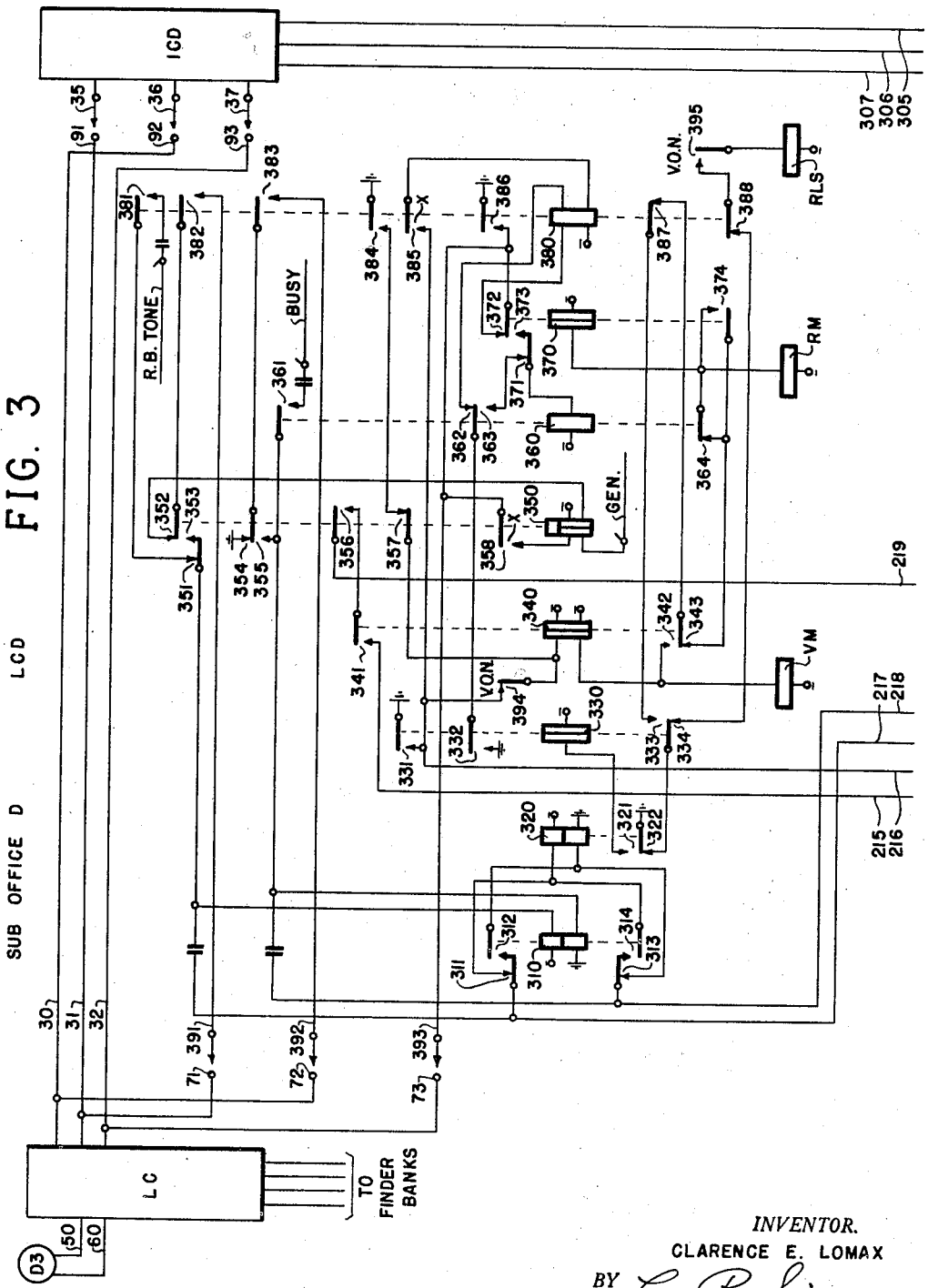

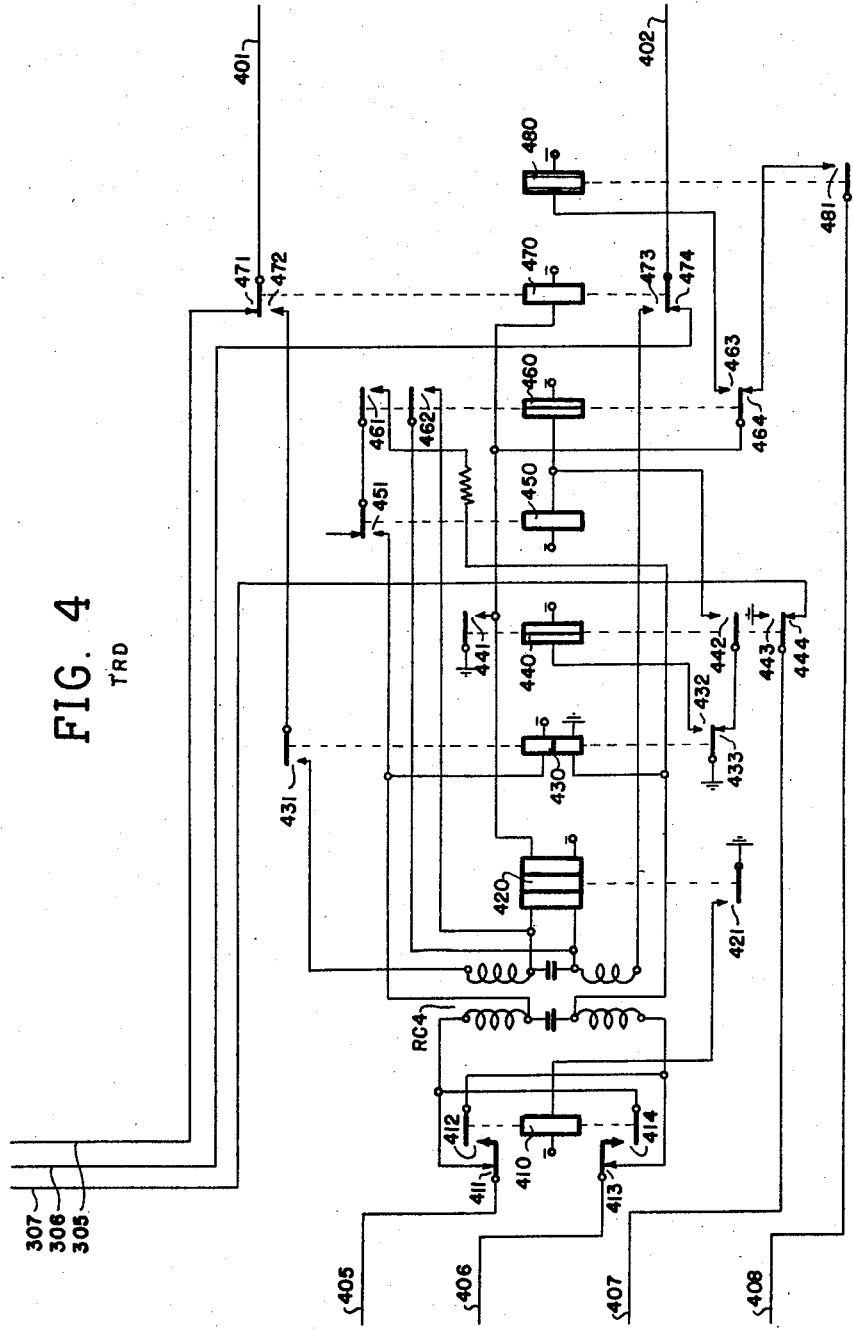

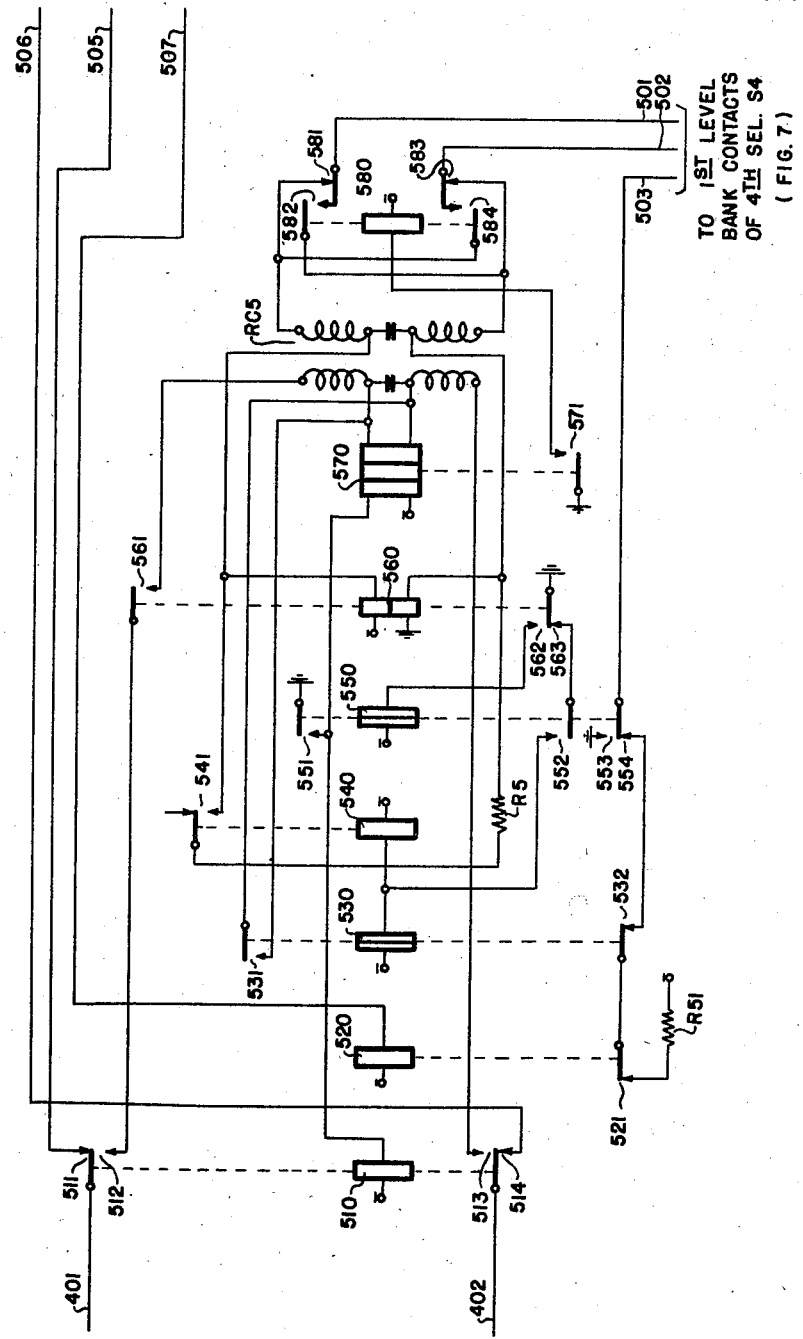

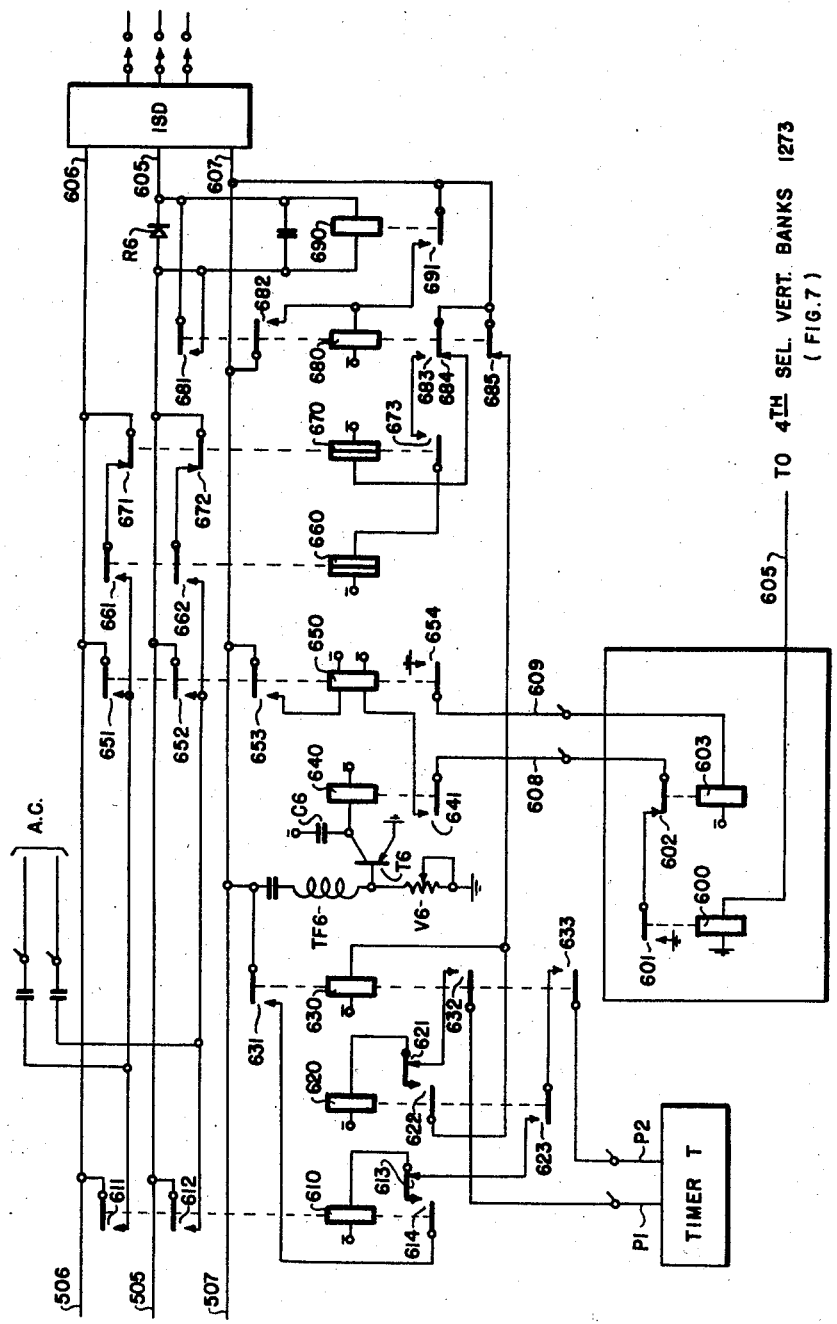

Nov. 10, 1959  C. E. LOMAX  2,912,505
MULTI-OFFICE METERING TELEPHONE SYSTEM
Original Filed May 23, 1955  20 Sheets-Sheet 8

INVENTOR.
CLARENCE E. LOMAX
BY
ATTY.

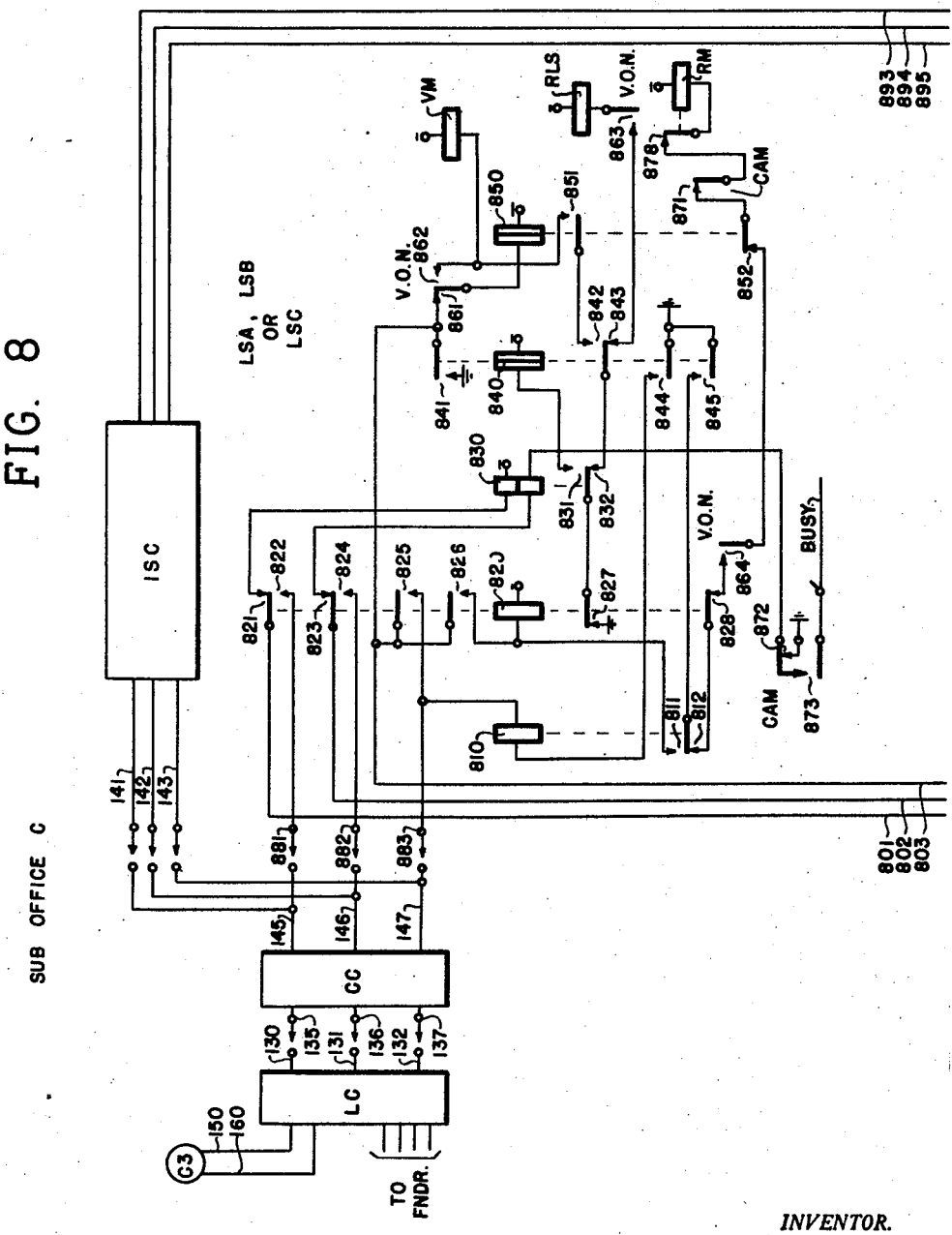

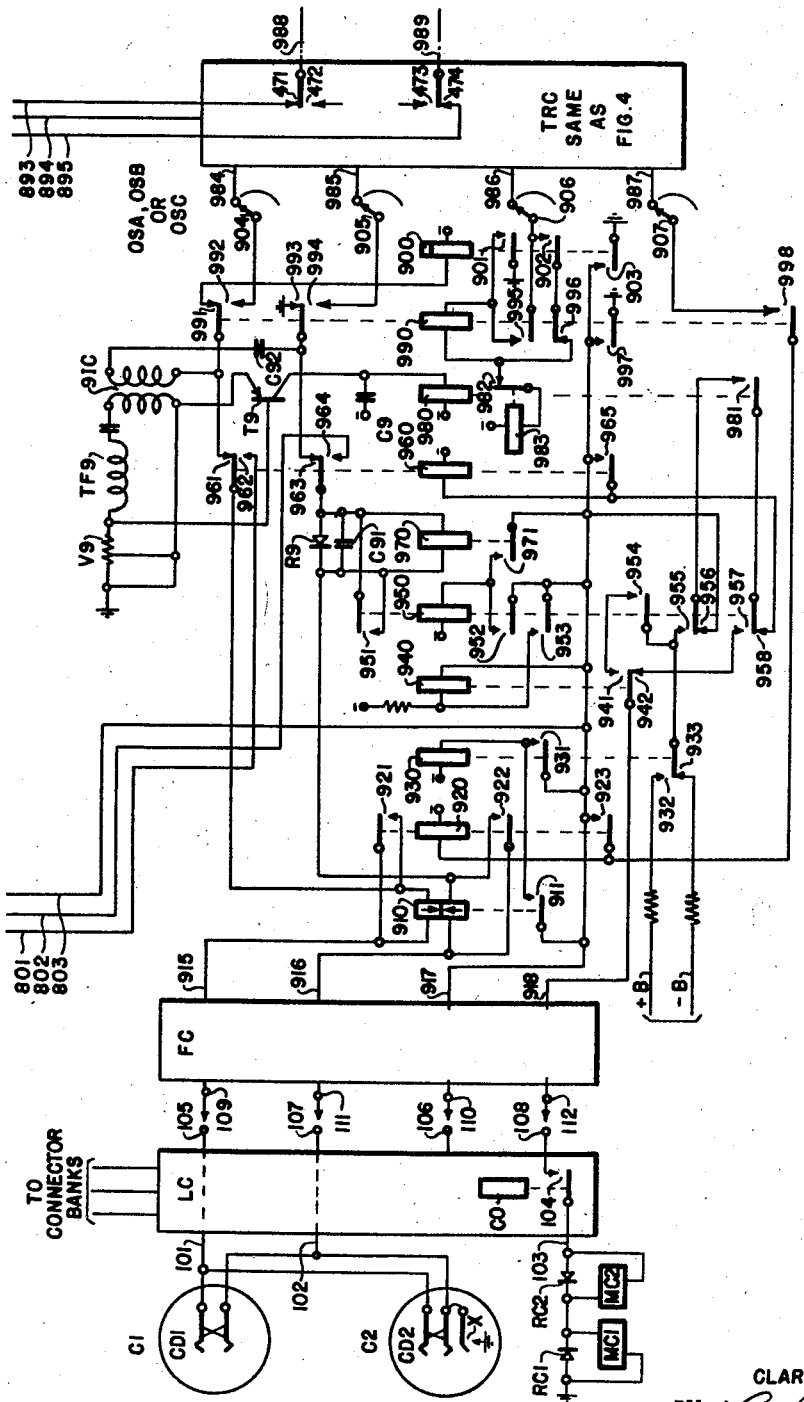

Nov. 10, 1959
C. E. LOMAX
2,912,505
MULTI-OFFICE METERING TELEPHONE SYSTEM
Original Filed May 23, 1955
20 Sheets-Sheet 11
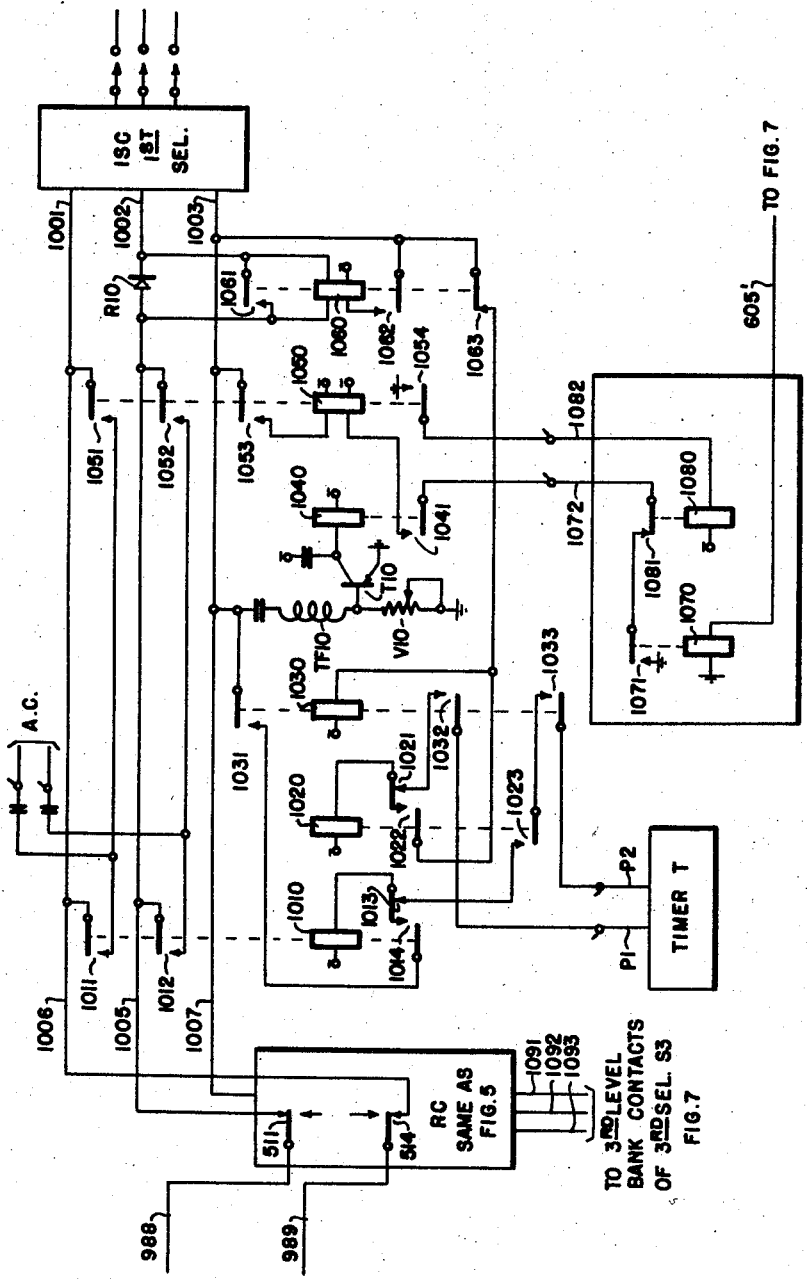
INVENTOR.
CLARENCE E. LOMAX
BY
ATTY.

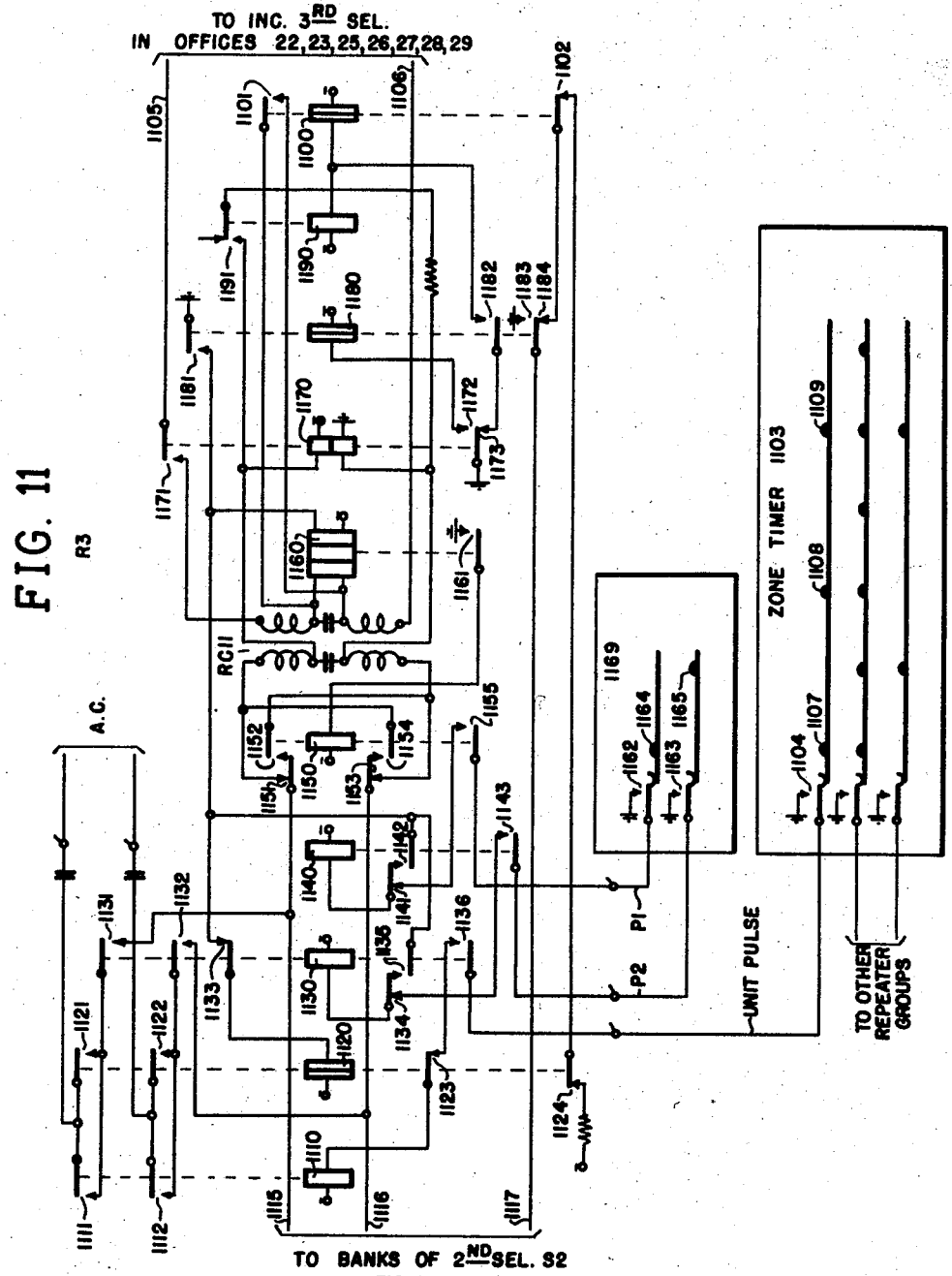

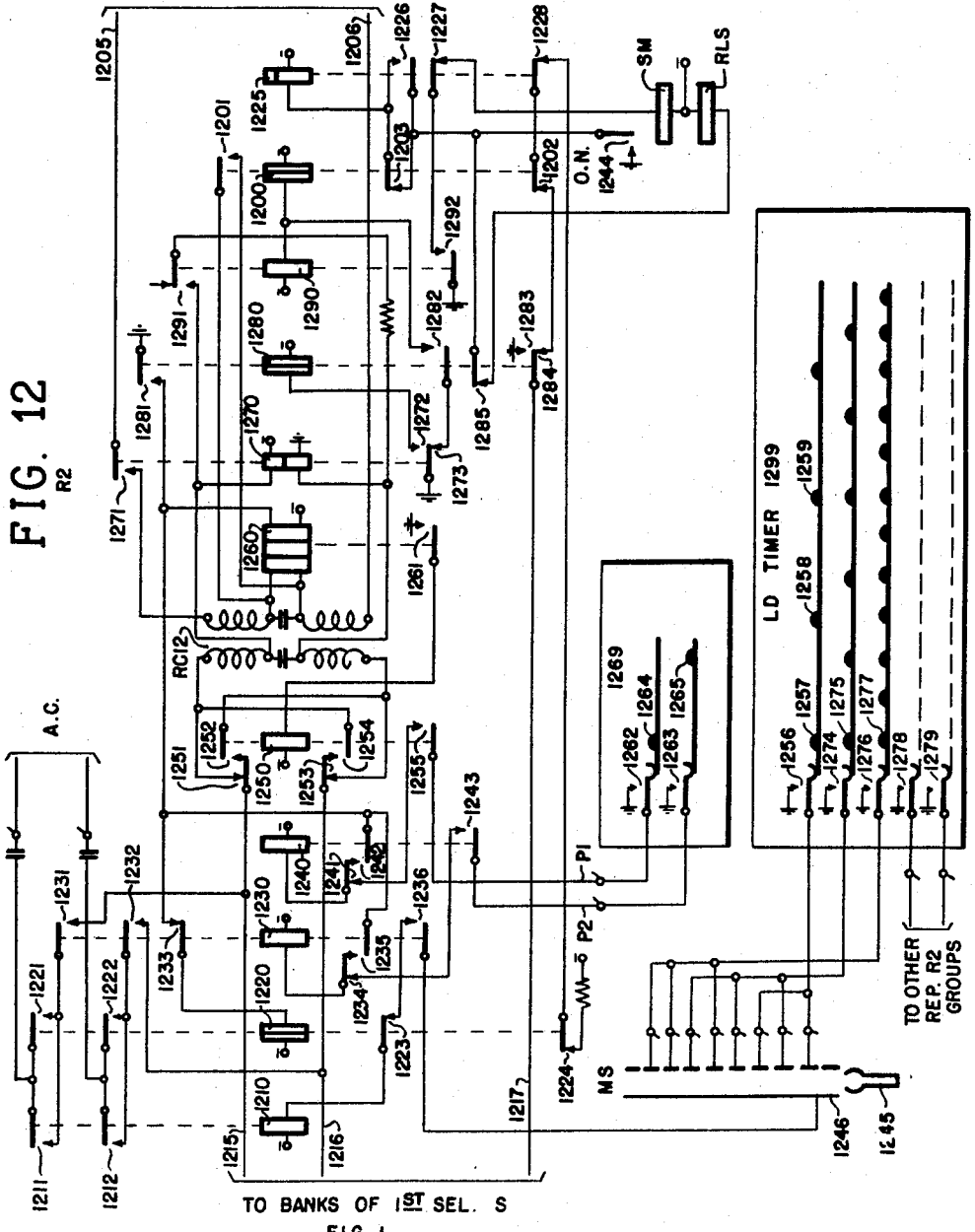

Nov. 10, 1959 C. E. LOMAX 2,912,505
MULTI-OFFICE METERING TELEPHONE SYSTEM
Original Filed May 23, 1955 20 Sheets-Sheet 14

INVENTOR.
CLARENCE E. LOMAX
BY
ATTY.

Nov. 10, 1959  C. E. LOMAX  2,912,505
MULTI-OFFICE METERING TELEPHONE SYSTEM
Original Filed May 23, 1955  20 Sheets—Sheet 16

INVENTOR.
CLARENCE E. LOMAX
BY
ATTY.

Nov. 10, 1959 C. E. LOMAX 2,912,505
MULTI-OFFICE METERING TELEPHONE SYSTEM
Original Filed May 23, 1955 20 Sheets-Sheet 18

INVENTOR.
CLARENCE E. LOMAX
BY
ATTY.

Nov. 10, 1959

C. E. LOMAX 2,912,505

MULTI-OFFICE METERING TELEPHONE SYSTEM

Original Filed May 23, 1955

*INVENTOR.*
CLARENCE E. LOMAX

BY

ATTY.

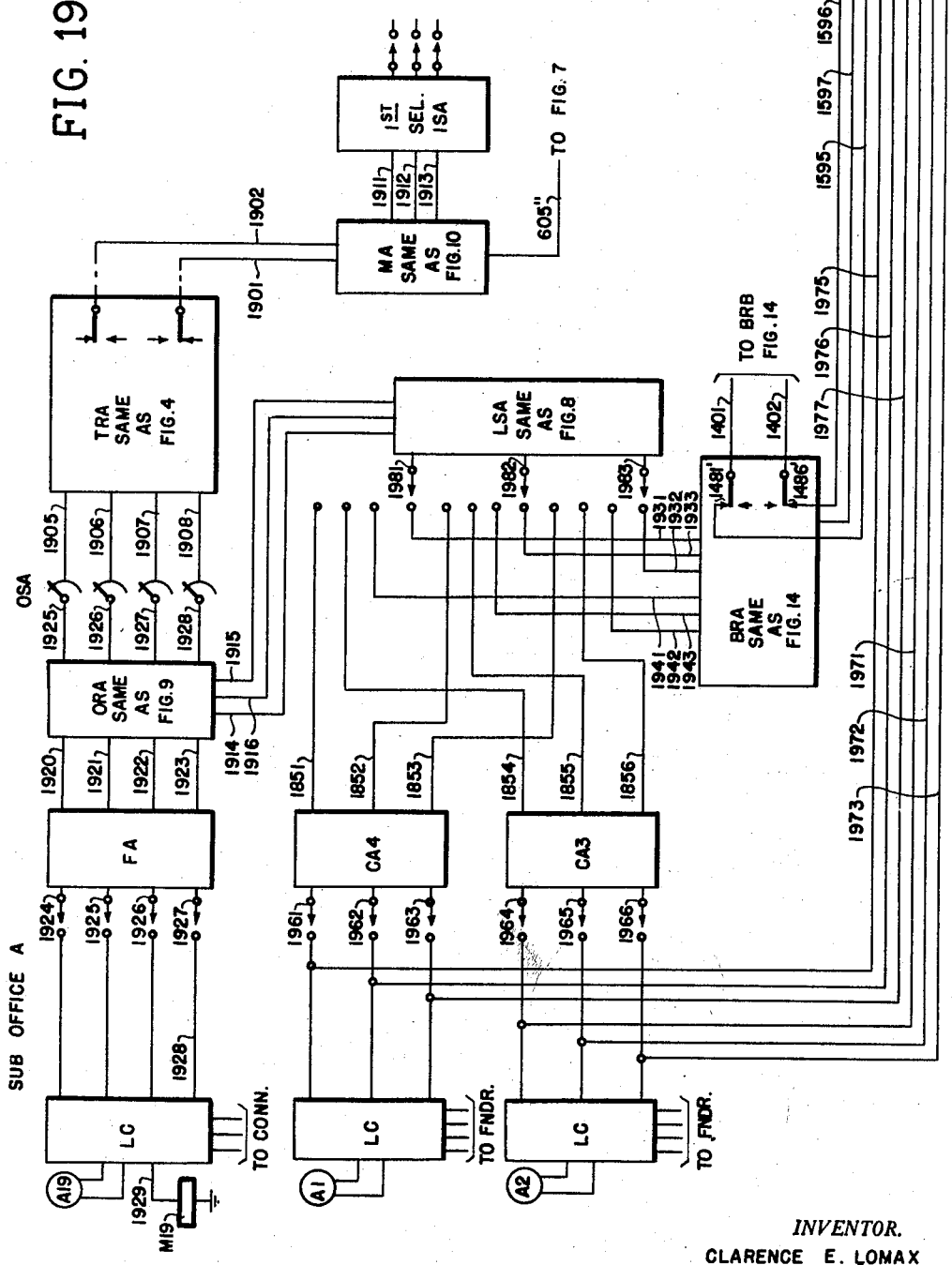

United States Patent Office 2,912,505
Patented Nov. 10, 1959

2,912,505

MULTI-OFFICE METERING TELEPHONE SYSTEM

Clarence E. Lomax, Chicago, Ill., assignor to General Telephone Laboratories, Incorporated, Chicago, Ill., a corporation of Delaware Original application May 23, 1955, Serial No. 510,081. Divided and this application February 13, 1957, Serial No. 639,875

15 Claims. (Cl. 179—7.1)

The present invention relates in general to automatic telephone systems of the multi-office type, but is more particularly concerned with systems in which the main, or parent offices of the system have several smaller offices subsidiary to them, the latter being commonly known as sub-offices; and the main object of the invention is the provision of improved trunking arrangements, switching apparatus and novel circuit arrangements in the parent and their sub-offices to reduce the cost as well as improve the service in a universal numbering arrangement for a multi-office system.

This application is a division of the copending application of Clarence E. Lomax, Serial No. 510,081, filed May 23, 1955.

In this system the sub-offices have only sufficient switches for completing local calls and have their first numerical switches located in their parent offices. All calls originating from a sub-office are initially routed to its first numerical switches in its parent office after which numerical parent office switches are operated by the calling subscriber to partially or completely extend the connection to the called line. Local calls between subscriber lines in the same sub-office are switched over and completed locallly within the calling sub-office and the parent office switches are released after they have been operated to positions indicating that the call is intended for a called line in the calling sub-office. Calls between subscriber lines in one sub-office to subscriber lines in an adjacent sub-office are switched over locally in the calling sub-office to release the operated parent office switches in response to being operated to positions indicating that the called line is in either adjacent sub-office after which the calls are completed over direct trunks between the adjacent sub-offices.

It is an object of the present invention to provide in a system of the character described an improved signalling current receiving means in the sub-offices which become operative in response to the receipt of the special signalling current transmitted from the parent office to control the local switch-over or to control the operation of the calling subscriber's meter dependent upon the time said special signalling current is transmitted during or after the extension of a call to a called line and after the called party answers.

A further feature of the invention relates to improved metering arrangements in a completed connection to a called line comprising a first means for transmitting a pulse of high frequency signalling current to operate the calling subscriber meter for a first unit charge when the called subscriber answers, a second means subsequently operated immediately after said first unit charge for transmitting a pulse of high frequency current to operate the meter for a second unit charge, and a third means thereafter periodically operated for transmitting periodic high frequency signalling current pulses to periodically operate the meter in accordance with the zone of the called subscriber.

A still further feature relates to the provision of a timing arrangement which is effective to transmit the same high frequency signalling current, which controls the meter operations after the called party answers on completed calls, back towards the calling line to cause the release of the connection extended to the called line in case the called party fails to answer within a predetermined time after the initiation of such a call.

The foregoing objects and features together with others not specifically mentioned will be described in detail in connection with the detail description of the equipment and the drawings.

Referring now to the drawings

Figs. 1, 1A, 1B, 1C, and 1D show in schematic form part of the apparatus and trunking arrangements of one of the parent offices and its individual sub-offices and part of the apparatus and trunk connections to other parent offices in the system.

Fig. 2 diagrammatically shows a calling subscriber line and its individual line circuit LC, a well-known finder FD, an outgoing repeater circuit ORD, and an outgoing secondary switch located in the sub-office D.

Fig. 3 shows a called subscriber line and its individual line circuit LC, a local connector switch LCD and an incoming switch ICD located in the sub-office D.

Fig. 4 shows a trunk repeater TRD in a sub-office D which is connected to the banks of the outgoing secondary switch OSD and to the trunk extending to the parent office. Similar trunk repeaters are also provided in each sub-office as indicated by reference characters TRA, TRB and TRC.

Fig. 5 shows a trunk repeater RD in the parent office 24 which is connected to trunk repeater TRD over the trunk interconnecting the sub-office D to its parent office 24 and which repeater is accessible from the first level bank contacts of fourth selector S4 in the parent office. Similar trunk repeaters, such as repeaters RB and RC, are also provided for the other sub-offices.

Fig. 6 shows a metering circuit MD which is individual to sub-office D and is connected to the trunk repeater RD and to the incoming first selector switch ISD in the parent office 24.

Fig. 7 shows two similar intermediate selectors in the parent office, one of which is shown in detail and is a third selector while the other shown schematically is a fourth selector. These selectors have access over different levels to the repeater circuits terminating the different sub-office trunks and to other switches in the parent office.

Fig. 8 shows a called subscriber line and its individual line circuit LC, a connector switch CC, an incoming selector ISC and a local selector LSC; the local selector being shown in detail. Similar equipment is provided in sub-offices A and B as shown in Figs. 1A and 1B.

Fig. 9 shows a calling subscriber line and its individual line circuit LC, a finder FC, an outgoing repeater ORC in detail, an outgoing secondary switch OSC, and a trunk repeater TRC.

Fig. 10 shows a trunk repeater RC, a metering circuit MC in detail, and an incoming first selector ISC in the parent office. The trunk repeater RC is connected over the sub-office trunk to trunk repeater TRC in sub-office C, to the third level bank contacts of selector S3, and to to the metering circuit MC.

Fig. 11 shows repeater R3 in detail and these repeaters are accessible from the banks of second selector switches and are connected by trunk lines to all the other parent offices in the same section as illustrated in Fig. 1.

Fig. 12 shows repeater R2 in detail and these repeaters are accessible from the banks of the first selectors and are connected to parent offices acting as tandem offices in sections other than the section of the instant parent office as illustrated in Fig. 1.

Figure 14:
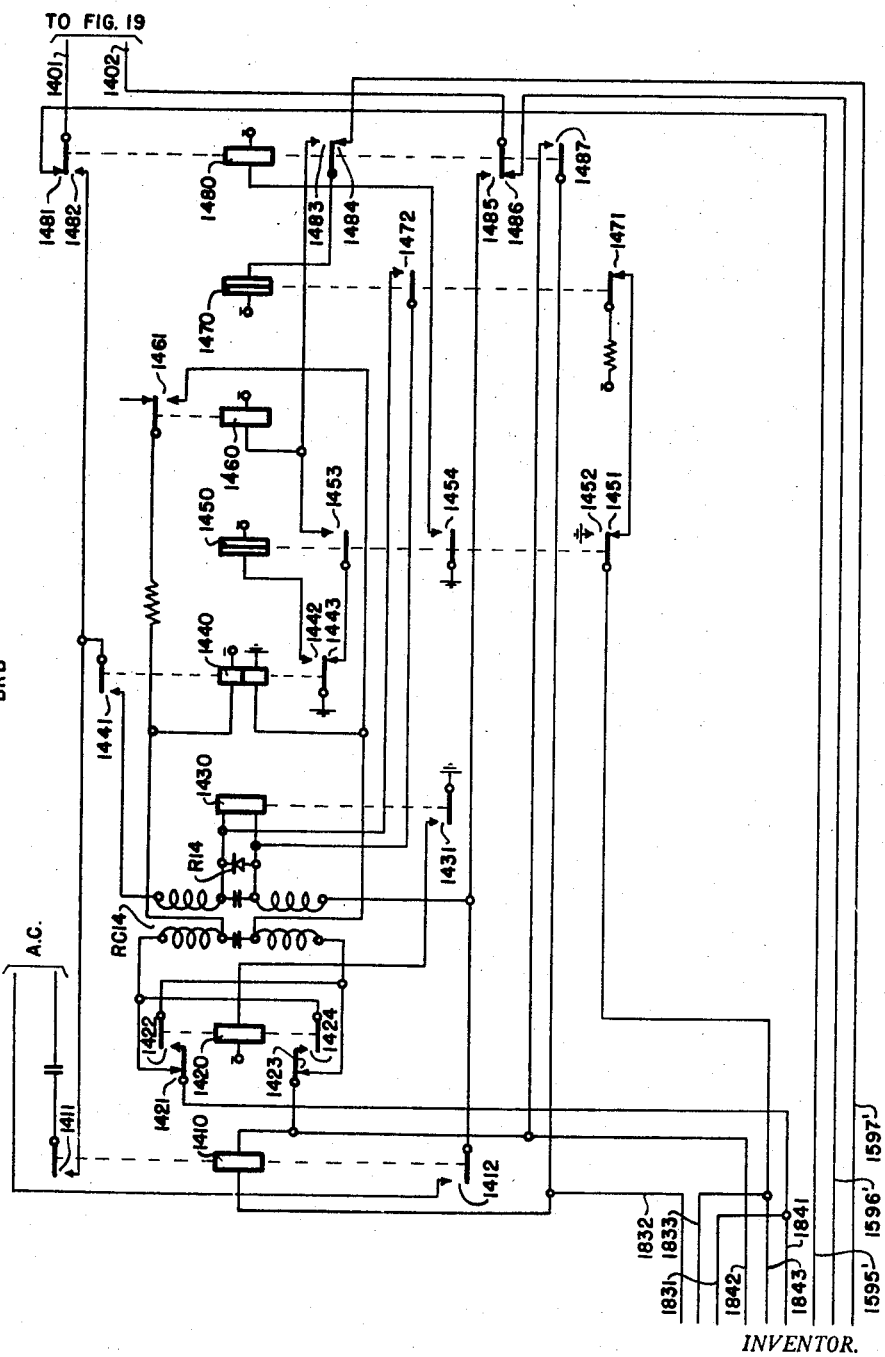

Fig. 14 shows a bi-level repeater BRB in detail in sub-office B which has two means of access from different levels of the incoming selector ISB and local selector LSB as shown in Fig. 18. The bi-level repeater BRB is connected to the incoming connector switch ICB and to the direct trunk interconnecting sub-office B to sub-office A. A similar bi-level repeater BRA terminates the other end of this direct trunk in sub-office A and is connected to the incoming connector ICA. The bi-level repeater BRA also has two means of access from different selector levels of the local selector LSA.

Figure 15:
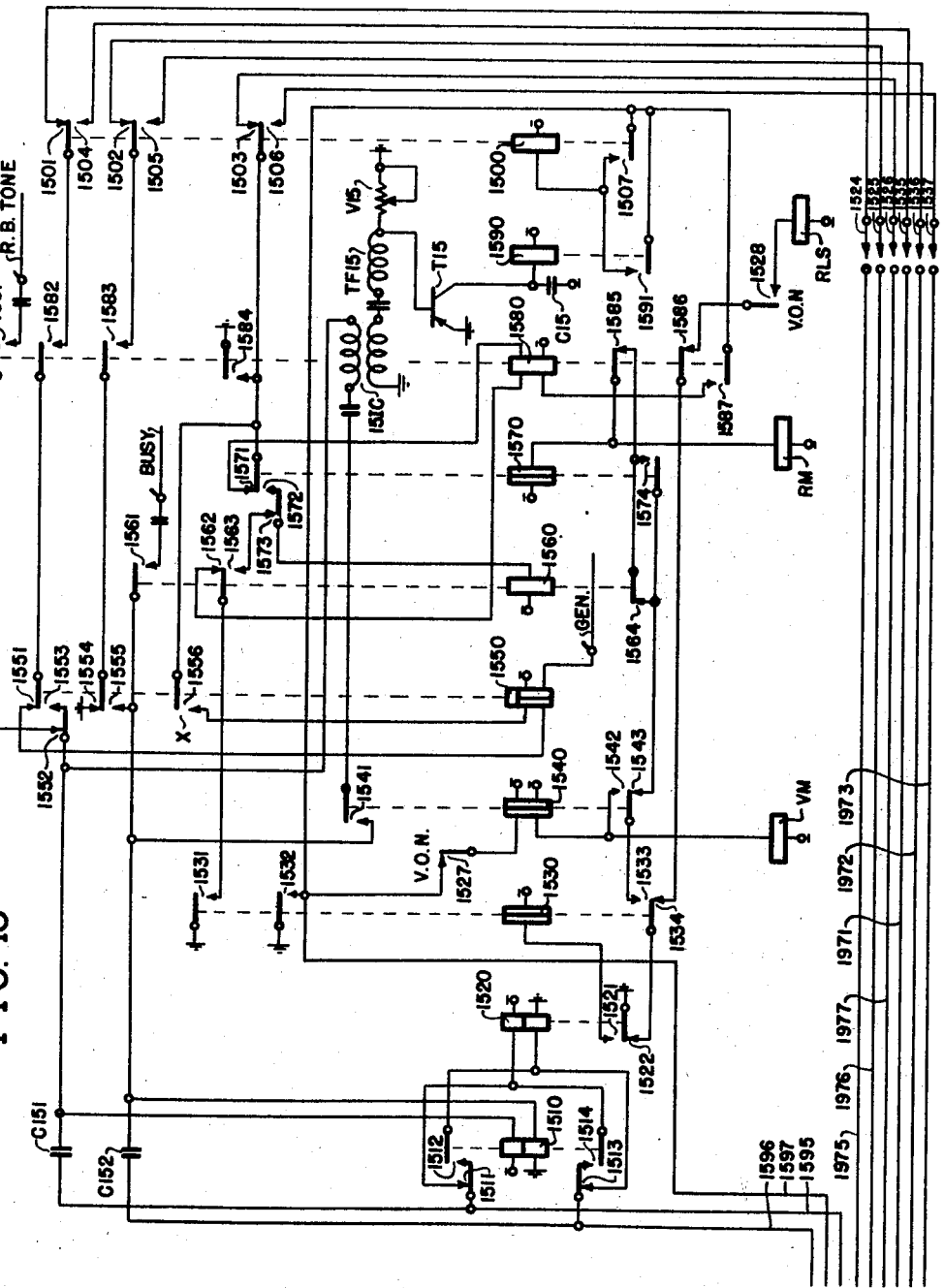

Fig. 15 shows the detail circuits of the incoming connector ICA in sub-office A. A similar connector ICB is provided in sub-office B as illustrated in Fig. 1B.

Figure 16:
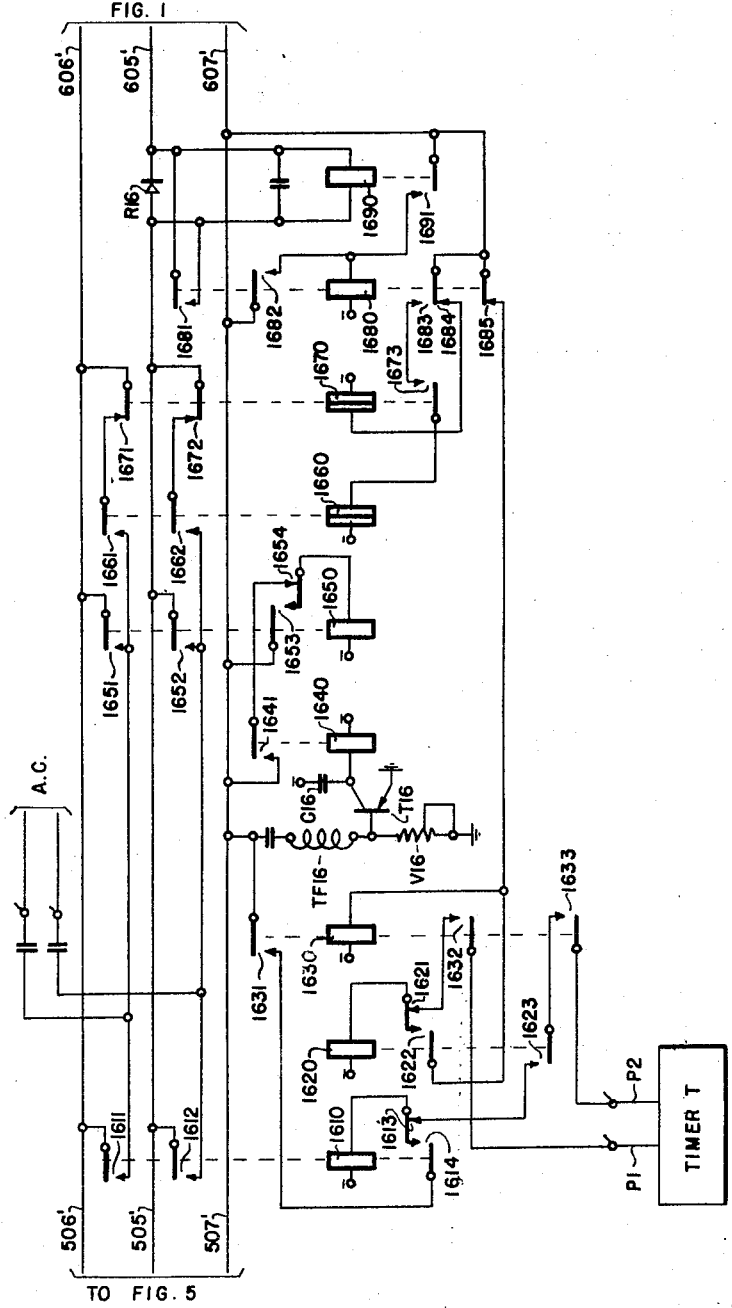

Fig. 16 is a modification of the metering circuit shown in Fig. 6.

Figure 17:
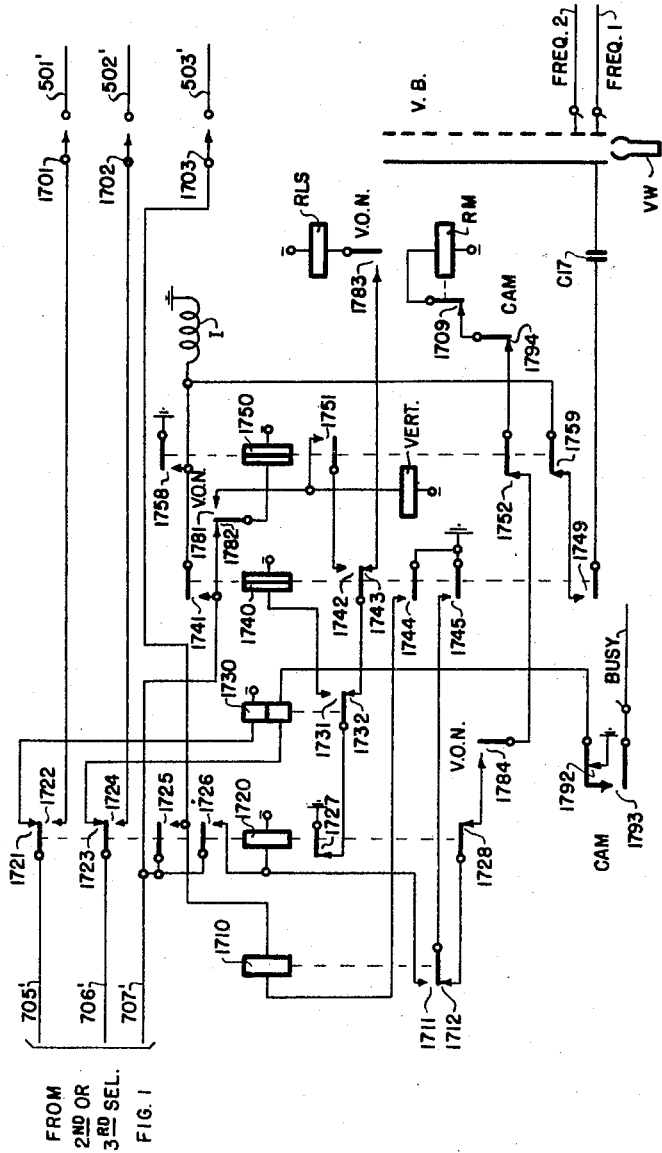

Fig. 17 is a modification of the selector switch shown in Fig. 7.

Fig. 18 schematically illustrates the apparatus and trunking connections in the sub-office B.

Fig. 19 schematically illustrates the apparatus and trunking connections in the sub-office A.

GENERAL DESCRIPTION

The multi-office telephone system of the present invention comprises a universal numbering six-digit system having sixty-four parent offices divided into eight sections with eight offices in each section. Each parent office may have one or more sub-offices. The parent offices have an ultimate capacity of ten thousand lines and the sub-offices may vary in size from fifty or a hundred lines to one thousand lines. In the trunking arrangement each parent office in a section is connected to each of the remaining parent offices in its section and most, but not all, of the parent offices are used as tandem offices for calls between different sections dependent upon their geographic location. The parent offices in any section nearest the remaining sections are usually used as the tandem offices, and each section has a plurality of tandem offices connected to different tandem offices in each of the remaining sections. Any desired parent office in any section is reached by dialling a two-digit office code, the first digit designating the called section and the second digit designating the parent office in the called section. Sub-offices associated with their respective parent offices are reached by dialling three or four digits dependent upon the capacity of the sub-office, the first two digits being the digits of its parent office code and the third or fourth digit designating the called sub-office. Calls originating in the sub-offices are automatically trunked to first selector switches in their parent offices and are extended in the same manner as the calls originating from the parent offices. A universal six-digit numbering plan is used for calling any subscriber in any parent office or any sub-office. For example, the first dialled digit operates the first selector in the parent office to route the call to second selectors in the nearest tandem parent office of a called section, or to second selectors in the calling parent office if the called line is in the calling section. The second dialled digit operates the second selectors to route the call to third selectors of the called parent office in the called section. The third dialled digit operates third selectors to route the call to fourth selectors in the called parent office or to called fourth selectors in the called sub-office if the first three digits designate such called sub-office. The fourth dialled digit operates fourth selectors to route the call to connectors in the called parent office or to connectors in the called sub-office if the first four digits designate such called sub-office. The fifth and sixth dialled digits operate the connectors to complete the call to the called subscriber. When a sub-office subscriber calls another subscriber in the same sub-office, the parent office trunk and switches are released and the call is switched over in the calling sub-office to a local numerical switch, either a selector or a connector, to complete the call when enough digits have been dialled to indicate such a call.

Some of the sub-offices have direct trunks between such sub-offices and these direct trunks are used in establishing connections between such sub-offices while the parent office trunks and switches used in setting up the connection are released. These direct trunks are also used for incoming calls to one of the sub-offices.

As previously stated the area is divided into eight sections and are numbered 2, 3, 4, 5, 6, 7, 8 and 9. Section 2 has four tandem offices such as parent offices 24, 27, 28 and 29. Tandem office 24, in addition to being connected to all parent offices in section 2, is also connected to only certain parent offices in sections 5 and 8. Tandem office 27, in addition to being connected to all parent offices in section 2, is also connected to the remaining parent offices in sections 5 and 8 and to all parent offices in sections 6 and 7. Tandem office 28 is also connected to only certain parent offices in sections 3 and 4. Tandem office 29 is also connected to the remaining parent offices in sections 3 and 4 and to all parent offices in section 9. It will therefore be seen that all parent offices in sections 3 to 9, inclusive, are connected to section 2 at different tandem offices in section 2, and since each parent office in section 2 is connected to each of the remaining parent offices in section 2, then a call from any office in any section can be completed to any office in section 2.

The remaining sections 3 to 9, inclusive, each have certain of their parent offices acting as tandem offices dependent upon their geographic locations, and are connected in a somewhat similar manner to that described for section 2. Section 6, however, due to its centralized location, has all its eight parent offices used as tandem offices to the other sections.

Figure 1:
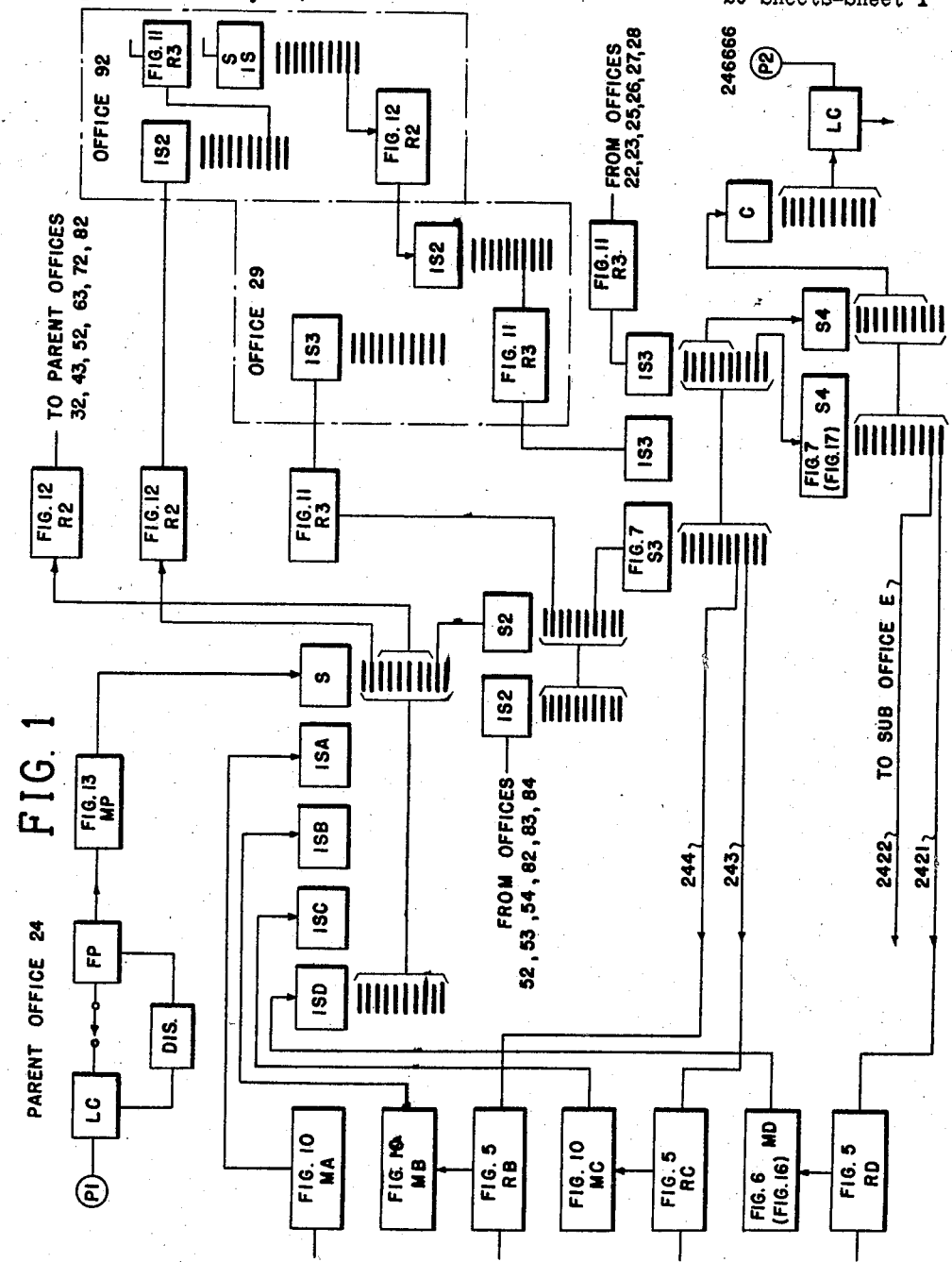

Only part of the trunking arrangement is shown in Fig. 1 and it should be understood that the remaining trunking arrangements of the other parent offices are interconnected in a similar manner. Fig. 1 shows the trunking arrangement for the parent office No. 24 in section 2 and only portions of parent offices Nos. 29 and 92. Parent office subscriber lines, such as P1 and P2, terminate in the line circuits, such as LC, and in the banks of Strowger connector switches, such as C. On initiation of a call a Strowger finder, such as FP, hunts for and finds the calling line and connects the calling line to a first selector switch S through a metering circuit, such as MP. A call to another line terminating in the same parent office is extended through second selectors, such as S2, third selectors, such as S3, fourth selectors, such as S4, and connectors such as C to the called line. On a call to a line in a different section the first selector selects a repeater, such as R2, which is connected to one of the tandem parent offices in the called section where the repeater R2 is connected to an incoming second selector IS2. The incoming second selector IS2 then routes the call to the desired parent office through a repeater, such as R3, or locally to a third selector S3, the latter repeater R3 being connected to an incoming third selector IS3 in the called parent office if the tandem parent office is not the called parent office. The fourth selectors S4 and connectors C in the called parent office then complete the call in the well-known manner. All of the finders, selectors and connectors are of the well-known vertical and rotary Strowger type switches. On a call to another parent office in the same section, the call is extended from selector S to second selectors S2 and over a repeater, such as repeater R3, to an incoming third selector, such as IS3, in the called parent office; such call then being completed through fourth selectors and connectors in the called parent office.

Calls from parent offices to the sub-offices extend from the banks of third selectors, such as S3 or IS3, in case the called sub-office has a capacity between one hundred and a thousand lines and extends from the banks of fourth selectors S4 in case the capacity is only the hundred lines or less. These third or fourth selectors extend the call through two-way repeaters, such as RA—RD, to the sub-office repeaters TRA—TRD, and incoming fourth selectors, or incoming connectors in the sub-offices.

Calls originating at the sub-offices are extended through the line circuits LC, local finders, local outgoing repeaters and outgoing rotary lineswitches, and trunk repeaters such as TRA—TRD, in the sub-office to two-way repeaters, such as RB—RD, in the parent office and through incoming trunk circuits, or metering circuits MA—MD, to incoming first selectors in the parent office. The first selector switches, such as ISA to ISD, for all the sub-offices are located in the parent office and calls from the sub-office to other offices are extended over the parent office switches in the usual manner. However, in case a calling sub-office subscriber calls another subscriber in his own sub-office and after sufficient digits have been dialled to operate the parent office switches to indicate that the call is intended for a line in the originating sub-office then a high frequency signalling current is sent back through the parent office selectors to cause the call to be switched locally to a local numerical switch, such as a selector or a connector in the calling sub-office after which the parent office numerical selectors are released.

Figs. 1A and 1B represent two adjacent sub-offices A and B having direct trunks therebetween and in addition each sub-office has direct trunks to its parent office. The trunks from sub-office A to Fig. 1 being one-way trunks while the trunks from sub-offices B to Fig. 1 are two-way trunks. Calls from sub-office A are extended through the parent office to other parent and sub-offices while calls from sub-office A to lines in sub-office A or sub-office B are extended through sub-office A locally or to sub-office B over the sub-office direct trunks interconnecting the two sub-offices. The same is true for calls from sub-office B. Incoming calls from offices other than sub-office A and sub-office B are first extended to sub-office B and thereafter extended locally to sub-office B or over the direct sub-office trunks to sub-office A. These direct sub-office trunks terminate in bi-level repeaters, such as BRA and BRB, at each sub-office and are accessible from two selector levels of the local sub-office selectors. Each bi-level repeater is connected to an incoming connector, such as connector ICA, which has access to two hundred lines by means of two sets of wipers. The wiper set to be used in establishing the connection being determined by the level over which the bi-level repeater in the other sub-office is seized. That is, when a particular one of these levels is seized the repeater transmits a signalling current over the trunk to the incoming connector in the other sub-office to cause the connector to switch over to its second wiper set. When the repeater is seized over the other level, no signalling current is transmitted over the sub-office trunk with the result that the incoming connector uses its normally connected wiper set.

Charges are made against the calling subscriber by operating the calling subscriber's meter for one or more unit charges dependent upon the distance to the called office and the duration of conversation. Only one unit charge, regardless of the length of conversation, is made for completed calls between subscriber lines terminating in a given parent office and all its sub-offices. Calls between subscriber lines which include more than one parent office are charged a first unit charge when the called party answers, a second unit charge shortly after the first unit charge, and then additional unit charges at timed periods for the duration of the call. The time periods between such additional charges, after the first two unit charges, varies dependent upon the distance to the called parent office or its associated sub-office.

Having given a general description of the system and apparatus, description will now be given of the detail operation of the apparatus for the different types of connections.

*Outgoing call from sub-office D to parent office 24*

Subscriber D2 in sub-office D removing his receiver closes a circuit over conductors 1 and 2 to the line relay (not shown) of line circuit LC. The line relay in a well-known manner closes a circuit through the distributor to operate the start relay ST in the finder and the finder operates in the usual manner to find the calling line. The start relay ST at contacts 14 closes a resistance bridge across the line conductors 20 and 22 to operate relay 200. The circuit for operating relay 200 may be traced as follows: from ground contacts 293, rectifier R3, contacts 263, lower winding of differential relay 210, positive talking conductor 22, through the resistance bridge and contacts 14 in the finder FD, conductor 20, upper winding of differential relay 210, contacts 261 and 291 and through the winding of slow relay 200 to battery. Differential relay 210 is not operated over this circuit because its two windings are now energized in opposition. The rectifier R3 is poled in such a direction as to make the relay 270 a polarized relay so that it will only operate on receipt of reversed battery. At contacts 201 relay 200 prepares a circuit for the switching relay 290, at contacts 202 prepares the stepping circuit for the outgoing secondary line switch OSD, and at contacts 203 grounds conductor 21 to maintain the finder in operated position. Contacts 203 also grounds conductor 216 to operate relay 340 in the local connector LCD, Fig. 3, by way of vertical off-normal contacts 394 to prepare such connector for operation. If the wipers 205 to 208, inclusive, are resting on a busy trunk then wiper 207 is grounded with the result that switching relay 290 is short circuited and the stepping circuit for the motor magnet 285 is completed by way of contacts 202, 296 and 286. The motor magnet 285 at its interrupter contacts 286 interrupts its own circuit to step the wipers one step into engagement with the next trunk. In case this next trunk is also busy then ground on the busy trunk test bank contact is engaged by test wiper 207 to again short circuit relay 290 and operate the motor magnet 285 another step. In case this trunk is idle wiper 207 will not find ground with the result that the short circuit is removed from relay 290 and relay 290 operates over the following circuit: ground contacts 201, winding of relay 290, contacts 286, and winding of motor magnet 285 to battery. Due to the high resistance of relay 290 the motor magnet is not energized in this circuit.

Switching relay 290 at contacts 291 and 293 disconnects relay 200 which restores after an interval, at contacts 292 and 294 extends the talking conductors 20 and 22 over conductors 405 and 406 of the seized trunk, at contacts 295 prepares a locking circuit for itself, at contacts 296 opens the stepping circuit, and at contacts 297 grounds conductors 21 and 216 before contacts 203 open.

From the foregoing description it will be seen that both the finder FD and the outgoing secondary line switch OSD are simultaneously operated and when both have switched through a circuit is completed for operating the line relay 430 as follows: from ground lower winding of line relay 430, lower left hand winding of repeating coil RC4, contacts 413, conductor 406, wiper 206, contacts 294, rectifier R3, contacts 263, lower winding of relay 210, conductor 22, finder wiper 11 and bank contact 7, conductor 2, and through the substation circuit D2 and calling device CD2 to conductor 1, bank contact and wiper 9, conductor 20, upper winding of differential relay 210, contacts 261 and 292, wiper 205, conductor 405, contacts 411, upper left hand winding of repeating coil RC4 and through the upper winding of line relay 430 to battery. At contacts 432 the relay 430 operates relay 440. At contacts 441 relay 440 extends a circuit through the right hand winding of shunt field relay 420 to polarize this relay and also completes an obvious circuit for operating relay 470. At contacts 443 relay 440 grounds conductor 407 to maintain relay 290 operated over its locking circuit including contacts 295 and wiper 207 before the slow-to-release relay 200 restores.

At contacts 471 and 474 relay 470 disconnects the conductors 305 and 306 extending to the incoming connector ICD, and at contacts 472 and 473 connects the left hand winding of the shunt field relay 420 across the trunk conductors 401 and 402 to complete a circuit for the line relay in the incoming first selector ISD (Fig. 1) as follows: from battery and ground through the two windings of the line relay (not shown) in the incoming selector ISD, conductors 605 and 606, through the rectifier R6, conductors 505 and 506, contacts 511 and 514, conductors 401 and 402, contacts 472, 431 and 473, right hand windings of repeating coil RC4 and through the left hand winding of shunt field relay 420. Rectifier R6 is connected in bridge of answer relay 690 to polarize this relay so that it will only operate on reverse battery. In the incoming first selector ISD the line and release relays operate in the well-known manner to ground conductor 607 to operate relays 520, 630 and 670. The circuit for operating relay 630 extends from grounded control conductor 607 and contacts 685 to relay 630, and by way of contacts 684 for operating relay 670. The circuit for energizing relay 520 extends by way of conductors 607 and 507 and relay 520 to battery. Relay 520 at contacts 521 disconnects battery potential through resistance R51 from the test conductor 503 to mark the repeater RD busy to the parent office selectors such as S4. Relay 630 prepares circuits for relays 610 and 620 and relay 670 prepares a circuit for relay 660.

The calling line D2 is now connected to the first selector ISD in the parent office and dial tone is now transmitted back to the calling subscriber over the talking conductors in the well-known manner. After receipt of dial tone the calling subscriber may now dial the number of the called subscriber. Assuming for the time being that subscriber D2 is calling subscriber P2 in parent office 24 and will accordingly dial the telephone number 246666. The line relay 430 in response to the subscriber dialling the first digit 2, follows the impulses and at contacts 431 repeats the pulses over the talking conductors to operate the line relay of the first selector ISD.

During the operation of the calling device CD2 for the first digit, the X contacts of calling device CD2 grounds conductor 2 to short circuit the lower winding of differential relay 210 to cause relay 210 to operate. The short circuit for the lower winding of relay 210 may be traced from ground at the X contacts of the calling device CD2, conductor 2, bank contact 7 and wiper 11, conductor 22, lower winding of relay 210, contacts 263, rectifier R3, contacts 294, wiper 296, conductor 406, contacts 413, lower left hand winding of repeating coil RC4 and lower winding of line relay 430 to ground. Differential relay 210, upon operating, at contacts 211 completes the circuit for operating relay 230 from grounded conductor 21. Relay 230 at contacts 231 locks itself to conductor 21 and at contacts 232 prepares a circuit from positive booster battery for later on operating meter M2. In case subscriber D1 is the calling subscriber then since the calling device CD1 at substation D1 does not ground conductor 22 then relays 210 and 230 are not operated with the result that negative booster battery will operate meter M1 individual to subscriber D1 during the metering operation.

During pulsing, contacts 432 momentarily opens the circuit of slow-to-release relay 440 but the latter relay due to its slow release characteristics maintains itself in operated position during pulsing. Each time the line relay deenergizes contacts 433 completes a circuit by way of contacts 442 for operating relays 450 and 460. Relay 450, at contacts 451, prepares a priming circuit for line relay 430 to assist it in its reoperation for the next pulse. Relay 460 at contacts 462 short circuits the left hand winding of shunt field relay 420 to improve the pulse repeating circuit, at contacts 463 completes a circuit for operating relay 480 from grounded contacts 441, and at contacts 461 completes the priming circuit for line relay 430. Relay 480 at contacts 481 prepares a circuit for operating relay 220 after the first digit has been dialled.

The incoming first selector ISD is operated to the second level by the first digit 2 and seizes an idle second selector S2 (Fig. 1) in a well-known manner and the second selector S2 grounds the release trunk conductor to hold the first selector operated as well as relays 520, 630 and 670 operated. After dialling the first digit, line relay 430 is maintained energized between digits and relays 450 and 460 restore and the latter relay at 462 removes the shunt from the left hand winding of shunt field relay 420 and at contacts 463 opens the circuit of relay 480. During the interval when relay 460 is restored and relay 480 is in operated position, a momentary ground pulse is transmitted from grounded contacts 441, 464, 481, conductor 403, wiper 208, contacts 298 and the winding of relay 220 to battery to operate relay 220. Relay 220 at contacts 223 locks itself to grounded conductor 21 and at contacts 221 and 222 short circuits both windings of differential relay 210. Relay 210, it will be seen, is therefore operative only during the first digit to determine whether the first or second party on a party line originated the call.

The second digit 4 is now dialled by the calling subscriber and is repeated by contacts 431 of line relay 430 to cause the seized second selector S2 (Fig. 1) to select and seize a third selector such as selector S3 (Figs. 1 and 7). Referring now to Fig. 7, third selector S3 is marked idle by connecting battery through the winding of relay 750 over vertical off-normal contacts 782 and the control conductor 707' and this relay is energized over conductor 707' when the second selector seizes this switch. When the second selector S2 switches through the line relay 730 is operated over the talking conductor 705' and 706' and over the talking conductors extending through the second and first selectors, the talking conductors 605, 606, 505 and 506 of metering circuit MD (Fig. 6), contacts 511 and 514, conductors 401 and 402, contacts 472 and 473, pulsing contacts 431 of line relay 430, right hand winding of repeat coil RC4, and left hand winding of answer relay 420. Line relay 730 at contacts 731 completes a circuit from grounded contact 727 for operating slow-to-release relay 740. Relay 740 at contacts 741 grounds conductor 707' to hold the preceding first and second selectors as well as relays 520, 630 and 670 operated and also completes a circuit by way of vertical off-normal contacts 782 for maintaining relay 750 operated. At contacts 742 relay 740 prepares the circuit for the vertical magnet VM and at contacts 743 opens the circuit to the release magnet RLS.

In response to the calling subscriber dialling the third digit 6 the line relay 430 at contacts 431 pulses relay 730 to cause it to restore six times. Each time relay 730 restores it completes a circuit by way of contacts 727, 732, 742 and 751 for operating vertical magnet VM to step the wipers opposite the sixth level. Off-normal contacts 782 open and contacts 781 close on the first vertical step to maintain slow-to-release relay 750 energized during the pulsing period. Off-normal contacts 783 prepares a point in the circuit to the release magnet RLS and off-normal contacts 784 prepares the rotary magnet circuit. Shortly after termination of third digit, slow-to-release relay 750 restores to open the vertical magnet circuit at contacts 751 while at contacts 752 closes the rotary stepping circuit to the rotary magnet as follows: ground contacts 745, 712, 728, 784, 752, 794, 709 and winding of rotary magnet RM to battery. At contacts 753 relay 750 closes a point in a circuit to relay 760 which is closed only on certain levels corresponding to certain sub-offices and will be explained more fully hereinafter.

Rotary magnet RM at interrupter contacts 709 interrupts its own circuit to step the wipers step by step until the test wiper 703' encounters a bank contact having idle battery potential thereon. Assuming that the test conductor 717 is connected to an idle fourth selector, such as S4, test relay 710 of the third selector S3 will be operated in series with a relay similar to relay 750 in the fourth selector S4 over conductor 717. This circuit may be traced from grounded contacts 744, winding of relay 710, wiper 703', bank contact and test conductor 717, and through the normally closed vertical off-normal contacts similar to contacts 782, and a relay similar to relay 750 in the fourth selector S4. Test relay 710 at contacts 712 opens the circuit to the rotary magnet RM and at contacts 711 completes a circuit from grounded contacts 745 for operating switching relay 720. At contacts 726 relay 720 completes a locking circuit by way of contacts 741 and 762, at contacts 727 opens the circuit to the slow-to-release relay 740, at contacts 728 opens another point in the rotary stepping circuit, and at contacts 725 short circuits relay 710 which restores slowly. At contacts 721 and 723 relay 720 opens the circuit of line relay 730 which now restores and at contacts 722 and 724 closes the circuit to the line relay for selector S4.

In the seized fourth selector S4, the operation of the line relay, similar to line relay 730, causes the slow-to-release relay, similar to relay 740, to operate and ground control conductor, such as 717, to hold relay 720 operated over wiper 703', contacts 725 and 726 as well as connecting ground back over control conductor 707' to hold the second and first selectors operated and relays 630, 670 and 520 also operated.

In response to the last three dialled digits the fourth selector S4 and connector C are operated in the well-known manner to extend the call to the called parent subscriber line P2. The connector C applies ringing current to the called line P2 and when the called party answers the connector reverses battery back over the line conductors of the operated selector switches to operate relay 690 in Fig. 6. The rectifier R6 in bridge of relay 690 now causes this reversal of current over talking conductors 605 and 606 to operate relay 690. Relay 690 at contacts 691 completes a circuit from grounded control conductor 697 for operating relay 680. Relay 680 at contacts 681 short circuits both the rectifier R6 and relay 690, at contacts 681 locks to grounded control conductor 607, at contacts 684 opens the circuit to slow-to-release relay 670, at contacts 685 opens a circuit to relay 630 and at contacts 683 completes a circuit for relay 660. Slow-to-release relay 660 is energized over contacts 673 and 683 before the slow-to-release relay 670 restores and relay 660 at contacts 661 and 662 prepares a circuit for transmitting a high frequency signalling current pulse over conductors 505 and 506 when relay 670 fully restores.

When the connector C reverses battery and relay 690 operates, shunt field relay 420 in the trunk repeater TRD, Fig. 4, is also operated when current is reversed over conductors 401 and 402. Relay 420 at contacts 421 operates the reversing relay 410 to reverse current back over conductors 405 and 406 to operate relay 270 due to the rectifier R3 being connected in bridge therewith. Relay 270 operates in response to receipt of reversed current and at contacts 272 completes a locking circuit for itself from grounded contacts 297. At contacts 271 relay 270 short circuits the condenser C21, rectifier R3, and upper operating winding of relay 270, at contacts 273 and 275 prepares the metering circuits.

Relay 670 restores shortly after its circuit is opened at contacts 684 when relays 690 and 680 operated in response to the connector reversing battery over the talking conductors. At contacts 673 relay 670 opens the circuit to relay 660 which maintains its contacts 661 and 662 closed for an interval after relay 670 is fully restored. Before relay 660 restores contacts 671 and 672 connects the source of high frequency signalling current to the talking conductors 505 and 506 by way of contacts 661, 662 and 671 and 672. This high frequency signalling current is transmitted over conductors 505 and 506 by way of contacts 514 and 511 to conductors 401 and 402 and over contacts 472, 473 and 431 to the right hand windings of the repeating coil RC4 to induce this same high frequency signalling current through the left hand windings of the repeating coil RC4 and by way of contacts 412 and 414, conductors 405 and 406, wipers 205 and 206, contacts 292 and 294, through the right hand winding of induction coil 2IC and condenser C22. This high frequency signalling current is above the audible range so as not to interfere with talking over the talking conductors. This high frequency signalling current is induced into the left hand winding of the induction coil 2IC and through the tuned filter TF2 to the transistor T2 to operate relay 280. The transistor network comprises an induction coil 2IC having its right hand winding and condenser C22 connected in bridge of the talking conductors while its left hand winding is connected to the emitter of the transistor T2 and through the tuned filter TF2 to the base of the transistor T2. A variable resistor V2 is connected to the emitter and base of transistor T2 to increase the sensitivity of the circuit by restoring the charge on the condenser of the tuned filter during alternate half-cycles when the transistor T2 is con-conducting. A relay 280 and condenser C2 is connected to the transistor T2 and operated when the proper signalling current is received, the condenser C2 building up a charge during signal transmission peaks to assist in holding relay 280 operated during the non-conducting half-cycles. Relay 280, upon operating in response to the receipt of a high frequency signalling current, at contacts 281 completes the prepared metering circuit. In case subscriber D1 is the calling subscriber, then it will be remembered that relay 230 is not operated since the differential relay 210 was not operated during dialling with the result that the meter M1 individual to subscriber D1 is operated over the following circuit: from negative booster battery, contacts 233, 275, 281, 273, conductor 23, finder wiper 12 and bank contact 8, contact 4 of the cut-off relay CO, conductor 3, rectifier R2, winding of meter M1 to ground. Rectifier R2 permits this current to flow to thereby short circuit meter M2 to prevent its operation while rectifier R1 blocks this current flow to force the current through the winding of meter M1 to cause its operation. If subscriber D2 were the calling subscriber, then it will be remembered that differential relay 210 operated and caused relay 230 to lock operated and then in this case meter M2 individual to subscriber D2 is operated over a similar circuit extending from positive booster battery, contacts 232, 275, 281, 273, conductor 23, wiper 12 and bank contact 8, contact 4 and conductor 3 through the winding of meter M2 since rectifier R2 blocks this current flow to force it through the widing of meter M2 and from thence through rectifier R1 to ground. The calling sub-office subscriber is charged one unit charge for calls to called lines in its parent office.

From the foregoing description it will be seen that when the called party answers the connector reverses battery to operate answer relays 690 and 420. Relay 410 reverses battery to operate answer relay 270 which prepares a point in the metering circuit. Relay 690 also operates relay 680 which in turn operates relay 660 and opens the circuit of slow-to-release relay 670 which restores slowly to open the circuit to the slow release relay 660. After relay 670 restores and before slow-to-release relay 660 restores a high frequency signalling pulse is transmitted over the talking conductors to operate relay 280 by way of transistor T2. Relay 280 completes the prepared metering circuit to operate the calling subscriber meter for one unit charge.

After conversation and in response to the calling sub-office subscriber hanging up his receiver line relay 430 restores. Line relay 430 at contacts 431 opens the loop circuit over the talking conductors 401 and 402, 505 and 506, 605 and 606, first and second selectors ISD and S2, talking conductors 705' and 706' of selector S3, fourth selector S4 and connector C to cause the connector line and release relay to restore. The connector release relay causes the connector to restore and also removes ground from the control conductor of the operated selectors and control conductors 707', 607 and 507. The removal of ground from the control conductors of the operated selector switches causes these switches to restore in the well-known manner and in a manner similar to the third selector S3. As an example, when ground is removed from the control conductor engaged by wiper 703' by the connector, the locking circuit of switching relay 720 is opened and relay 720 restores. At contacts 727 relay 720 completes the release circuit as follows: from ground, contacts 727, 732, 743, 783, and through the winding of release magnet RLS to battery. The release magnet operates and restores the wipers to normal and the operated off-normal contacts 783 restore when the wipers are fully restored to open the circuit to the release magnet. The other operated selector switches release in a similar manner.

When ground is removed from conductor 507, relay 520 restores to connect negative idle battery potential through resistance R51 and contacts 521, 532 and 554 to conductor 503 to mark this repeater idle to selector switches having access thereto. Removal of ground from control conductor 607 opens the locking circuit to relay 680 which restores.

In addition relay 430, upon restoring, at contacts 432 opens the circuit to relay 440 which slowly releases. Relay 440 at contacts 441 opens the circuit to the right hand winding of shunt field relay 420 and opens the circuit to relay 470 which restores. At contacts 443 relay 440 disconnects ground from conductor 407 to restore relay 290 and at contacts 444 connects the control conductor 407 to the local connector control conductor 307. Relay 290, upon restoring, at contacts 297 disconnects ground from control conductor 21 to restore relays 270, 230 and 340 and to cause the finder FD and line circuit to restore in the well-known manner.

*Outgoing call from sub-office D to office 29*

Calls from subscriber lines in sub-office D to other parent offices in the same section 2 are somewhat similar to that previously described for calls to parent office 24 except that a second selector, such as S2 (Fig. 1) is operated to a different level to seize a repeater such as R3 (Figs. 1 and 11) and an incoming third selector such as IS3 in the called office such as office 29.

In response to a line in sub-office D initiating a call an idle first selector ISD is seized by the calling line by way of one of the finders FD and outgoing secondaries OSD (Fig. 2) and by way of repeater TRD (Fig. 4) and repeater RD (Fig. 5) as previously described. Assuming now that the call is to be extended to a called line terminating in office 29, the office code digits 2 and 9 are dialled and repeated at contacts 431 by line relay 430 to cause the first selector to seize an idle second selector over the second level and the second selector to seize an outgoing repeater R3 (Figs. 1 and 11) over the ninth level in the well-known manner.

When repeater R3, Fig. 11, is seized by a second selector, line relay 1170 is operated over the talking conductors as follows: from battery and ground through the upper and lower windings of line relay 1170, left hand windings of repeating coil RC11, contacts 1151 and 1153, talking conductors 1115 and 1116, over the talking conductors of the second and first selectors S2 and ISD, conductors 605 and 606, 505 and 506, contacts 511 and 514, conductors 401 and 402, contacts 472 and 473, contacts 431, right hand windings of repeating coil RC4, and left hand winding of shunt field relay 420.

Relay 1170 at contacts 1171 closes a circuit over the talking conductors 1105 and 1106, the right hand windings of repeating coil RC11, and the left hand winding of shunt field relay 1160 to the line relay of the incoming third selector IS3 in office 29. At contacts 1172 line relay 1170 operates slow-to-release relay 1180. Relay 1180 at contacts 1181 completes a circuit through the right hand winding of shunt field relay 1160 to polarize this relay and operates relay 1120 by way of contacts 1133. At contacts 1184 relay 1180 removes the idle battery potential to busy this repeater to other selectors, and at contacts 1183 grounds control conductor 1117 to hold the operated selectors S2 and ISD operated. Slow-to-release relay 1120, upon energizing, at contacts 1121 and 1122 prepares a point in the metering circuit.

The calling subscriber now dials the remaining digits of the called number and relay 430 at contacts 431 repeats these digits to line relay 1170 which in turn at contacts 1171 repeats these digits to operate the succeeding switches in office 29. At contacts 1172 relay 1170 momentarily opens the circuit to slow-to-release relay 1180 but this relay due to its slow release characteristics is maintained energized during pulsing. At contacts 1173 line relay 1170 completes a circuit by way of contacts 1182 for operating relays 1190 and 1100. Relay 1190 at contacts 1191 completes a circuit for priming relay 1170 to assist the operations of relay 1170. Relay 1100 at contacts 1101 short circuits the left hand winding of shunt field relay 1160 to improve the pulsing circuit, and at contacts 1102 opens a further point to mark this repeater busy.

The call is then completed in the well-known manner through the incoming third selector IS3 (Fig. 1), and through fourth selectors and connectors in parent office 29. When the called subscriber in office 29 answers, the connector reverses battery back over the talking conductors through the third and fourth selectors and over conductors 1105 and 1106 to operate the shunt field answer relay 1160. Relay 1160 at contacts 1161 operates reversing relay 1150 and relay 1150 at contacts 1152 and 1154 reverses battery back over conductors 1115 and 1116 to operate answer relays 690 and 420. Relay 420 operates relay 410 to reverse battery to operate relay 270 to prepare the metering circuit at contacts 273 all as previously described.

Answer relay 690, upon operating, operates relay 680 to cause the operation of slow-to-release relay 660 and the restoration of slow-to-release relay 670 to transmit a momentary pulse of high frequency signalling current by way of contacts 661, 662, 671 and 672 after relay 670 restores and before relay 660 restores. This pulse of high frequency signalling current is transmitted back over the talking conductors and through the transistor network to cause transistor T2 to operate relay 280 which at contacts 281 completes the metering circuit to operate the calling subscriber's meter for a first unit charge as previously described.

Relay 1150, in addition to reversing battery to prepare for the first unit meter charge, also prepares at contacts 1155 a connection for making a second unit charge. When the one-second timer 1169 grounds pulse 1 lead at contacts 1162 relay 1140 is operated over contacts 1155 and 1141. Relay 1140 at contacts 1141 locks itself to ground at contacts 1181, and at contacts 1143 prepares the circuit for relay 1130. When the one-second timer 1169 grounds the pulse 2 lead one second later at contacts 1163, relay 1130 is operated over contacts 1143 and 1134 and locks at contacts 1135. Relay 1130 at contacts 1133 opens the circuit to the slow-to-release relay 1120, at contacts 1136 prepares a circuit for relay 1110, and at contacts 1131 and 1132 connects high frequency signalling current to line conductors 1115 and 1116 by way of contacts 1121 and 1122 during the release time of slow-to-release relay 1120 to thereby transmit a pulse of high frequency signalling current back through the second selector S2, first selector ISD over the talking conductors 605 and 606, 401 and 402, through the repeating coil RC4, conductors 405 and 406, and through the right hand windings of induction coil 2IC to cause transistor T2 to operate relay 280 as previously described. Relay 280 operates the calling subscriber's meter for the second unit charge.

Relay 1120 restores shortly after operation of relay 1130 to terminate the high frequency pulse signalling current for assessing the second unit charge and at contacts 1123 connects relay 1110 to contacts 1104 of the zone timer 1103. Zone timer 1103 is constantly running and when one of the knobs 1107, 1108 or 1109 operates contacts 1104 relay 1110 is operated over contacts 1136 and 1123. Relay 1110 at contacts 1111 and 1112 connects high frequency signalling current back over the connection to again operate relay 280 to assess a timed zone charge. The knobs such as 1107, 1108 and 1109 are spaced at predetermined timed positions in the timer corresponding to the called zone to periodically assess a zone charge at predetermined timed intervals during conversation.

From the foregoing description it will be seen that when the called party answers and reverses battery relays 1160 and 1150 operate causing relays 690, 420, 410 and 270 to operate and prepare the metering circuit, that relays 660 and 670 send a first pulse of high frequency signalling current to operate relay 280 through the transistor T2 to meter a first unit charge, and shortly thereafter relays 1120 and 1130 send a second pulse of high frequency signalling current to operate relay 280 to meter the second unit meter charge, and finally relay 1110 is operated by the zone timer 1103 to periodically send pulses of high frequency signalling current to periodically operate relay 280 to make unit charges at predetermined timed intervals corresponding to the zone of the called subscriber and the length of conversation.

After conversation and in response to the calling subscriber hanging up, line relay 430 restores. Line relay 430 causes the release of the apparatus in the sub-office D as previously described and at contacts 431 opens the circuit to line relay 1170 which restores and opens the circuit at contacts 1171 to the connector in the called office to cause the operated switches therein to release in the well-known manner. At contacts 1172 relay 1170 opens the circuit to slow-to-release relay 1180 and at contacts 1173 completes a circuit to reoperate slow-to-release relay 1100. Relay 1100 at contacts 1102 opens the circuit to the idle battery potential to maintain this repeater busy during the release of the automatic switches so that this repeater can not be seized before all switches are fully restored. Relay 1180, upon deenergizing, at contacts 1181 opens circuits to relays 1160, 1140 and 1130 to restores these relays, and at contacts 1183 disconnects ground from conductor 1117 to cause the second selector S2 and first selector ISD to restore. A short interval after slow-to-release relay 1180 restores slow-to-release relay 1100 restores and at contacts 1102 marks the repeater R3 idle by connecting idle battery potential by way of contacts 1124, 1102 and 1184 to conductor 1117. All apparatus is now restored and may be used on a subsequent call.

*Outgoing calls from sub-office D to office 92*

Calls from subscriber lines in sub-office D to other offices in the sections other than section 2 are somewhat similar to calls to offices in section 2 except that the first selector ISD is operated to a level corresponding to the called section to seize a repeater, such as repeater R2 (Figs. 1 and 12) which is connected to an incoming second selector in one of the offices in the called section, for example in Fig. 1, incoming second selector IS2 in office 92.

In a call from sub-office D to office 92 an idle first selector ISD is seized by way of finder FD, outgoing secondary line switch OSD, repeaters TRD and RD as previously described. In response to the first dialled digit 9 the first selector ISD is directly operated to the ninth level and automatically rotated to seize an idle repeater R2 shown in Figs. 1 and 12. When repeater R2, Fig. 12, is seized line relay 1270 is operated from battery and ground through its upper and lower windings, left hand windings of the repeating coil RC12, contacts 1251 and 1253, conductors 1215 and 1216, over the talking conductors of incoming first selector ISD, metering circuit MD, and repeaters RD and TRD to pulsing contacts 431 of repeater TRD. Line relay 1270 at contacts 1271 closes a loop circuit over the right hand windings of repeating coil RC12 and the left hand winding of shunt field answer relay 1260 and the trunk conductors 1205 and 1206 to the line relay of the incoming second selector IS2 in office 92 (Fig. 1). At contacts 1272 line relay 1270 operates relay 1280.

Slow-to-release relay 1280 at contacts 1281 completes a circuit for the right hand winding of answer relay 1260 to polarize this relay, and completes a circuit for operating relay 1220 by way of contacts 1233. At contacts 1284 relay 1280 removes idle battery potential from conductor 1217 to mark this repeater busy and at contacts 1283 grounds conductor 1217 to hold the first selector ISD operated. At contacts 1285 relay 1280 opens the circuit to the release magnet RLS of the minor switch MS.

In response to the calling subscriber dialling the second digit corresponding to the desired office in section 9, line relay 430 is restored and reoperated to repeat the pulses at contacts 431 to restore and operate line relay 1270 in accordance with the number of pulses in the dialled digit. Line relay 1270 at contacts 1271 repeates these pulses over conductors 1205 and 1206 to operate the incoming second selector IS2 in office 92 to select the desired office in section 9. Each time line relay 1270 restores a circuit is completed at contacts 1273 for energizing relays 1290 and 1200 by way of contacts 1282 of slow-to-release relay 1280. Relay 1290 follows these pulses and at contacts 1291 closes a priming circuit to assist line relay 1270 in its reoperation, and at contacts 1292 completes the stepping circuit for stepping magnet SM of the minor switch MS. Slow-to-release relay 1200 is maintained operated during the pulsing period and at contacts 1201 shorts the left hand winding of relay 1260 to improve impulsing over the trunk conductors, at contacts 1202 opens an additional point in the circuit for marking repeater R2 busy, and at contacts 1203 opens the circuit to relay 1225.

Relay 1290 sends pulses over the stepping circuit to cause the stepping magnet SM to step the wiper 1245 to a bank contact corresponding to the number of pulses in the second dialed digit to select the corresponding cam contacts of the LD Timer. For example, in case the desired called subscriber line terminates in office 92 then the second digit 2 operates the minor switch wiper 1245 to its second bank contact to engage cam contacts 1256. Office 94 is about equidistant from office 24 and therefore if the calling line terminated in office 94 and the second digit dialled is the digit 4 then the call is routed from the fourth level of selector IS2 in office 92 through a repeater, such as repeater R3, to incoming third selectors in office 94 and the minor switch wiper 1245 would engage its fourth bank contact to select the same cam contacts 1256 for similar meter charges. Other offices, such as offices 93, 95 and 97 are about the same distance from office 24 but more distant than offices 92 and 94 so that when the office selecting digit 3, 5 or 7 is dialled for the second digit then the minor switch MS selects cam contacts 1274 to assess proper meter charges corresponding to the distance or zone of the called office with respect to the calling office. Offices 96, 98 and 99 are quite distant from office 24 and when the office selecting digits 6, 8 or 9 are dialled for the second digit the minor switch MS selects cam contacts 1276 to assist the proper meter charges. Cam springs 1278 and 1279 diagrammatically represent other variable time unit charges in other zones. The knobs, such as knobs 1257, 1275 and 1277 are spaced at different timed intervals to periodically make a unit charge at variable time periods which varies in accordance with the zone or distance from the calling office. Some knobs are spaced at three or five minute periods and others at one, two or fractions of minute periods.

When the minor switch MS took its first step off normal, contacts 1244 close to prepare a circuit for relay 1225 and shortly after dialling the second digit slow-to-release relay 1200 restores to complete the circuit for relay 1225 by way of contacts 1244 and 1203. Relay 1225 at contacts 1226 locks to contacts 1244, at contacts 1227 opens the circuit to stepping magnet SM to prevent its reoperation by subsequent dialled digits, and at contacts 1228 opens another point in the circuit to maintain this repeater busy.

After routing the call to the called office the remaining digits are dialled causing relay 1270 to repeat these digits by way of contacts 1271 to operate the third and fourth selectors and the connector to extend the connection to the called line. When the called subscriber answers, the connector reverses battery back over conductors 1205 and 1206 to operate answer relay 1260 which at contacts 1261 operates reversing relay 1250. Relay 1250 at contacts 1252 and 1254 reverses battery back towards the calling office to operate relays 690 and 420. Relay 420 operates relay 410 to reverse battery to operate relay 270 and relay 270 at contacts 273 prepares the circuit for operating the calling subscriber's meter. Relays 680 and 660 are operated and relay 670 restored in response to the operation of relay 690 to send a pulse of high frequency signalling current over the talking conductors and through the transistor network to cause the transistor T2 to operate relay 280 as previously described. Relay 280 at contacts 281 completes the circuit for operating the calling subscriber's individual meter for the first unit charge as previously described.

When the one second timer 1269 operates contacts 1262, relay 1240 is operated over contacts 1255 and 1241. At contacts 1242 relay 1240 locks to ground at contacts 1281, and at contacts 1243 prepares a circuit for relay 1230. Contacts 1263 close one second after contacts 1262 to operate relay 1230 over contacts 1243 and 1234 and relay 1230 locks over contacts 1235 and 1281. Relay 1230 at contacts 1231 and 1232 connects high frequency signalling current by way of contacts 1221 and 1222 over talking conductors 1215 and 1216 and over the talking conductors back to the calling office and through the transistor network and transistor T2 to operate relay 280 a second time. Relay 280 at contacts 281 operates the calling subscriber's meter to assess the second unit charge.

Relay 1230 at contacts 1236 prepares the circuit to relay 1210 and at contacts 1233 opens a circuit to slow-to-release relay 1220. Relay 1220 restores after a short interval to terminate the pulse of high frequency signalling current at contacts 1221 and 1222 and at contacts 1223 connects relay 1210 by way of contacts 1236 and wiper 1245 to the bank contact corresponding to the called offfice. Assuming that office 92 is the called office then wiper 1245 engaged the second bank contact to thereby connect relay 1210 to cam contacts 1256. Each time one of the knobs, such as knobs 1257, 1258, or 1259, engage cam contacts 1256 ground is connected over the engaged bank contact and wiper 1245 to operate relay 1210 by way of contacts 1236 and 1223. Relay 1210 is periodically operated by the knobs 1257, 1258, 1259, etc., to periodically connect the high frequency signalling current by way of contacts 1211 and 1212, 1231 and 1232 to the talking conductor 1215 and 1216 to operate relay 280 through transistor T2 as previously described to make periodic unit charges in accordance with the called zone and the length of conversation.

From the foregoing description it will be seen that when the called party answers and reverses battery, relays 1260 and 1250 operate to cause the operation of relays 690, 420, 410 and 270 to prepare the metering circuit, that relays 660 and 670 send a first pulse of high frequency signalling current to operate relay 280 through transistor T2 to meter a first unit charge, that shortly thereafter relays 1220 and 1230 send a single pulse of high frequency signalling current to operate relay 280 to meter a second unit charge, and finally relay 1210 is operated by the LD Timer 1299 to periodically send pulses of high frequency signalling current to periodically operate relay 280 at predetermined timed intervals corresponding to the zone of the called subscriber and the length of conversation.

After conversation and in response to the calling subscriber hanging up the line relay 430 restores to cause the release of the apparatus in sub-office D as previously described, and at contacts 431 opens the circuit to line relay 1270. Line relay 1270 opens a circuit at contacts 1271 to the connector in the called office to cause the switches beyond the repeater to release in the well-known manner. At contacts 1272 relay 1270 opens the circuit to slow-to-release relay 1280 and at contacts 1273 momentarily closes a circuit to reoperate relay 1200. Relay 1200 opens contacts 1202 to maintain this repeater busy for an interval of time to enable all operated switches to release before this repeater can again be seized. When the slow-to-release relay 1280 restores contacts 1281 opens the circuit to relays 1230, 1240 and 1260, at contacts 1283 disconnects ground from conductor 1217 to cause the first selector to release, and at contacts 1285 completes the circuit for operating release magnet RLS of the minor switch MS by way of off-normal contacts 1244. Release magnet RLS operates and restores the wiper 1245 to normal and when this wiper reaches normal, the off-normal contacts 1244 open the circuit to the release magnet RLS and to relay 1225 which now restores. Slow-to-release relay 1200 restores shortly after relay 1280 restores and at contacts 1202 connects idle battery potential by way of contacts 1224, 1228, 1202 and 1284 to conductor 1217 to mark this repeater idle.

Calls from subscriber lines in sub-office D to other offices in sections other than section 2 which require two offices in the called section to complete the calls, are somewhat similar to that just described for calls from sub-office D to office 92 except that two repeaters, such as repeater R2, Fig. 12, and repeater R3, Fig. 11, are required. For example and referring to Fig. 1, it will be seen that in a call from sub-office D to office 93, the repeater R2 is seized over the ninth level of selector 1SD to connect with an incoming second selector IS2 in office 92 in response to dialling the first digit, or section digit 9, of the office code. In this call office 92 is used as a tandem office. The incoming second selector IS2 in office 92, in response to the dialling of the second digit, or office digit 3, of the office code, seizes a repeater R3 connected to an incoming third selector IS3 in office 93. The remaining dialled digits then operate the switches in the called office 93 to complete the desired connection. In connections of this type both repeaters R2 and R3 have means for transmitting high frequency signalling current pulses for metering purposes as previously described. It is therefore necessary that the high frequency signalling current pulses from the second repeater R3 be blocked and made ineffective so that only the high frequency pulses from the first repeater R2 are effective to control the calling subscriber's meter. In order to block the high frequency pulses transmitted by repeater R3, the repeater R2 is provided with a special repeating coil. Repeating coils RC12 in repeaters R2, Fig. 12, are therefore special repeating coils which pass voice signals but effectively block the high frequency signalling current pulses transmitted by the second repeater, such as repeater R3.

Outgoing calls from sub-office D to sub-office C

Calls from subscriber lines in sub-office D to subscriber lines in sub-office C are extended through the finder FD, outgoing repeater ORD and secondary line switch OSD, trunk repeaters TRD and RD, metering circuit MD, incoming first selector ISD, second selectors S2, third selectors S3, repeaters RC and TRC, local incoming fourth selectors ISC and local connectors CC to the called line in sub-office C.

In response to a subscriber in sub-office D initiating a call the incoming first selector ISD is seized in the manner previously described. In response to the calling subscriber dialling the first digit 2, the first selector ISD is operated to the second level and seizes an idle second selector S2, and in response to dialling the second digit 4 the selector S2 is operated to the fourth level to seize an idle third selector S3. In the same manner as previously described the third selector S3, Fig. 7, is operated to the third level in response to the calling subscriber dialling the third digit 3 to hunt for an idle repeater such as repeater RC (Figs. 1 and 10). Slow-to-release relay 750 restores shortly after the third digit and at contacts 752 completes the stepping circuit for the rotary magnet RM by way of contacts 745, 712, 728, 784, 752, 794 and 709. Slow-to-release relay 750 also at contacts 753 completes a circuit for operating relay 760. This circuit may be traced from battery, winding of relay 760, contacts 753, 746, 729 and 791, vertical wiper VW' and third level vertical bank contact 775, common conductor 605' and winding of relay 1070 of meter circuit MC, Fig. 10, to ground.

All of the trucks connecting the sub-office D to its present office 24 each have a metering circuit such as MD, Figs. 1 and 6, connected beteen the repeaters RD and the incoming first selector ISD. A pair of relays 600 and 603 are common to all metering circuits MD and relay 600 is connected by way of conductor 605 to the first level vertical bank contacts 771 of all the fourth selectors S4. All of the trunks connecting the sub-office C to its parent office 24 each having a metering circuit such as MC between the repeaters RC and the incoming first selectors ISC. A pair of relays 1070 and 1080 are common to all metering circuits MC and relay 1070 is connected by way of conductor 605' to the third level vertical bank contacts 775 of all the third selectors S3. The one way trunks connecting sub-office A to its parent office 24 each have a metering circuit MA between the trunks and the incoming first selector ISA and the two-way trunks connecting sub-office B to its parent office 24 each have a metering circuit MB between repeaters RB and the incoming first selectors LSB. Metering circuits MA and MB have a single pair of relays, similar to relays 1070 and 1080, common to all metering circuits MA and MB, and the relay similar to relay 1070, is connected by way of conductor 605" to the fourth level vertical bank contacts 776 of all third selectors S3.

Relay 760, upon operating, at contacts 763, substitutes holding ground through the left hand winding of induction coil 7IC for ground at contacts 762, and at contacts 761 completes a circuit including the right hand winding of induction coil 7IC and condenser to a high frequency signalling source to induce signalling current in its left hand winding and over contacts 763 and 741, control conductor 707', back over the control conductors of the second and first selectors S2 and ISD to control conductor 607 of metering circuit MD. This signalling current is transmitted through the transistor network including the tuned filter TF6, variable resistor V6, transistor T6 and through relay 640 to battery. Relay 640 is operated by the output of the transistor T6. The operation of relay 640 closes contacts 641 but accomplishes no useful result because the common relay 600 is not operated at this time to complete the circuit for relay 650. This signalling current is transmitted back to the transistor T6 to operate relay 640 during the automatic rotary hunting operation of selector S3 since the vertical wiper VW' does not rotate with wipers 701' to 703'.

When rotary magnet RM operates, it opens its own stepping circuit to step wipers 701', 702' and 703' to engage the first bank contacts in the third level terminating a repeater such as repeater RC. In case this repeater RC is busy then idle battery potential has been removed from its control conductor 1093, with the result that the rotary magnet RM steps the wipers a second rotary step.

In case the test wiper 703' of selector S3 fails to find an idle repeater in the third level, the wipers are stepped to their eleventh position in which position the cam springs 791, 792, 193 and 194 are operated. The cam springs 794 open the stepping circuit to rotary magnet RM to stop the stepping operation, the cam contacts 791 opens the circuit to relay 760 to disconnect the signalling current, and the contact 793 substitutes grounded busy tone for ground at contact 792 to transmit a busy tone back to the calling subscriber. When test wiper 703' during its rotary operation engages a bank contact terminating an idle repeater RC, idle battery potential will be connected over test conductor 1093 to test wiper 703' to operate relay 710. Assuming that repeater RC, shown diagrammatically in Fig. 10, is the first idle repeater and that conductors 1091, 1092 and 1093, which correspond to conductors 501, 502 and 503, terminate in the repeater shown in detail in Fig. 5, then relay 710 is operated over the following circuit: from ground contacts 744, winding of relay 710, wiper 703', conductor 1093 (corresponding to 503), contacts in repeater RC corresponding to contacts 554, 532 and 521 and through the resistance in repeater RC, corresponding to the resistance R51, to battery. Relay 710 at contacts 712 opens the rotary magnet circuit to stop the wipers on engagement with the idle repeater and at contacts 711 operates relay 720 by way of contacts 745. Relay 720 at contacts 726 locks over contacts 761 and 763 and through the left hand winding of induction coil 7IC to ground, at contacts 727 opens the circuit to slow-to-release relay 740, at contacts 728 opens another point in the stepping circuit to the rotary magnet RM, at contacts 725 shorts relay 710 to cause this relay to restore slowly, and at contacts 729 opens the circuit to relay 760 which restores to disconnect the signalling current and again directly ground conductor 707' at contacts 762. At contacts 721 and 723 relay 720 opens the circuit to line relay 730 which restores and at contacts 722 and 724 closes the circuit to line relay of repeater RC Fig. 10, corresponding to line relay 560. This circuit may be traced as follows: from battery and ground through the line relay, corresponding to relay 560, of repeater RC, left hand winding of repeating coil RC5, contacts 581 and 583, repeater RC, Fig. 10, conductors 1091 and 1092, wipers 701' and 702', conductors 705' and 706', over the talking conductors of second selector S2 and first selector ISD, conductors 605 and 606 of metering circuit MD, conductors 505 and 506 and contacts 511 and 514 of repeater RD over trunk conductors 401 and 402 to trunk repeater TRD, contacts 472 and 473 through the right hand winding of repeating coil RC4 and the left hand winding of shunt field relay 420 and the pulsing contacts 431 of repeater TRD.

Line relay of repeater RC, corresponding to relay 560, at contacts 562 completes a circuit to operate slow release relay 550. Relay 550 at contacts 551 completes circuits for the left hand winding of answer relay 570 and for relay 510, at contact 554 disconnects negative battery potential from conductor 1093 to mark this repeater RC busy, and at contacts 553 grounds conductor 1093 to hold relay 720 operated by way of wiper 703' and contacts 725 and 726, and to hold the preceding switches S2 and ISD and relays 670 and 630 operated.

Relay 510 of repeater RC at contacts 511 and 514 disconnects the conductors 1005 and 1006 (similar to conductors 505 and 506), extending to the metering circuit MC, and at contacts 512 and 513 connects the line relay pulsing contacts 561 and the right hand winding of answer relay 570 across the trunk conductors 988 and 989 (similar to conductors 401 and 402), extending to the sub-office C. In the sub-office C these trunk conductors terminate in the trunk repeater TRC diagrammatically shown in Fig. 9 which is similar to the repeater shown in detail in Fig. 4. Assuming now that the trunk repeater shown in Fig. 4 is repeater TRC in sub-office C then when the loop pulsing circuit is closed by the line relay contacts of repeater RC a circuit is completed over the trunk conductors 988 and 989, to sub-office C, over contacts similar to contacts 471 and 474 of repeater TRC, over conductors 893 and 895, Fig. 9, similar to conductors 305 and 306 to the line relay of the incoming selector ISC diagrammatically illustrated in Figs. 1C and 8. In the well-known manner the line and release relays of the incoming selector ISC in sub-office C operates and the release relay grounds conductor 895, which is similar to conductor 307, to thereby ground conductor 986 by way of contacts similar to contacts 444 to mark repeater TRC busy in the banks of the outgoing secondary switch OSC in sub-office C. In response to dialling the last three digits of the called subscriber line in sub-office C the incoming selector ISC and the connector CC are operated to extend the call to the called line in a well-known manner.

When the called subscriber answers the connector CC reverses battery back over the talking conductors through the fourth selector ISC in sub-office C, repeater TRC to operate shunt field answer relay, corresponding to relay 570, in repeater RC which at contacts 571 operates reversing relay 580. Relay 580 at contacts 582 and 584 reverses battery back over the talking conductors through the third selector S3, the second selector S2, the first selector ISD and metering circuit MD to operate relay 690 and through repeater RD, trunk conductors 401 and 402 to operate answer relay 420 of repeater TRD which at contacts 421 operates reversing relay 410. The reversing relay 410 reverses battery over conductors 405 and 406 to operate answer relay 270, and relay 270 locks operated to prepare the metering circuit all as previously described. Calls from subscriber lines in sub-office D to subscriber line in sub-office C are charged only one unit charge in the same manner as described for calls from sub-office D to called subscriber lines in parent office 24. That is, the relays 680 and 660 are operated and relay 670 is restored in response to the operation of answer relay 690 to send a pulse of high frequency signalling current over the talking conductors and through the transistor network to cause transistor T2 to operate relay 280 which in turn operates the calling subscriber meter for one unit charge.

After conversation and in response to the calling subscriber hanging up line relay 430 in repeater TRD restores to cause the release of the apparatus in sub-office D as previously described and at contacts 431 opens the circuit to line relay 560 of repeater RC. Relay 560 at contacts 561 of repeater RC opens the circuit to the connector CC in sub-office C to cause the connector CC and incoming fourth selector ISC in sub-office C to release in a well-known manner. In repeater RC relay 560 at contacts 562 opens a circuit to slow-to-release relay 550 and at contacts 563 closes the circuit to reoperate relays 540 and 530 before relay 550 restores. Relay 530 at contacts 532 opens another point in the circuit for marking repeater RC idle so that this repeater will not be seized before the selector switches are released. Slow-to-release relay 550 of repeater RC restores shortly after the release of relay 560 to open the circuits to relays 570 and 510 at contacts 551, at contacts 552 opens the circuit to relays 540 and 530 and at contacts 553 disconnects ground from conductor 1093 to cause the third selector S3, the second selector S2, the first selector ISD and relay 680 to restore. Relay 510 of repeater RC restores to connect the trunk conductors extending to the sub-office C to its associated metering circuit MC and shortly thereafter relay 530 restores to mark repeater RC idle by connecting battery potential by way of resistance R51, contacts 521, 532 and 554 to control conductor 1093. All of the apparatus is now restored to normal and may be used on subsequent calls.

*Outgoing calls from sub-office D to sub-office A*

Calls from subscribers' lines in sub-office D to subscribers' lines in sub-office A are extended through finder FD, repeater ORD, line switch OSD, repeaters TRD and RD, metering circuit MD, incoming first selector ISD, second selector S2, third selector S3, repeaters RB and TRB, incoming fourth selector ISB in sub-office B, bi-level repeater BRB, over the two-way trunk to sub-office A, bi-level repeater BRA, to the incoming 200 point connector ICA.

In response to a subscriber in sub-office D initiating a call, the incoming first selector ISD is seized and in response to dialling the first two digits 2 and 4 the first selector ISD and the second selector S2 are operated in the well-known manner to seize a third selector S3. In the same manner as previously described the third selector S3 is operated to the fourth level in response to dialling the third digit 4 to cause the selector S3 to hunt for an idle repeater RB. Assuming now that the repeater shown in detail in Fig. 5 is the first idle repeater RB of Fig. 18, then the selector 3 seizes this repeater RB over the fourth level bank contacts and conductors 1891, 1892 and 1893 and operates line relay 560 of repeater RB over the talking conductors 1891 and 1892, contacts 581 and 583 and right hand winding of repeating coil RC5 when the switch-through relay 720 of selector S3 switches through in a manner simialr to that previously described.

In the third selector S3 and shortly after dialling the third digit 4 the slow-to-release relay 750 restores and at contacts 753 completes a circuit for operating relay 760 by way of contacts 746, 729, 791, vertical wiper VW' and this time by way of the fourth level vertical bank contacts 776 and conductor 605" to a relay similar to relay 1070 in metering circuit MB (Fig. 18). Relay 760 at contacts 763 substitutes holding ground through the left hand winding of induction coil 7IC for ground at contacts 762 to hold switches S2 and ISD and relays 630, 670 and 520 operated. At contacts 761 relay 760 closes a circuit through the right hand winding of induction coil IC to induce a high frequency signalling current over contacts 763 and 741, over conductor 707' back over the control conductors of selectors S2 and ISD to control conductor 607 of metering circuit MD, Fig. 6. This signalling current is transmitted through the transistor network including the tuned filter TF6, variable resistor V6 and transistor T6, to cause relay 640 to operate. The operation of relay 640 is without result on this call.

The line relay of repeater RB (Fig. 18) corresponding to relay 560, at contacts 562 completes the circuit for operating relay 550. Relay 550 of repeater RB at contacts 551 completes circuits for relays 570 and 510, at contacts 554 disconnects negative battery potential from conductor 1893 to mark this repeater RB busy, and at contacts 553 grounds control conductor 1893 to hold relays 720, 630, 760 and 520 and selectors S2 and ISD operated. Relay 510 of repeater RB at contacts 611' and 514' (Fig. 18) disconnects conductors 1805 and 1806 extending to the metering circuit MB, and at contacts 512' and 513' connects the line relay pulsing contacts 561 and right hand winding of answer relay 570 across the trunk conductors 1801 and 1802 extending to sub-office B. In the sub-office B trunk conductors 1801 and 1802 extend by way of contacts 471' and 474' of repeater TRB to the windings of the line relay in the incoming fourth selector ISB in sub-office B. In selector ISB the line and release relays operate in the well-known manner and the release relay grounds conductor 1819 (corresponding to conductor 307 of Fig. 4) to mark repeater TRB busy to the outgoing secondary line switch OSB.

The calling subscriber now dials the fourth digit 3 to operate wipers 1884, 1885 and 1886 of selector ISB in a well-known manner to the third level to cause this selector to rotate and seize an idle repeater such as repeater BRB shown in Fig. 14. The repeater BRB is marked idle by negative battery potential extending over contacts 1471 and 1451 and control conductor 1833 terminating in the third level bank contact engaged by wiper 1885 over selector ISB. When selector ISB switches through and seizes bi-level repeater BRB the line relay 1440 and relay 1410 are operated over the following circuit: from battery and ground through the upper and lower windings of relay 1440, left hand windings of the repeating coil RC14, contacts 1421 and 1423, winding of relay 1410, talking conductors 1831 and 1832, wipers 1884 and 1886 of selector ISB, conductors 1817 and 1818, contacts 471' and 474' of repeater TRB, trunk conductors 1801 and 1802, contacts 512' and 513' of repeater RB (corresponding to contacts 512 and 513 of Fig. 5), impulsing contacts 561, right hand windings of repeating coil RC and right hand winding of answer relay 570 of repeater RB. Line relay 1440 at contacts 1441 prepares a pulsing circuit for the 200 point connector ICA in the sub-office A, and at contacts 1442 operates relay 1450. Relay 1410 at contacts 1411 and 1412 prepares a circuit for connecting a high frequency source of current to the trunk conductors 1401 and 1402 extending to sub-office A. Relay 1450 at contacts 1451 disconnects negative battery potential from control conductors 1843 and 1833 to mark this bi-level repeater busy, at contacts 1452 grounds conductor 1833 to hold the incoming selector ISB operated, and at contacts 1454 operates relay 1480. Relay 1480 at contacts 1481 and 1486 disconnects the trunk conductors 1401 and 1402 from conductors 1595' and 1596' extending to connector ICB, at contacts 1484 disconnects control conductor 1597', and at contacts 1483 prepares a circuit for operating relay 1470 in multiple with relay 1460. At contacts 1487 relay 1480 short circuits relay 1410 to make it slow-to-release and at contacts 1482 and 1485 connects the high frequency source of signalling current to trunk conductors 1401 and 1402. Relay 1480 at contacts 1482 and 1485 also completes a circuit for operating line relay 1520 of the incoming connector ICA (Fig. 15) in sub-office A. Relay 1410, due to its short circuit at contacts 1487, falls back slowly and when fully restored contacts 1411 and 1412 disconnects the high frequency signalling current from the trunk conductors 1401 and 1402. The seizure of the bi-level repeater BRB over the third level of selector ISB has caused relay 1410 to operate and slowly restore to transmit a pulse of high frequency over trunk conductors 1401 and 1402 to cause the 200 point incoming connector ICA in sub-office A to select its alternate set of wipers as will be more fully described shortly.

The circuit for operating the line relay 1520 of the incoming connector ICA in sub-office A may be traced as follows: from the winding of answer relay 1430 and rectifier R14, which is connected in shunt of relay 1430 so that relay 1430 will operate only in response to the receipt of reverse current when the called party answers, right hand windings of repeating coil RC14, pulsing contacts 1441 of line relay 1440, contacts 1482 and 1485, trunk conductors 1401 and 1402 extending to the bi-level repeater BRA in sub-office A (Fig. 19), contacts 1481' and 1486' of bi-level repeated BRA, conductors 1595 and 1596, contacts 1511 and 1513, Fig. 15, and upper and lower windings of line relay 1520 to battery and ground.

Line relay 1520 at contacts 1521 completes a circuit for operating release relay 1530. Relay 1530 at contacts 1532 grounds conductor 1597 to operate relay 1470 in bi-level repeater BRA. The relay 1470 in repeater BRA at contacts 1471 disconnects idle negative battery potential from test conductors 1933 and 1943 (Fig. 19) to mark repeater BRA busy in the banks of the local fourth selectors LSA in sub-office A. At contacts 1534 relay 1530 opens a point in the circuit of the connector release magnet RLS, at contacts 1533 prepares a point in the pulsing circuits and also at contacts 1532 operates slow-to-release relay 1540 by way of vertical off-normal contacts 1527. Relay 1540 at contacts 1542 prepares the pulsing circuit to the vertical magnet VM and at contacts 1541 connects the primary winding of the induction coil 151C to the talking conductors 1595 and 1596. The pulse of high frequency signalling current connected to conductors 1401 and 1402 by relay 1410 of repeater BRB is now transmitted by way of contacts 1481' and 1486' of Fig. 19, conductors 1595 and 1596 of Fig. 15, condensers C151 and C152, contacts 1541 and through the primary winding of induction coil 151C and associated condenser. This pulse of high frequency signalling current is induced into the secondary winding of induction coil 151C and through the transistor network including the tuned filter TF15 and variable resistor V15 to transistor T15. The transistor T15 amplifies this signalling current to cause the operation of relay 1590. Relay 1590 at contacts 1591 completes the circuit for operating relay 1500 from ground at contacts 1532. Relay 1500 at contacts 1507 locks itself to ground at contacts 1532, at contacts 1501, 1502 and 1503 disconnects the normally connected set of wipers, and at contacts 1504, 1505 and 1506 connects the alternate set comprising wipers 1535, 1536 and 1537.

The calling subscriber in sub-office D now dials the last two digits of the called line and the line relay 430 of repeater TRD at contacts 431 repeats the dialled digits over the talking conductors extending through repeater RD, metering circuit MD, selectors ISD, S2 and S3 to the line relay 560 in repeater RB in Fig. 18. The line relay 560 of repeater RB at contacts 561 repeats the dialled digits over conductors 1801 and 1802, 1817 and 1818, wipers 1884 and 1886, conductors 1831 and 1832, contacts 1421, 1487 and 1423, left hand windings of the repeating coil RC14 to the line relay 1440 of repeater BRB, Fig. 14. The line relay 1440 at contacts 1441 repeats the dialled digits over contacts 1482 and 1485, conductors 1401 and 1402 extending to repeater BRA, Fig. 19, contacts 1481' and 1486', conductors 1595 and 1596, Fig. 15, contacts 1511 and 1513 and windings of line relay 1520 of connector ICA. In response to the first of these two last digits line relay 1520 at contacts 1522 pulses the vertical magnet VM by way of contacts 1533 and 1542 to step the wipers vertically opposite the bank level corresponding to the dialled digit. A branch of this pulsing circuit extends through the lower winding of slow-to-release relay 1540 to maintain relay 1540 operated during the vertical movement. On the first vertical step off-normal contacts 1527 open the original circuit through the upper winding of relay 1540 which is now held through its lower winding during pulsing. Vertical off-normal contacts 1528 closes on the first vertical step to prepare the circuit to the release magnet RLS. Shortly after the vertical operation, slow-to-release relay 1540 restores to prepare the pulsing circuit to the rotary magnet. In response to the last dialled digit rotary magnet RM is operated by line relay 1520 over the following circuit: from ground contacts 1522, 1533, 1543, 1564 and 1585 and winding of rotary magnet RM to battery. A branch of this circuit also operates slow-to-release relay 1570.

Relay 1570 at contacts 1571 opens the circuit to the switching relay 1580, at contacts 1572 prepares a circuit to the busy relay 1560, and at contacts 1574 closes another point in the rotary stepping circuit to maintain this circuit in case the busy relay 1560 is operated while test wiper 1537 is passing over grounded bank contacts. The wipers of the connector ICA are rotated to the bank contacts terminating the called line and if the called line is busy there will be a ground on conductor 1973 for operating busy relay 1560 by way of wiper 1537, contacts 1506 and 1572. Slow-to-release relay 1570 restores shortly after the dialling of the last digit and at contacts 1573 completes a locking circuit for busy relay 1560 by way of contacts 1563 and 1531. Busy relay 1560 at contacts 1561 connects a busy tone source to the talking conductor 1596 by way of condenser C152 to thereby transmit busy tone back over the talking conductors and repeating coils to the calling subscriber in a well-known manner.

In case the called line is idle then conductor 1973 is not grounded and conductor 1973 is connected to negative battery potential through the winding of the cut-off relay of the called line circuit LC in a well-known manner with the result that busy relay is not operated before the slow-to-release relay 1570 restores. When slow-to-release relay 1570 restores, a circuit is completed for operating the switching relay 1580 in series with the cut-off relay of the called line as follows: from ground contacts 1531 and 1562, upper winding of switching relay 1580, contacts 1571 and 1506, wiper 1537, conductor 1973 and through the winding of the cut-off relay (not shown) of the line circuit LC to battery.

Switching relay 1580 at contacts 1587 completes a circuit through its lower winding to ground at contacts 1532 to fully operate its other contacts and to lock itself operated. At contacts 1586 relay 1580 opens a circuit to the release magnet RLS, at contacts 1585 opens the circuit to the rotary magnet RM, and at contacts 1584 grounds wiper 1537 and conductor 1973 to mark the called line busy. At contacts 1581 relay 1580 connects ring back tone by way of contacts 1552 and condenser C151 to the negative talking conductor 1595 to advise the calling party that the called party is being rung. At contacts 1582 and 1583 relay 1580 connects ringing current to the called line as follows: from ringing generator GEN, lower winding of ring cut-off relay 1550, contacts 1551, 1582 and 1504, wiper 1535, conductor 1971, line circuit LC, through the ringer at substation A2 back through the line circuit LC, conductor 1972, wiper 1536, contacts 1505, 1583 and 1554 to ground.

When the called subscriber A2 answers, ring cut-off relay 1550 is energized over its lower winding to close contacts 1556 to thereby fully operate relay 1550 over its upper winding to ground at contacts 1584. Ring cut-off relay 1550 at contacts 1551 and 1554 opens the ringing circuit, at contacts 1552 disconnects the ring back tone, and at contacts 1553 and 1555 operates the back bridge relay 1510 over the following circuit: from ground and battery through the lower and upper windings of the back bridge relay 1510, contacts 1553 and 1555, 1582 and 1583, 1504 and 1505, wipers 1535 and 1536, conductors 1971 and 1972, through the line circuit LC and over the closed loop at the called substation A2.

Relay 1510 at contacts 1512 and 1514 reverse battery back over conductors 1595 and 1596, contacts 1481' and 1486' of bi-level repeater BRA (Fig. 19), conductors 1401 and 1402, contacts 1482 and 1485 of bi-level repeater BRB (Fig. 14), contacts 1441, right hand winding of repeating coil RC14 and through the winding of answer relay 1430. The rectifier R14 is poled in a direction to block this reversal of current thereby causing relay 1430 to operate. Relay 1430 at contacts 1431 operates reversing relay 1420 and relay 1420 at contacts 1422 and 1424 reverses battery back over conductors 1831 and 1832, wipers 1884 and 1886 of selector ISB, Fig. 18, conductors 1817 and 1818, contacts 471' and 474' of repeater TRB, trunk conductors 1801 and 1802, contacts 512' and 513' of repeater RB (corresponding to contacts 512 and 513 of Fig. 5), pulsing contacts 561, right hand winding of repeating coil RC5 and left hand winding of answer relay 570 of repeater RB. Relay 570 operates reversing relay 580 of repeater RB and the latter relay reverses battery back over talking conductors 1891 and 1892 (Figs. 18 and 7), wipers 701' and 702' of selector S3, conductors 705' and 706', talking conductors of selectors S2 and ISD to operate answer relay 690 of metering circuit MD (Fig. 6) and answer relay 420 of repeater TRD in a manner apparent from the foregoing description. In the same manner as previously described relay 420 of repeater TRD operates reversing relay 410 to reverse battery back over conductors 405 and 406 to operate answer relay 270 to prepare the metering circuit. Calls from subscribers' lines in sub-office D to called lines in sub-offices A and B are charged only one unit charge in the same manner as previously described. That is, the relays 680 and 660 are operated and relay 670 is restored in response to the operation of answer relay 690 to send a pulse of high frequency signalling current over the talking conductors and through the transistor network to cause transistor T2 to operate relay 280 which in turn operates the calling subscriber's meter for one unit charge.

After conversation and in response to the calling subscriber hanging up, line relay 430 in repeater TRD restores to cause the release of the apparatus in sub-office D as previously described, and at contacts 431 opens the circuit to line relay 560 of repeater RB. Relay 560 of repeater RB at contacts 561 opens the circuit to the line relay 1440 of repeater BRB in sub-office B. At contacts 1442 relay 1440 opens a circuit to slow-to-release relay 1450 and at contacts 1443 reoperates relays 1460 and 1470 by way of contacts 1453 and 1483. At contacts 1441 relay 1440 opens a circuit to the line relay 1520 of connector ICA in sub-office A. The reoperation of relay 1470 at contacts 1471 keeps negative battery potential off of the control conductors 1843 and 1833 during the release to prevent reseizure of the repeater BRB until all switches have had time to restore. Slow-to-release relay 1450 restores shortly after line relay 1440 restores and at contacts 1452 disconnects ground from conductor 1833 to cause the selector ISB to restore and disconnect ground from conductors 1819 and 1807 to remove the busy marking of repeater TRB in the banks of the outgoing secondary OSB. Shortly after release relay 1450 restores, relay 1470 restores and at contacts 1471 connect the idle battery potential by way of contacts 1471 to conductors 1843 and 1833 so that this repeater may be seized again.

In a manner similar to that previously described slow-to-release relay 550 of repeater RB restores in response to the restoration of line relay 560 to cause the release of selectors S3, S2 and ISD and the restoration of relay 680.

Calls to subscriber line A1 in sub-office A from subscriber lines in sub-office D are completed in a similar manner as just described for a call to subscriber lines A2 except that the fourth digit dialled to extend a call to subscriber line A1 is digit 5 instead of digit 3 on a call to line A2. In this case the fourth digit 5 operates the incoming fourth selector ISB, Fig. 18, to cause the wipers 1884, 1885 and 1886 to seize repeater BRB, Fig. 14, over the fourth level conductors 1841, 1842 and 1843 instead of over conductors 1831, 1832 and 1833 as previously described. When bi-level repeater BRB is seized over conductors 1841 and 1842, relay 1410 is not included in the circuit to line relay 1440 and therefore does not operate with the result that no pulse of high frequency signalling current is sent over conductors 1401 and 1402 and relay 1590 of connector ICA is not operated. With relay 1590 normal, the normal set of connector wipers 1524, 1525 and 1526 are used to complete the connection to the called line A1 over conductors 1975, 1976 and 1977 in a manner similar to that described in a call to line A2.

When the called subscriber A1 answers, relays 1520 and 1510 cause a reversal of battery to be sent back as previously described to prepare the metering circuit after which a pulse of high frequency signalling current is transmitted to cause transistor T2 to operate relay 280 to register one unit charge on the calling subscriber's meter. The release of this last established connection to subscriber's line A1 is similar to that described for the connection established to subscriber line A2.

*Outgoing calls from sub-office D to sub-office B*

Calls from subscriber lines in sub-office D to subscriber lines in sub-office B are extended through the finder FD, repeater ORD, line switch OSD, repeaters TRD and RD, metering circuit MD, incoming first selector ISD, second selector S2, third selector S3, repeaters RB and TRB to the incoming local selector ISB in sub-office B in the same manner as described for calls from subscriber lines in sub-office D to subscriber lines in sub-office A. In this case, assuming that the call is being extended to subscriber line B1 then the incoming selector wipers 1884, 1885 and 1886, Fig. 18, are operated to the second level in response to the calling party dialling the fourth digit 2 to seize connector CB2. Connector CB2 is operated in the well-known manner in response to the last two digits of the called number to extend the connection over wipers 1861, 1862 and 1863 and conductors 1875, 1876 and 1877 to ring the called line B1. When the called subscriber B1 answers the connector CB2 reverses battery back over the talking conductors 1851 and 1853, wipers 1884 and 1886 of selector ISB, conductors 1817 and 1818, contacts 471' and 474' of repeater TRB, trunk conductors 1801 and 1802, contacts 512' and 513' to operate answer relay 570 of repeater RB. In the same manner as previously described the operation of relay 570 of repeater RB causes the operation of answer relay 270 in repeater ORD in sub-office D to prepare the metering circuit and the transmission of a pulse of high frequency signalling current by relays 660 and 670 to transistor T2 to operate meter relay 280 which operates the calling subscriber's meter for one unit charge.

Assuming now that the call from sub-office D is to be extended to the called line B2 instead of B1 in sub-office B, then the connection is extended to selector ISB in sub-office B in the same manner as described for the call to line B1 except that the incoming selector ISB is operated to the first level in response to the calling party dialling the fourth digit, to seize connector CB1 over conductors 1854, 1855 and 1856. Connector CB1 is operated in the well-known manner in response to the last two dialled digits to extend the connection over wipers 1864, 1865 and 1866 and conductors 1871, 1872 and 1873 to line circuit LC after which the connector rings the called subscriber B2. When the called subscriber B2 answers, connector CB1 reverses battery back over the talking conductors 1854 and 1856 to operate answer relay 570 of repeater RB which causes the calling subscriber's meter to be operated for one unit charge in the same manner as previously described.

*Local calls within sub-office D*

Local calls between subscriber lines in sub-office D are initially extended through finder FD, repeater ORD, line switch OSD, repeater TRD in sub-office D, over the trunk conductors to the parent office, metering circuit MD, incoming first selector ISD, second selector S2, third selector S3 and the fourth selector S4 in a manner similar to that previously described. In response to the calling subscriber dialling the fourth digit 1 the fourth selector S4, Fig. 7, is operated to the first vertical level and the wipers 701, 702 and 703 are rotated when relay 750 of selector S4 restores to hunt for an idle repeater as previously described. The vertical wiper VW is operated to engage vertical bank contacts 771 and when relay 750 of selector S4 restores a circuit is completed for operating relay 760 of selector S4 and the common relay 600, associated with the metering circuits MD, in series. This circuit may be traced as follows: battery winding of relay 760, contacts 753, 746, 729 and 791, first level vertical bank contacts 771 and vertical wiper VW, common conductor 605, and winding of common relay 600 to ground.

Relay 600 at contacts 601 grounds conductor 608, common to all metering circuits MD, by way of contacts 602 to prepare an operating circuit for relay 650. Relay 760 of selector S4 at contacts 763 substitutes holding ground through the secondary winding of induction coil 7IC to conductors 707 to hold the preceding selectors S3, S2 and ISD operated. At contacts 761 relay 760 connects ground through the primary winding of the induction coil 7IC to a source of high frequency signalling current to induce a high frequency signalling current in its secondary winding. This induced signalling current is transmitted through contacts 763 and 741 and over control conductor 707 of selector S4, the control conductors of selectors S3, S2 and ISD to control conductor 607 of metering circuit MD, and through the transistor network including tuned filter TF6 and variable resistor V6 to transistor T6. The transistor T6 amplifies this signalling current to cause relay 640 to operate. Relay 640 at contacts 641 completes the circuit for operating relay 650 as follows: from ground, contacts 601, 602 and 641, and the lower winding of relay 650 to battery. Relay 650 at contacts 653 locks itself through its upper winding to grounded conductor 607, at contacts 654 operates common relay 603 over common conductor 609, and at contacts 651 and 652 connects the source of high frequency signalling current to the line conductors 506 and 505. The common relay 603 operates and at contacts 602 disconnects ground from common conductor 608 to prevent operation of other relays, similar to relay 650, in the other metering circuits in case other relays, similar to relay 640, in the other metering circuits should become operated at this time.

Figure 2:
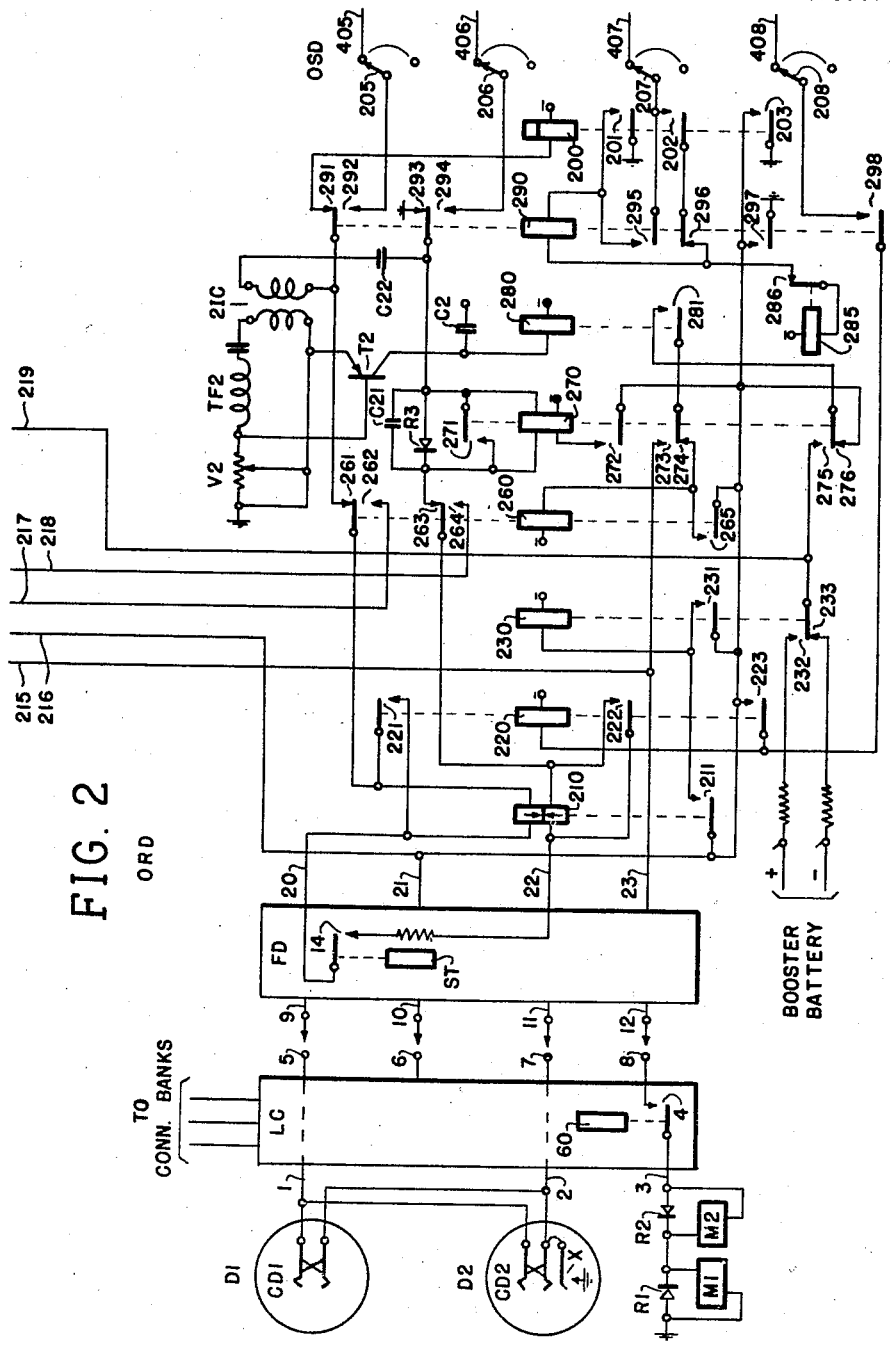

The high frequency signalling current connected to conductors 505 and 506 by contacts 652 and 651 is transmitted by way of contacts 511 and 514 of repeater RD, Fig. 5, trunk conductors 401 and 402 back to sub-office D, contacts 472, 431 and 473 of repeater TRD, Fig. 4, through the repeat coil RC4 to conductors 405 and 406, over wipers 205 and 206 of line switch ORD, Fig. 2, contacts 292 and 294 and primary winding of induction coil 2IC and condenser C22. This signalling current is induced into the secondary winding of induction coil 2IC and through the transistor network including the tuned filter TF2 and variable resistor V2 to transistor T2. Transistor T2 amplifies this signalling current to operate relay 280 as previously described. It should be noted at this time that the answer relay 270 is not operated and when relay 280 now operates and closes contacts 281 a circuit is completed for operating the switching relay 260 instead of operating the calling subscriber's meter. The circuit for operating switching relay 260 may be traced as follows: from ground at contacts 297, 276, 281 and 274 and the winding of switching relay 260 to battery. Relay 260 at contacts 265 locks itself over contacts 297 and at contacts 261 and 263 disconnects the calling subscriber's loop from line relay 430 of repeater RD to cause line relay 430 to restore. At contacts 262 and 264 relay 260 connects the calling subscriber's loop to line relay 320 of the local connector LCD, Fig. 3. A circuit for operating line relay 320 of connector LCD may be traced as follows: from ground and battery through the upper and lower windings of line relay 320, contacts 313 and 311, conductors 218 and 217, contacts 264 and 262, contacts 222 and 221, conductors 22 and 20, over the talking conductors of the finder FD and line circuit LC and the line conductors of the calling line.

Line relay 430 of repeater TRD, Fig. 4, upon restoring in response to the operation of switching relay 260, at contacts 431 opens the repeating loop extending over the trunk conductors 401 and 402 to the parent office to open the circuit to line relay 730 of selector S4, if such selector has not yet switched through to an idle repeater RD, or opens the circuit to the line relay of the seized repeater RD in case selector S4 has switched through and seized such a repeater. In either case the opening of the repeating loop at contacts 431 by line relay 430 of repeater TRD causes all the apparatus including the selectors S4, S3, S2 and ISD in the parent office to restore to normal.

From the foregoing description it will be seen that, when a subscriber in the sub-office D calls another subscriber line terminating in the same sub-office D, the relay 760 of selector S4 in the parent office transmits high frequency signalling current back over the control conductors of the operated selector switches S4, S3, S2 and ISD to the metering circuit MD to operate relay 640 through transistor T6, and that relay 640 then transmits high frequency signalling current over the talking conductors to repeater ORD in sub-office D to operate relay 280 which causes switching relay 260 to operate and switch the calling line to the local connector LDC in sub-office D and disconnect the calling line from the parent office to release all of the apparatus in the parent office.

The above-described local switch-over of the calling line to the local connector LCD occurs during the inter-digital pause between the dialling of the fourth and fifth digits and as this interval is rather short the relay 340 of the local connector is initially operated as previously described as soon as relay 200 operates on the initiation of a call regardless of its destination to prepare the circuit for operating the vertical magnet in case such a local connector may be used later on in a local call.

When the line relay 320 of the local connector LCD, Fig. 3, operated in response to the operation of the switching relay 260, line relay 320 at contacts 321 completes the circuit to operate slow-to-release relay 330. Relay 330 at contacts 331 maintains slow-to-release relay 340 operated by way of vertical off-normal contacts 394 and ground conductor 216 to maintain relays 230 and 260 operated before relay 290 restores and disconnects ground at contacts 297 from conductor 21. The relay 290 restores when ground is removed from conductor 407 by slow-to-release relay 440 restoring shortly after line relay 430 restores.

The calling subscriber may now dial the last two digits of the called number. In response to the calling subscriber dialling the fifth digit line relay 320 follows the pulses of the dialled digit and at contacts 322 pulses the vertical magnet VM over the following circuit: ground contacts 322, 333, 387 and 342 through the winding of vertical magnet VM to battery. The vertical magnet in a well-known manner operates the connector wipers opposite the level dialled. Relay 330, being slow-to-release, is held operated during the dialling. A branch of the pulsing circuit extends through the lower winding of slow-to-release relay 340 to maintain this relay operated during dialling of the fifth digit after the vertical off-normal contacts 394 open on the first vertical step of the connector wipers. Slow-to-release relay 340 restores after the fifth digit and during the inter-digital pause to open the pulsing circuit to the vertical magnet at contacts 342 and at contacts 343 prepares the pulsing circuit for the rotary magnet RM.

In response to the calling subscriber dialling the last, or sixth digit, line relay 320 pulses rotary magnet RM over the following circuit: ground contacts 322, 333, 387, 343 and 364 and through the winding of rotary magnet RM to battery. A branch of this circuit operates slow-to-release relay 370 which is maintained operated during the rotary movement. The rotary magnet RM rotates the connector wipers in the selected level to the bank contacts of the called line. Relay 370 at contacts 374 shunts contacts 364 of busy relay 360 to prevent the busy relay from opening the rotary pulsing circuit while test wiper 393 is passing over grounded bank contacts. At contacts 373 relay 370 prepares a circuit for the busy relay 360.

In case the called line is busy, then test wiper 393 engages a grounded bank contact to operate busy relay 360 by way of contacts 373 before the slow-to-release relay 370 restores. Busy relay 360 at contacts 363 completes a locking circuit for itself by way of contacts 332 and 371 when the slow-to-release relay 370 restores shortly after the rotary movement. At contacts 364 relay 360 opens a point in the rotary magnet circuit and at contacts 361 connects busy tone over conductor 218, contacts 264 and 222 to conductor 22 and to the calling line to advise the calling subscriber that the called line is busy.

In case the called line is idle, then test wiper 393 will be connected to a bank contact having negative battery potential thereon and switching relay 380 is energized in series with the cut-off relay of the called line circuit LC as follows: ground contacts 332, 362, upper winding of relay 380, contacts 372, wiper 393, bank contact 73, winding of the cut-off relay (not shown) of the called line circuit LC to battery. Switching relay 380 closes its X contacts 385 to complete a circuit through its lower winding from ground at contacts 331 to fully operate relay 380. At contacts 388 relay 380 opens the circuits to the release magnet RLS, at contacts 387 opens the circuit to the rotary magnet, and at contacts 386 grounds wiper 393 to hold the cut-off relay of the line circuit operated and to mark the called line busy. Relay 380 at contacts 384 completes a circuit for reoperating slow-to-release relay 340 by way of contacts 357 and at contacts 381 connects ring-back tone by way of contacts 351, conductor 217, contacts 262 and 221 to conductor 20 to transmit the ring-back tone to the calling subscriber. At contacts 382 and 383 relay 380 connects ringing current to the called line over the following circuit: from ring generator GEN through the lower winding of ring cut-off relay 350, contacts 352 and 382, wiper 391, bank contact 71, through the line circuit LC, conductor 50 through the ringer at the called subscriber's station back over conductor 60 through the line circuit LC, bank contacts 72, wiper 392 and contacts 383 and 354 to ground.

When the called party answers, ring-cut-off relay 350 is operated over the ringing circuit to close its X contacts 358 to close a circuit through its upper winding to fully operate relay 350. Relay 350 at contacts 357 opens the circuit to the slow-to-release relay 340, at contacts 352 and 354 opens the ringing circuit, at contacts 353 and 355 connects the calling line to the called line and operates back-bridge relay 310, at contacts 351 disconnects ring-back tone and at contacts 356 close the circuit for operating the calling subscriber's meter M2 over the following circuit: from positive pole of booster battery contacts 232, conductor 219, contacts 356 and 341, conductor 215 to the meter conductor 23, finder wiper 12, bank contact 8, contacts 4 of cut-off relay CO, conductor 3 through the winding of meter M2 and through the rectifier R1 to ground. The rectifier R2 is poled in such a direction that the current in the circuit just traced passes through the winding of the meter M2 since it is blocked by the rectifier R2. In case subscriber D1 is the calling subscriber, instead of subscriber D2, then it will be remembered that relay 210 is not operated and therefore relay 230 is not locked operated in which case the circuit for operating meter M1 of the calling subscriber line D1 extends from the negative pole of booster battery instead of from the positive pole. Slow-to-release relay 340 restores shortly after its circuit is opened at contacts 357 by the ring cut-off relay 350 and at contacts 341 opens the meter circuit.

After conversation and in response to the calling subscriber hanging up his receiver, line relay 320 restores and opens the circuit to slow-to-release relay 350. Slow-to-release relay 330 restores after an interval and at contacts 331 disconnects ground from conductor 216 to restore relays 220, 230, 260 and 380, and disconnects ground from conductor 21 to release the finder FD and cut-off relay CO of the calling line. Relay 380 at contacts 386 disconnects ground from wiper 393 and opens the locking circuit of ring cut-off relay 350 which restores. At contacts 388 relay 380 completes the circuit for operating the release magnet as follows: ground contacts 322, 334, 388 and 395 and the winding of release magnet RLS to battery. The operation of the release magnet RLS restores the wipers of the connector LCD to normal and when the wipers are fully restored the vertical off-normal contacts 395 opens the circuit to the release magnet RLS. All of the apparatus is now fully restored and may be used on subsequent calls.

*Outgoing calls from sub-office C to parent office 24*

Calls from subscriber lines in sub-office C to any called line in the system are initially extended through the finder FC, repeater ORC, outgoing line switch OSC and trunk repeater TRC in sub-office C, over the trunk conductors 988 and 989 to repeater RC in parent office 24, and metering circuit MC to the incoming first selector ISC.

In response to subscriber C2, Fig. 9, removing his receiver, the line relay of his associated line circuit is operated to cause the finder FC to operate and find and connect the calling line to repeater ORC over the finder wipers 109, 110, 111 and 112 and conductors 915, 916, 917, 918 in a well-known manner. The finder FC during its hunting operation closes a resistance loop circuit across conductors 915 and 916 to operate relay 900 as follows: ground contacts 993 and 936, rectifier R9, lower winding of differential relay 910, conductor 916 through the resistance loop in the finder FC to conductor 915, upper winding of differential relay 910, contacts 961 and 991 and the winding of relay 900 to battery. Relay 900 at contacts 903 grounds conductor 917 to hold the finder FC and the cut-off relay of the line circuit LC operated, at contacts 902 prepares the stepping circuit for stepping magnet 983 of the outgoing secondary OSC, and at contacts 901 prepares the circuit for relay 990. Contacts 903 also grounds conductor 803 to operate relay 850 of local selector LSC by way of vertical off-normal contacts 861 to prepare the circuit to the vertical magnet of selector LSC. The operation of the outgoing secondary line switch OSC depends upon whether test wiper 906 engages a bank contact terminating a busy repeater TRC in which case the test conductor, such as conductor 986, will be grounded to short circuit relay 990 by way of contacts 902 and 996 to prevent its operation, and at the same time completes a circuit by way of wiper 906, contacts 902, 996 and 982 for operating magnet 983. Stepping magnet 983 at its contacts 982 interrupts its own circuit to step the wipers to the next set of bank contacts to again test for an idle repeater TRC. Assuming now that trunk repeater TRC, Fig. 9, is idle, then test conductor 986 is not grounded and no circuit is completed for stepping magnet 983 and relay 990 is not short circuited. In this case relay 990 is operated from ground at contacts 901, winding of relay 990, interrupter contacts 982 and winding of magnet 983 to battery. Due to the high resistance of relay 990 the magnet 983 is not operated in this circuit. Relay 990 at contacts 997 grounds conductor 917 to hold relay 850 and the finder FC operated, at contacts 996 opens the stepping circuit to magnet 983, at contacts 995 prepares a locking circuit for itself which is completed before the slow-to-release relay 900 restores, at contacts 991 and 993 opens the circuit to the slow-to-release relay 900, and at contacts 992 and 994 completes a circuit over the calling subscriber's loop and conductors 984 and 985 for operating the line relay of repeater TRC. Assuming now that the repeater shown in detail in Fig. 4 is the repeater TRC, instead of repeater TRD, then the calling subscriber's loop is extended by way of conductors 984 and 985, contacts 411 and 413, left hand winding of repeating coil RC4, and through the upper and lower windings of line relay 430 to battery and ground. Line relay 430 of repeater TRC operates its release relay 440 by way of contacts 432. Relay 440 at contacts 441 energizes the right hand winding of shunt field answer relay 420 and operates relay 470, at contacts 444 disconnects test conductor 986 from conductor 894 extending to incoming selector ISC, Fig. 8, and at contacts 443 grounds conductor 986 to mark this repeater TRC busy and to complete the locking circuit for relay 990 before the slow-to-release relay 900 is fully restored.

In repeater TRC, relay 470 at contacts 471 and 474 disconnects the conductors 893 and 895 extending to the incoming selector ISC, Fig. 8, and at contacts 472 and 473 completes a pulsing circuit over the trunk conductor 988 and 989 extending to the parent office 24 and through the repeater RC and metering circuit MC to the line relay of the incoming first selector ISC in the parent office. This pulsing circuit may be traced as follows: from battery and ground through the winding of line relay (not shown) of incoming selector ISC, conductors 1001 and 1002, rectifier R10, conductors 1005 and 1006 extending to repeater RC (corresponding to conductors 505 and 506 of Fig. 5), contacts 511 and 514 of repeater RC, Fig. 10, and trunk conductors 988 and 989 connected to operator TRC, Fig. 9, contacts 472 and 473 of repeater TRC, pulsing contacts 431, left hand windings of repeating coil RC4 and left hand winding of answer relay 420.

In the incoming first selector ISC the line and release relays operate in the well-known manner to ground conductors 1003 and 1007. Ground on conductor 1007 operates a relay in repeater RC, corresponding to relay 520, to remove the idle battery potential to mark repeater RC busy to selectors having access thereto. Ground on conductor 1003 completes a circuit by way of contacts 1063 for operating relay 1030 to prepare for forceably releasing the connection in case the call is not answered within a predetermined time.

The calling line C2 is now connected to the incoming first selector ISC in the parent office 24 and dial tone is transmitted back to the calling subscriber in a well-known manner. Calling subscriber C2 may now dial the called subscriber line P2 in the parent office 24. The line relay 430 of repeater TRC follows the impulses dialled by the calling subscriber to repeat such pulses at contacts 431 to operate the incoming first selector ISC in a well-known manner to select a second selector S2.

During the operation of the calling device CD2 of the calling subscriber C2 for the first digit, the X contacts of the calling device CD2 grounds conductor 102 to short circuit the lower winding of differential relay 910. This short circuit may be traced from ground at X contacts of CD2, conductor 102, bank contacts 107, wiper 111, conductor 916, lower winding of differential relay 910, rectifier R9, contacts 963 and 994, wiper 905, conductor 985, contacts 413 of repeater TRC, lower left hand winding of repeating coil RC4 and lower winding of line relay 430 to ground. Differential relay 910 now operates over its upper winding alone and at contacts 911 operates relay 930 from grounded conductor 917. Relay 930 locks over contacts 931 and at contacts 932 prepares a circuit from positive pole of booster battery for subsequently operating the calling subscriber's meter MC2. In case the calling subscriber was C1, instead of C2, then since the calling device CD1 does not ground conductor 102, then relays 910 and 930 are not operated so that the negative pole of booster battery is utilized for operating meter MC1 individual to subscriber line C1 during the metering operation.

In repeater TRC relays 450, 460 and 480 are operated in the same manner as previously described for repeater TRD and during the interval relay 460 is restored and relay 480 is operated, a momentary ground pulse is transmitted from repeater TRC to operate relay 920. The circuit for operating relay 920 may be traced as follows: from ground at contacts 441 of repeater TRC, contacts 464 and 481, conductor 987, wiper 907, contacts 998, and the winding of relay 920 to battery. Relay 920 locks by way of contacts 923 to grounded conductor 917 and at contacts 921 and 299 short circuits the winding of differential relay 910.

After seizure of the second selector S2 and in response to the calling subscriber dialling the remaining digits of the called line, contacts 431 of repeater TRC repeats these digits to operate the second selector S2 to seize a third selector S3, the third selector S3 is operated to seize a fourth selector S4, the fourth selector S4 is operated to seize a connector C, and the connector is operated to seize and ring the called subscriber.

When the called subscriber answers the connector C reverses battery back over the talking conductors of the operated selector switches to conductors 1001, 1002 and 1005, 1006 of metering circuit MC, Fig. 10. In Fig. 10 rectifier R10, due to this reversal of current, causes current flow through the upper winding of answer relay 1060 to cause its operation. Relay 1060 at contacts 1062 locks through its lower winding to grounded conductor 1003 and at contacts 1063 opens a circuit to relay 1030 which restores to prevent the operation of relays 1010 and 1020 which are utilized to forceably release a partially established connection over conditions to be subsequently described. Reversal of current of conductors 1005 and 1006 is transmitted over contacts 511 and 514 of repeater RC, trunk conductors 988 and 989 back to repeater TRC, Fig. 9, contacts 472 and 473 of repeater TRC, contacts 431 and through the left hand winding of answer relay 420 to operate answer relay 420. Relay 420 operates relay 410 to reverse battery back over conductors 984 and 985, wipers 904 and 905, contacts 992, 994, 961 and 963 through the winding of answer relay 970, contacts 921 and 922, over conductors 915 and 916 through the calling subscriber's loop. Rectifier R9 connected in bridge of the winding of answer relay 970 causes this reverse current to flow through the winding of answer relay to cause its operation. Answer relay 970 at contacts 971 completes a circuit from grounded conductor 917 for operating relay 950 and the latter relay at contacts 952 locks to grounded conductor 917. Relay 950 at contacts 951 shorts answer relay 970 to cause its release, at contacts 953 short circuits relay 940 to thereby cause relay 940 to release slowly, at contacts 954 completes the circuit for operating the calling subscriber's meter MC2, at contacts 955 and 957 prepares a circuit for operating the calling subscriber's meter if any additional charges are to be assessed, and at contacts 958 opens a circuit to relay 960 to prevent its operation. Before relay 940 is fully restored the calling subscriber's meter is operated over the following circuit: from positive pole of booster battery contacts 932, 954 and 941, conductor 918, wiper 112 and bank contact 108, contacts 104, winding of meter MC2, rectifier RC1 to ground. In this circuit the rectifier RC1 permits the current flow thereby short circuiting meter MC1 while the rectifier RC2 blocks current flow to cause the meter MC2 to operate. In case subscriber C1 was the calling subscriber, instead of subscriber C2, then relays 910 and 930 are not operated in which case negative pole of booster battery is connected by way of contacts 933, 954 and 941 to operate meter MC1.

Since only one unit charge is needed for calls from sub-office C to subscriber lines in its parent office 24 no further meter charges are assessed against the calling subscriber. From the foregoing description it will be seen that when the called party answers the connector reverses battery to operate answer relays 1060 and 420, then relay 410 reverses battery to operate answer relay 970 which in turn operates relay 950 to cause relay 940 to slowly release, and then during the release time of relay 940 the calling subscriber's meter is operated for one unit charge.

After conversation and in response to the calling subscriber hanging up his receiver line relay 430 of repeater TRC restores. Line relay 430 of repeater TRC at contacts 431 opens the loop circuit extending over conductors 988 and 989 to repeater RC, Fig. 10, conductors 1005, 1006 and 1001 and 1002 to incoming selector ISC and the remaining switches to cause the connector C and the operated switches to release and remove holding ground from conductors 1003 and 1007 in a well-known manner. When ground is disconnected from conductor 1003 relay 1060 restores. When ground is removed from conductor 1007 relay 520 of repeater RC (Fig. 10) restores to mark the repeater RC idle. In addition relay 430 of repeater RC causes relay 440 to restore and the latter relay at contacts 443 disconnects ground from conductor 986 to release relay 990. Relay 990 at contacts 997 disconnects ground from conductor 917 to release relay 850 and to restore the finder FC and line circuit LC to normal and opens the locking circuits of relays 950 and 960 to restore these relays. All apparatus is now fully restored.

*Outgoing calls from sub-office C to office 29*

Calls from subscriber lines in sub-office C to other sub-offices in section 2 are somewhat similar to that previously described for calls to parent office 24 except that a second selector, such as selector S2 (Fig. 1) is operated to a different level to seize a repeater such as repeater R3 shown in Figs. 1 and 11 and an incoming third selector, such as IS3, in the called office.

In response to a line in sub-office C initiating a call an idle first selector ISC is seized by the calling line by way of finder FC, outgoing secondary OSC, repeaters TRC and RC as previously described. In extending a call to office 29 a calling subscriber dials the office code digits 2 and 9 which are repeated by the pulsing contacts 431 of repeater TRC to cause the incoming selector ISC to seize a second selector S2 and the second selector S2 is operated to seize an idle repeater R3 in the well-known manner. In a manner similar to that previously described line relay 1170 of repeater R3 is operated by way of pulsing contacts 431 and contacts 472 and 473 of repeater TRC, conductors 988 and 989, contacts 511 and 514 of repeater RC, conductors 1005, 1006 and 1001 and 1002 of metering circuit MC, talking conductors of selectors ISC and S2, conductors 1115 and 1116, contacts 1151 and 1153 of repeater R3, Fig. 11, left hand winding of repeating coil RS11, and both windings of line relay 1170 to battery and ground.

Relay 1170 at pulsing contacts 1171 closes a loop circuit over trunk conductors 1105 and 1106 for the line relay of the incoming third selector in office 29 and contacts 1172 operates relay 1180. Relay 1180 at contacts 1181 operates relay 1120 and polarizes answer relay 1160, at contacts 1184 marks this repeater busy by disconnecting battery potential from conductor 1117, and at contacts 1183 grounds conductor 1117 to hold selectors S2 and ISC operated.

The calling subscriber now dials the remaining digits of the called number and relay 430 at contacts 431 of repeater TRC repeats these digits to line relay 1170 which in turn at pulsing contacts 1171 repeats these digits to operate the selector and connector switches in office 29 to extend the call to the called subscriber line. When the called party answers the connector reverses battery back through the third and fourth selectors and over conductors 1105 and 1106 to operate answer relay 1160. Relay 1160 operates relay 1150 which reverses battery back over the conductors 1115 and 1116, through selectors S2 and ISC, conductors 1001, 1002 and 1005, 1006 to operate answer relays 1060 and 420. Relay 420 of repeater TRC operates relay 410 which reverses battery to operate answer relay 970 as previously described. Answer relay 970 operates relay 950 to cause relay 940 to slowly restore to transmit a pulse of booster battery over metering conductor 918 to operate the caling subscriber's meter for one unit charge as previousy described.

Relay 1150, in addition to reversing battery to make the first unit meter charge, also prepares circuits at contacts 1155 for making an additional charge. When the one second timer 1169 grounds pulse lead 1 at contacts 1162 relay 1140 is operated and locks itself to ground at contacts 1181. When the one second timer grounds pulse lead 2 at contacts 1163, one second after ground pulse lead 1, relay 1130 is operated over contacts 1163, 1143 and 1134. Relay 1130 opens the circuit to slow-to-release relay 1120 at contacts 1133, locks at contacts 1134, and at contacts 1131 and 1132 connects the high frequency signalling current source to line conductors 1115 and 1116 by way of contacts 1121 and 1122 during the release time of slow-to-release relay 1120 to transmit a pulse of high frequency signalling current over the talking conductors back to sub-office C. This pulse is transmitted over the line conductors of selector S2 and selector ISC, conductors 1001, 1002 and 1005, 1006, to repeater RC, trunk conductors 988 and 989 to repeater TRC (Fig. 9), contacts 472, 473 and 431, repeating coil RC4 and contacts 412 and 414, conductors 984 and 985, wipers 904 and 905, contacts 992 and 994, through the right hand winding of induction coil 9IC and condenser C92. This pulse of high frequency signalling current is induced into the left hand winding of induction coil 9IC and transmitted through the transistor network comprising tuned filter TF9 and resistor V9 to transistor T9 to cause the transistor T9 to operate relay 980. Relay 980 at contacts 981 connects booster battery potential by way of contacts 932, 955, 981, 957 and 942 to meter conductor 918 to operate the calling subscriber's meter MC2 for a second unit charge.

Relay 1120 restores shortly after operation of relay 1130 to terminate the pulse of high frequency signalling current and at contacts 1123 connects relay 1110 to contacts 1104 of the zone timer 1103. Relay 1110 is now operated over contacts 1123 and 1136 each time one of the knobs 1107—1109 operates and closes contacts 1104 to transmit a pulse of high frequency signalling current by way of contacts 1111 and 1112, and 1131 and 1132 to line conductors 1115 and 1116 to cause transistor T9 to operate relay 980 which in turn operates the calling subscriber meter MC2 to assess a zone charge at predetermined time intervals during conversation.

From the foregoing description it will be seen that when the called party answers and reverses battery, relays 970 and 950 operate to operate the meter for a first unit charge, that shortly thereafter relays 1120 and 1130 send a pulse of high frequency signalling current to operate relay 980 through transistor T9 to operate the meter for a second unit charge, and finally that relay 1110 is operated by the zone timer 1103 to periodically send pulses of high frequency signalling current to periodically operate relay 980 to make zone unit charges at predetermined timed intervals corresponding to the zone of the called subscriber. After conversation the apparatus is released in the same manner as previously described.

Outgoing calls from sub-office C to office 92

Outgoing calls from subscribers' lines in sub-office C to other offices in sections other than section 2 are similar to that described for calls from sub-office D to office 92 except that the incoming first selector ISC is operated to seize a repeater such as repeater R2, Fig. 12, in response to dialling the first digit corresponding to the called section.

The seized repeater R2, Fig. 12, is operated in the same manner as previously described for a call from a subscriber in sub-office 92 to repeat the dialled digits to extend the connection to the called line and to operate minor switch MS in accordance with the second dialled digit to prepare for the zone and elapsed time charges. When the called subscriber answers the connector reverses battery in the well-known manner to operate answer relay 1260 which in turn operates reversing relay 1250 to reverse battery back to the calling office through metering circuit MC and repeater TRC to operate answer relays 1060 and 420. Answer relay 420 in repeater TRC operates reversing relay 410 to reverse battery over conductors 984 and 985 to operate answer relay 970. In the same manner as previously described answer relay 970 operates relay 950 and relay 950 shorts relay 940 to cause a momentary pulse of booster battery to operate the calling subscriber meter for the first unit charge.

In the same manner as previously described the timer 1269 is effective shortly after the operation of reversing relay 1250 to operate relays 1240 and 1230 and restore relay 1220 to transmit a pulse of high frequency signalling current over the talking conductors to transistor T9 to operate relay 980 which at contacts 981 connects booster battery to metering conductor 918 to operate the calling subscriber's meter for a second unit charge. When relay 1220 restores to terminate the pulse of high frequency signalling current for operating the calling subscriber's meter for the second unit charge, relay 1210 is connected to the minor switch wiper 1245 of the LD timer 1299. In the same manner as previously described relay 1210 is periodically operated over the selected bank contact of minor switch MS and selected cam contacts of the LD timer 1299 to periodically transmit pulses of high frequency signalling current over the talking conductors to cause transistor T9 to periodically operate relay 980 and the calling subscriber's meter at predetermined timed intervals during conversation to assess zone charges in accordance with the zone of the called subscriber.

In calls from subscriber lines in sub-office C to other offices in sections other than section 2 which require two offices in the called section to complete the calls, two repeaters R2 and R3, are required. As previously described for calls from sub-office D both repeaters R2 and R3 transmit high frequency signalling current metering pulses, and the metering pulses transmitted by the second repeater R3 is blocked by the special repeating coil RC12 in repeater R2.

Outgoing calls from sub-office C to sub-office D

Calls from subscriber lines in sub-office C to called lines in sub-office D are extended by way of finder FC, outgoing repeater ORC, outgoing secondary line switch OSC and repeater TRC to the parent office incoming first selector ISC, by way of selectors S2, S3 and S4 and repeater RD to repeater TRD in sub-office D, and thence by way of the incoming connector ICD to the called line in a manner similar to that previously described. In this connection the selector S3 has access to conductors 705, 706 and 707 terminating in selector S4 (Fig. 7) over its second level and the selector S4 has access to conductors 501, 502 and 503 extending to repeater RD, Fig. 5, over its first level to operate line relay 560 of repeater RD in a manner apparent from the foregoing description. Line relay 560 of repeater RD operates relay 550 and the latter relay operates relay 510 to extend the call over trunk conductors 401 and 402 to repeater TRD, Fig. 4, in sub-office D. Repeater TRD extends the call by way of conductors 305 and 306 to the incoming connector ICD (Fig. 3) to operate the connector and release relay (not shown) and ground conductor 307 in the well-known manner. Ground on conductor 307 is extended by way of contacts 444 to conductor 407 to mark repeater TRD busy in the banks of the line switch OSD.

The incoming connector ICD is operated by the last two digits to the called line terminals and rings the called line in the usual manner. When the called party answers the connector reverses battery over conductors 305 and 306 and trunk conductors 401 and 402 to operate answer relay 570 of repeater RD. Relay 570 operates relay 580 to in turn reverse battery over conductors 501 and 502, 705 and 706, 705' and 706' and 1001 and 1002 to operate answer relay 1060 of metering circuit MC, and over conductors 1005 and 1006, 988 and 989 to repeater TRC, Fig. 9, to operate answer relay 420 of repeater TRC. Relay 420 operates relay 410 to reverse battery back over conductors 984 and 985 to operate answer relay 970. Answer relay 970 operates relay 950 and relay 950 causes relay 940 to restore and send a momentary pulse of booster battery over the meter conductor 918 to operate the subscriber's meter as previously described. Only one unit charge is made for calls between lines in sub-office C and sub-office D.

Referring now to Fig. 7, and when selector S4 was operated to its first level in the above described connection, it will be seen that the vertical wiper VW is operated to engage the first vertical bank contact 771 to complete a series circuit for operating common relay 600 associated with the metering circuit MD and relay 760 of selector S4. Assuming for the time being that selector S3 shown in detail in Fig. 7 is selector S4 then the circuit for operating relays 600 and 760 may be traced from ground winding of common relay 600, common conductor 605, first level vertical bank contact 771, vertical wiper VW, contacts 791, 729, 746 and 753 and the winding of relay 760 to battery. Relay 600 at contacts 601 prepares a circuit for relay 650. The circuit to relay 650 is completed by relay 640 only in case relays 600 and 640 are simultaneously operated. The relay 640 is operated only during the interval that high frequency signalling current is applied to conductor 607 and since in this call high frequency signalling current is not connected to conductor 607 the relays 640 and 650 are not operated. Relay 760 of selector S4 connects high frequency signalling current to control conductor 707 by way of the secondary winding of induction coil 7IC, contacts 763 and 741, and then to control wiper 703' of selector S3, contacts 725, control conductor 707', over the control conductors of selectors S2 and ISC to conductor 1003 of metering circuit MC, Fig. 10. This high frequency signalling current is transmitted through the transistor network comprising tuned filter TF10 and resistor V10 to cause transistor T10 to operate relay 1040. Relay 1040 prepares a circuit for operating relay 1050 but since the common relay 1070 is not operated at this time relay 1050 is not operated. The operation of relay 1040 is without result at this time.

In selector S4 it will be remembered that relay 760 is operated at the same time the selector is started in its rotary movement to find an idle repeater RD by the restoration of relay 750. As soon as selector S4 finds an idle repeater RD relays 710 and 720 operate and the latter relay at contacts 729 opens the circuit to relay 760. Relay 760 is therefore operated only for a short interval of time and consequently the source of high frequency signalling current is only momentarily connected to control conductor 707 to momentarily operate relay 1040. Also in case selector S4 fails to find an idle repeater RD, the selector steps to its eleventh rotary position to open cam contacts 791 and the circuit to relay 760 to prevent prolonged connection of high frequency signalling current in control conductor 707. The connection of a high frequency signalling current to the control conductor is utilized only when a calling line in a sub-office is calling a called line in the same sub-office to cause the parent office switches to release and the call to be switched over locally in the sub-office.

Calls from subscriber lines in sub-office C to subscriber lines in sub-office A and B are extended by way of finder FC, trunk repeater ORC, outgoing secondary line switch OSC, repeaters TRC and RC, metering circuit MC, selectors ISC, S2 and S3, repeaters RB and TRB, incoming selector ISB in sub-office B, and by way of connectors CB1 and CB2 to called lines in sub-office B, or by way of bi-level repeater BRB to bi-level repeater BRA in sub-office A and connector ICA to subscriber lines in sub-office A. The operation of the apparatus included in these connections operate in a manner apparent from the foregoing description for calls from sub-office D to sub-offices A and B.

*Local calls within sub-office C*

A brief description will now be given of a call from a calling subscriber line in sub-office C to another called subscriber line in the same sub-office. In a connection of this type, the incoming first selector ISC in a parent office is seized on initiation of a call and on response to the calling subscriber dialling the first three digits of the called number, the first selector ISC, second selector S2 and third selector S3 are operated as previously described to select an idle repeater RC, Fig. 10, over conductors 1091, 1092 and 1093 terminating in the third level bank contacts of selector S3, Fig. 7. In the selector S3 the vertical wiper VW' engages its third level bank contacts 775 to complete a circuit for operating relay 760 in series with relay 1070 which is common to all metering circuits MC. This circuit may be traced from ground winding of common relay 1070, conductor 605', vertical bank contact 775, vertical wiper VW', contacts 791, 729, 746 and 753 to relay 760 and battery. In selector S3 the operation of relay 760 momentarily connects high frequency signalling current to conductor 707' as previously described, and this high frequency signalling current is transmitted back over the control conductors of selectors S2 and ISC to control conductor 1003 of metering circuit MC of Fig. 10.

In metering circuit MC this high frequency signalling current is transmitted through the transistor network TF10 and V10 to transistor T10 which causes relay 1040 to operate. The operation of common relay 1070 at contacts 1071 completes a circuit for operating relay 1050 by way of contacts 1081 and 1041, relay 1050 at contacts 1053 completes a locking circuit through its upper winding by way of contacts 1053 to grounded conductor 1003, at contacts 1054 completes a circuit for operating a common relay 1080, and at contacts 1051 and 1052 connects the source of high frequency signalling current to line conductors 1006 and 1005. Common relay 1080 at contacts 1081 disconnects ground at contacts 1071 from the common conductor 1072 to prevent the operation of other relays similar to relay 1050 in other metering circuits MC at this time.

The high frequency signalling current connected to line conductors 1005 and 1006 by relay 1050 is transmitted back through contacts 511 and 514 of repeater RC, trunk conductors 988 and 989 to repeater TRC in sub-office C, contacts 472 and 473, repeating coil RC4 of repeater TRC to conductors 984 and 985, wipers 904 and 905 of switch OSC, contacts 992 and 994, condenser C92 and primary winding of induction coil 9IC. High frequency signalling current is induced into the secondary winding of induction coil 9IC and through the transistor network comprising the tuned filter TF9 and resistance V9 to transistor T9 to operate relay 980. Relay 980 at contacts 981 completes a circuit for operating switching relay 960 since at this time the answer relay 970 and relay 950 are not operated. Relay 960 is operated from ground contacts 997, 956, 981 and 958. Relay 960 at contacts 965 locks itself to ground at contacts 997, at contacts 961 and 963 opens the calling line loop to the line relay 430 of repeater TRC, and at contacts 962 and 964 connects the calling subscriber loop over conductors 801 and 802, contacts 821 and 823 to line relay 830 of the local selector LSC in sub-office C, Fig. 8. Line relay 830 is operated over the calling subscriber's loop and at contacts 831 operates release relay 840. Relay 840 at contacts 841 grounds conductor 803 to in turn ground conductor 917 to hold the finder FC and relays 930, 940 and 960 operated before relay 990 restores and disconnects ground at contacts 997 from conductor 917. Contacts 841 also maintains relay 850 operated, it being remembered that relay 850 was operated when relay 900 grounded conductor 917 on the initiation of a call. The purpose of preoperating relay 850 is to partially prepare the local selector LSC for operation so that it can be quickly conditioned to respond to impulse after the local switchover.

When line relay 430 of repeater TRC restores in response to the operation of switching relay 960, contacts 431 of repeater TRC opens the repeating loop extending over trunk conductors 988 and 989 to the parent office to open the circuit to line relay 730 of selector S3 if such selector has not yet been switched through to an idle repeater RC, or opens the circuit to the line relay over the seized repeater in case selector S3 has switched through and seized such a repeater. In either case the opening of the repeating loop at contacts 431 by line relay 430 of repeater TRC causes all of the apparatus including the selectors S3, S2 and ISC in the parent office to restore to normal. From the foregoing description it will be seen that when a subscriber in sub-office C calls another subscriber line terminating in the same sub-office C, relay 760 of selector S3 in the parent office transmits high frequency signalling current back over the control conductors of the operated selector switches to metering circuit MC to operate relay 1040 through transistor T10, that relay 1040 then transmits high frequency signalling current over the talking conductors to the repeater ORC in sub-office C to operate relay 980 through transistor T9, and that relay 980 operates switching relay 960 to switch the calling line to the local selector LSC and release all of the apparatus in the parent office.

The local selector LSC, Fig. 8, after operation of relays 830, 840 and 850 is ready to receive the fourth dialled digit of the called number. Line relay 830 follows the impulses of the dialled fourth digit to operate the vertical magnet VM to step the wipers vertically to the level corresponding to the digit dialled. The circuit for operating the vertical magnet VM is as follows: ground contacts 827, 832, 842 and 851 and the winding of vertical magnet VM to battery. A branch of this circuit maintains slow-to-release relay 850 operated during the vertical movement over vertical off-normal contacts 862 which closes on the first vertical step. Relay 850 restores shortly after the vertical movement to complete a self-interrupting circuit to operate rotary magnet RM. The rotary magnet rotates the selector wipers over the selected level in search of an idle connector CC. The circuit for operating the rotary magnet RM may be traced as follows: ground contacts 845, 812, 828, vertical off-normal contacts 864, contacts 852, 871 and 878 and winding of rotary magnet RM to battery. In case the connector terminating in the first bank contacts is busy, then the test bank contact engaged by test wiper 883 will not have idle battery potential thereon with the result that test relay 810 is not operated. The rotary magnet continues to operate self-interrupted until test wiper 883 engages a bank contact terminating an idle connector CC having idle battery potential thereon at which time test wiper 883 completes a circuit for operating test relay 810 from ground at contacts 844. Relay 810 at contacts 812 opens the rotary magnet to stop the rotary movement, and at contacts 811 operates switching relay 820 at contacts 826 locks to grounded conductor 803, at contacts 826 shorts relay 810, at contacts 827 opens the circuit to slow-to-release relay 840 and to release magnet RLS, and at contacts 828 opens another point in the circuit for the rotary magnet RM.

At contacts 821 and 823 relay 820 opens the circuit to line relay 830 which restores, and at contacts 822 and 824 connects the calling subscriber's loop over wipers 881 and 882 and conductors 145 and 146 to the line relay (not shown) of connector CC. The line and release relay of connector CC operate and the latter relay grounds conductor 147 to hold relay 820 of selector LSC operated by way of wiper 883 and contacts 825 and 826 before slow-to-release relay 840 restores. This same ground is extended by way of wiper 883 and contacts 825 to ground conductors 803 and 917 to hold finder FC and relays 930, 940 and 960 operated.

In response to the calling subscriber dialling the last two digits of the called number the connector CC is operated in the well-known manner to extend the connection to the called subscriber line and to ring the called subscriber. When the called subscriber answers, connector CC reverses battery back over conductors 145 and 146, wipers 881 and 882, contacts 822 and 824, conductors 801 and 802, contacts 962 and 964, winding of answer relay 970, contacts 921 and 922, conductors 915 and 916, finder wipers 109 and 111, bank contacts 105 and 107, subscriber line conductors 101 and 102 and through the calling subscriber substation. The rectifier R9 connected in shunt of the winding of answer relay 970 causes this reverse current to flow through the winding of answer relay 970 to cause its operation. Relay 970 at contacts 971 operates relay 950 from grounded conductor 917. Relay 950 at contacts 952 locks to grounded conductor 917, at contacts 953 shorts relay 940, at contacts 951 shorts answer relay 970, and at contacts 954 completes a circuit for operating the calling subscriber's meter before relay 940 is fully restored. This circuit may be traced as follows: from positive booster battery contacts 932, 954 and 941, meter conductor 918, finder wiper 112 and bank contact 108, contacts 104, winding of meter MC2, rectifier RC1 to ground. Relay 940 restores shortly after it is short circuited by relay 950 and at contacts 941 opens the metering circuit.

After conversation and in response to the calling subscriber replacing his receiver the line and release relays of connector CC restore and the latter relay disconnects ground from conductor 147 thereby disconnecting holding ground from relay 820, conductor 803 and 917 and relays 930, 950 and 960 to cause these relays and the finder FC to restore to normal. When relay 820 restores, the release magnet RLS is operated from ground by way of contacts 827, 832, 843 and vertical off-normal contacts 863. The release magnet RLS causes the selector LSC to restore its wipers to normal and opens the circuit to the release magnet at vertical off-normal contacts 863 when the wipers are fully restored. The connector CC restores in a similar manner and all of the apparatus is now fully restored.

*Outgoing calls from sub-offices A and B*

Outgoing calls originating in sub-offices A and B are extended to other offices and other sub-offices over apparatus similar to that described for outgoing calls from sub-office C and therefore need no further description. A call from a calling subscriber in sub-office B to a called subscriber in sub-office B is completed in the same manner as previously described for a calling subscriber in sub-office C calling a called subscriber in sub-office C. For example, in the same manner as previously described, the selector S3 is operated to the fourth level to operate the common relay 1070 of metering circuit MB and also transmits a pulse of high frequency current back over the selector control conductors to the transistor T10 of metering circuit MB to operate relays 1040 and 1050. The latter relay then connects high frequency signalling current back over the talking conductors to sub-office B to the transistor T9 in repeater ORB to operate relays 980 and 960. Relay 960 in repeater ORB operates to switch the calling line to the local selector LSB, which is similar to local selector LSC, Fig. 8, and to disconnect the calling line from the parent office to cause a release of the apparatus initially used in extending the connection through the parent office. The local switches in sub-office B are then operated in the well-known manner to complete the call to the called line and to meter the call when the called party answers by reversing battery to operate answer relay 970 in repeater ORB. Relay 970 in repeater ORB causes the operation of relay 950 and the restoration of relay 940 to transmit a pulse of booster battery over the meter conductor to operate the calling subscriber's meter in the same manner as previously described.

A call from a calling subscriber line in sub-office A to another subscriber in the same sub-office A is completed in a manner similar to that just described for a subscriber in sub-office B calling another subscriber in the same sub-office B except that the metering circuit MA and repeater ORA perform the same functions to cause the calling line to be switched over locally to the local selector LSA when the selector S3 momentarily transmits high frequency signalling current to metering circuit MA and the metering circuit MA in response thereto transmits high frequency signalling current back to repeater ORA to cause such switchover.

When a calling subscriber in sub-office B calls a subscriber in sub-office A the operation of the apparatus is the same as that described for a call to another subscriber line in sub-office B, except that the selector LSB in sub-office B, after being connected directly to the calling line, is operated to extend the connection by way of bi-level repeater BRB, over trunk conductors 1401 and 1402 to bi-level repeater BRA in sub-office A, and then to the incoming connector ICA which is operated to the called line in sub-office A. In this connection, the selector LSB, the repeaters BRB and BRA, and the incoming connector ICA, are operated in the same manner as described for a call from sub-office D to a called line in sub-office A.

When a calling subscriber in sub-office A calls a subscriber in sub-office B the operation of the apparatus is the same as that described for a call to another subscriber line in sub-office A except that the local selector LSA in sub-office A, after being directly connected to the calling line, is operated to extend the connection by way of bi-level repeater BRA, trunk conductors 1401 and 1402 to the bi-level repeater BRB in sub-office B, and then to the incoming connector ICB which is operated to the called line in sub-office B. In this connection the local selector LSA, the repeaters BRA and BRB, and the incoming connector ICB are operated in the same manner as described for a call from sub-office D to a called line in sub-office B.

*Outgoing calls from parent office subscriber lines*

Figure 13:
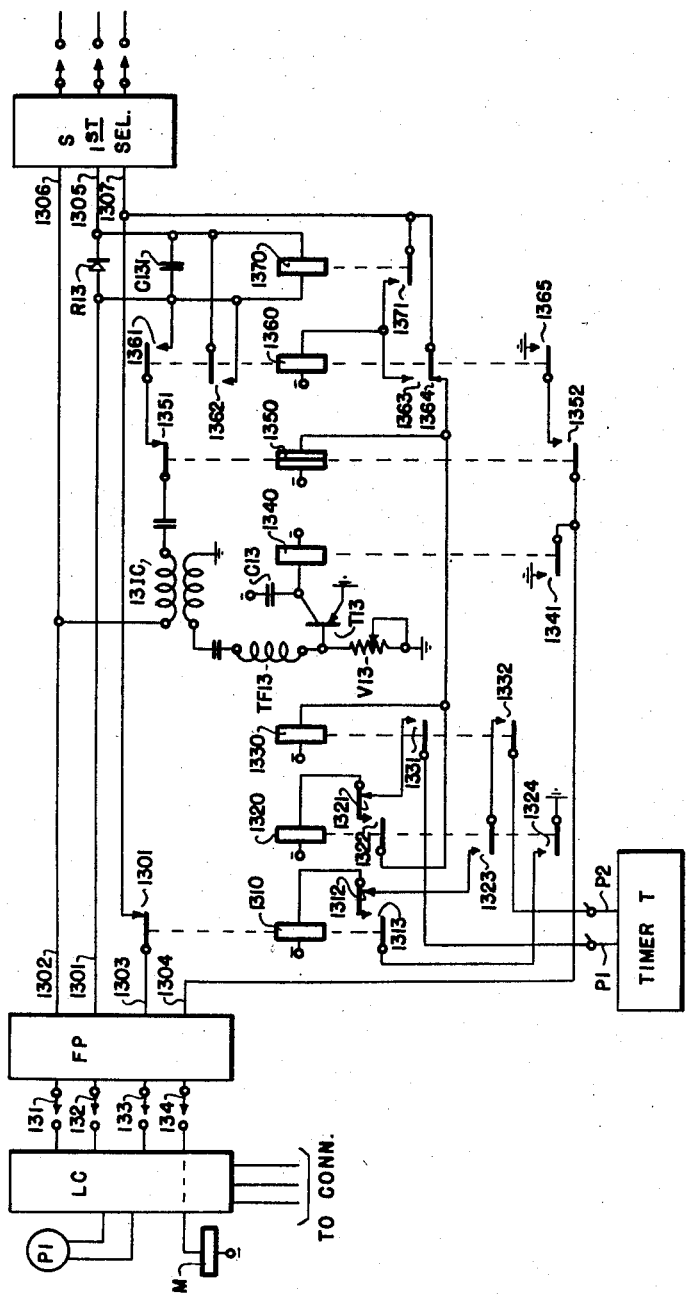
Fig. 13 shows a calling subscriber line and its individual line circuit, a finder FP, a metering circuit MP in detail, and a first selector S in the parent office.

In Fig. 1 it will be seen that calls between parent office subscriber lines in office 24 are completed from calling line P1 and its individual line circuit LC, finder FP, metering circuit MP, first selector S, second selector S2, third selector S3, fourth selector S4, connector C and through the line circuit of the called line to station P2. Referring now to Fig. 13 it will be seen that the metering circuit MP is slightly different than the metering circuits MA, MB, MC and MD for controlling the calling subscriber's meter. When the parent office subscriber P1 initiates a call the finder FP is operated in the well-known manner to connect the calling line over wipers 131, 132, 133 and 134 and conductors 1301, 1302, 1303 and 1304 to metering circuit MP. In metering circuit MP the calling subscriber loop is further extended over conductors 1301 and 1302 and rectifier R13 to conductors 1305 and 1306 to the line relay (not shown) in first selector S. The line relay in selector S operates the release relay (not shown) and the latter relay in the well-known manner grounds control conductor 1307 to hold the finder FP operated.

Rectifier R13 is poled in a direction to short circuit the winding of answer relay 1370 until current is reversed over conductors 1305 and 1306. When conductor 1307 is grounded by selector S relays 1350 and 1330 are operated over contacts 1364. Relay 1330 prepares circuits for forceably releasing an extended connection in case the call is not answered within a predetermined time. Relay 1350 at contacts 1351 disables the primary winding of induction coil 13IC and at contacts 1352 prepares the metering circuit.

The calling subscriber is now operatively connected to first selector S and after receipt of dial tone dials the digits of the called subscriber number. Selectors S, S2, S3 and S4 and connector C are operated to the well known manner in response to the dialled digits to extend the call to the called line and to ring the calling subscriber. When the called subscriber answers connector C reverses battery back over the talking conductors of the operated selectors and over conductors 1305 and 1306 to the calling subscriber line. When reverse battery is connected to conductors 1305 and 1306 rectifier R13 forces this reverse current flow through the winding of answer relay 1370 to cause relay 1370 to operate. At contacts 1371 relay 1370 completes a circuit from ground conductor 1307 for operating relay 1360. Relay 1360 at contacts 1363 locks to grounded conductor 1307, at contacts 1361 prepares a circuit for the primary winding of induction coil 13IC, at contacts 1362 shorts answer relay 1370 to cause it to restore, at contacts 1364 opens the circuit to slow-to-release relay 1350 and relay 1330, and at contacts 1365 completes a circuit for operating the calling subscriber's meter M. The circuit for operating meter M is as follows: ground contacts 1365 and 1352, meter conductor 1304, finder wiper 134 and through the line circuit LC to meter M and battery. Relay 1330 restores in response to the operation of relay 1360 to prevent the forceable release of an established connection. Slow-to-release relay 1350 restores after an interval to complete the circuit to the primary winding of induction coil 13IC at contacts 1351, and at contacts 1352 opens the metering circuit. The calling subscriber is thereby charged one unit charge for calls to parent office subscriber lines terminating in parent office 24. After conversation and in response to the calling subscriber hanging up the selectors and connectors release in the well-known manner and the connector removes ground from conductors 1307 and 1303 to restore the finder FP and to restore relay 1360.

Calls from subscriber line P1 in parent office 24 to subscriber lines in parent office 29 or to other parent offices in section 2, are completed through the finder FP, metering circuit MP, selector S, second selector S2 to repeater R3 (Fig. 1) which is connected to an incoming selector IS3 in parent office 29. The operation of repeater R3, Fig. 11, and the completion of the call to the called line is the same as that previously described for a call from a calling line in sub-office D to the called line in parent office 29 or other parent offices in section 2.

Assuming now that repeater R3 of Fig. 11 is the repeater inclined in this connection, it will be remembered that line relay 1170, release relay 1180 and relay 1120 are operated and that answer relay 1160 has its right hand winding energized to condition such relay to respond to reverse current. When the called party answers and current is reversed over conductors 1105 and 1106 answer relay 1160 operates to cause the reversing relay 1150 to operate. Relay 1150 reverses battery back over conductors 1115 and 1116 and the talking conductors of selectors S2 and S to conductors 1305 and 1306 to operate answer relay 1370. Answer relay 1370 operates relay 1360 to operate the calling subscriber's meter M as previously described.

In repeater R3, Fig. 11, it will be remembered that the one second timer 1169 grounds pulse one lead to operate relay 1140 and that one second later 1130 is operated over pulse two lead by the timer 1169. The operation of relay 1130 at contacts 1131 and 1132 connects the source of high frequency signalling current to conductors 1115 and 1116 before the slow-to-release relay 1120 restores to disconnect such source. This momentary application of high frequency signally current to conductors 1115 and 1116 is transmitted back over the talking conductors of selectors S2 and S to conductors 1305 and 1306 of metering circuit MP, over contacts 1361 and 1351 and through the condenser and primary winding of induction coil 131C to induce a high frequency signalling current through tuned filter TF13 and resistor V13 to transistor T13. Transistor T13 amplifies this induced signal to operate relay 1340 which at contacts 1341 completes a circuit for operating the calling subscriber's meter M over conductor 1304 to assess a second unit charge.

Returning now to Fig. 11 and when relay 1120 restores to disconnect the high frequency signalling current source, a circuit is closed by relay 1120 at contacts 1123 and 1136 for operating relay 1110 under control of the zone timer 1103. Relay 1110 is operated by the zone timer 1103 in the same manner as previously described at predetermined timed intervals to transmit pulses of high frequency signalling current over conductors 1115 and 1116. In this connection these pulses of high frequency signalling current are sent over conductors 1305 and 1306 to cause the transistor T13 to operate relay 1340. Relay 1340 is accordingly operated to operate the calling subscriber's meter to assess additional charges in accordance with the zone the called line is in.

Outgoing calls from subscriber line P1 in parent office 24 to other offices in sections other than section 2 are extended by way of first selector S and a repeater such as repeater R2 shown in Fig. 12, which is connected to an incoming second selector IS2 in one of the offices in the called section. Assuming now that repeater R2 is the repeater included in a connection extending to an office outside of section 2, it will be remembered that relays 1270, 1280, 1220 and 1225 are operated and that wiper 1245 of minor switch MS is in engagement with a bank contact corresponding to the called office in the called section to select the proper cam contacts of the LD timer 1299 for assessing zone charges.

When the connection is extended to the called line and the calling party answers, current is reversed over conductors 1205 and 1206 to operate answer relay 1260. Relay 1260 operates relay 1250 to reverse current over conductors 1215 and 1216 which are connected to conductors 1305 and 1306 by way of selector S. Answer relay 1370 operates when current is reversed over conductors 1305 and 1306 to operate relay 1360. Relay 1360 locks and at contacts 1365 grounds meter lead 1304 to operate the calling subscriber's meter for a first unit charge. Relay 1350 restores shortly after the operation of relay 1360 to open the meter circuit and to prepare at contacts 1351 the circuit to the primary winding of induction coil 131C.

After relay 1250 operates, the one second timer 1269 in repeater R2 operates relay 1240 and one second later operates relay 1230 over pulse two lead. Relay 1230 at contacts 1231 and 1232 connects high frequency signalling current to line conductors 1215 and 1216 during the release time of slow-to-release relay 1220. The momentary application of high frequency signalling current to line conductors 1215 and 1216 is sent over the line conductors of selector S to conductors 1305 and 1306 and through the induction coil 131C and the transistor network to transistor T13. Transistor T13 operates relay 1340 which at contacts 1341 completes the circuit for operating the calling subscriber's meter for the second unit charge.

The release of relay 1220 connects relay 1210 to wiper 1245 of minor switch MS and relay 1210 is thereafter periodically operated at predetermined intervals by the cam contacts of the LD timer 1299 in accordance with the occupied position of wiper 1245. Each operation of relay 1210 at contacts 1211 and 1212 connects the source of high frequency signalling current to line conductors 1215 and 1216 and 1305 and 1306 to operate relay 1340 through transistor T13. Relay 1340 is therefore periodically operated to operate the calling subscriber's meter to assess the proper zone timed charges dependent upon the occupied position of minor switch wiper 1245 which selects the proper cam contacts of LD timer 1299 in accordance with the location of the called office in the called section.

Calls from subscribers' lines in parent office 24 to any subscriber line in any of its sub-offices A to D are completed to such called lines by way of finder FP, metering circuit MP, first selector S, second selector S2, by way of selector S3 to sub-offices A, B and C and by way of selectors S3 and S4 to sub-office D and through the respective sub-office apparatus to the called line in a manner apparent from the foregoing descriptions. When the called subscriber answers and reverses battery back to the metering circuit MP the answer relay 1370 is operated in a manner previously described to operate relay 1360 and restore relay 1350 to operate the calling subscriber's meter for one unit charge.

*Forcible release of delayed answering on extended connections*

Each of the metering circuits, such as MA, MB, MC, MD and MP, is connected to a common timer T which forcibly releases the extended connection in case the called party has not answered within a predetermined time. Metering circuits, such as MD, MC, MB and MA, used in establishing connections from the various sub-offices through the parent office also times permanents as well as extended connections and causes a local switch-over in the calling sub-office in order to release the engaged trunk extending from the sub-office to the parent office. Metering circuit MP in the parent office is slightly different in that it forcibly releases the finder switch and the apparatus included in the extended connection after which another finder automatically operates to connect the calling line through another metering circuit MP to another first selector S. This other selector S then transmits dial tone to the calling subscriber. During the time the extended connection to a called line is in ringing condition the calling subscribed hears the well-known ring-back tone but when this connection is released by the common timer T the ring-back tone is disconnected. When the calling subscriber hears the dial tone connected to the calling line by the said other selector S, in place of ring-back tone, he will therefore be advised by the substitution of dial tone for ring-back tone that the extended connection to the called line has been released and that he can then initiate another call.

In order to describe the forcible release of an extended connection it will first be assumed that metering circuit MD, Fig. 6, is included in an extended connection to a called line and that the called subscriber has not answered. In metering circuit MD it will be remembered that relays 670 and 630 are operated when first selector ISD grounds conductor 607. When timer T grounds pulse 1 lead relay 620 is operated over contacts 632 and 621. Relay 620 at contacts 622 completes a locking circuit for itself by way of contacts 685 to grounded conductor 607. If the called subscriber answers and operates relays 690 and 680 before timer T grounds pulse 2 lead then relays 620 and 630 are restored by the operation of relay 685 and the connection is not released until the calling subscriber hangs up. Assuming now that the called subscriber fails to answer, or relays 680 and 690 are not operated, then when timer T grounds pulse 2 lead, five minutes after grounding pulse 1 lead, relay 610 is operated over pulse 2 lead, contacts 633, 623 and 613. Relay 610 at contacts 614 completes a locking circuit for itself by way of contact 631 to grounded conductor 607, and at contacts 611 and 612 connects the source of high frequency signalling current to line conductors 505 and 506. This high frequency signalling current connected to conductors 505 and 506 is transmitted back to the calling sub-office D over trunk conductors 401 and 402 to cause the transistor T2 to operate relay 280 as previously described. Relay 280 causes switching relay 260 to operate and disconnect the calling line from the parent office trunk to cause the release of the line switch OSD, the repeater RD in sub-office D, and the release of the apparatus in the parent office 24 as previously described. In addition relay 260 switches the calling line over to the local connector LCD at contacts 262 and 264. In case the call had been extended to a called line and the connector switch was ringing the called line, the calling subscriber would hear ring-back tone until relay 260 operated and switched the call to the local connector LDC. When the subscriber no longer hears ring-back tone he will realize that the extended connection to the called line has been released and will accordingly replace his receiver.

In case of a permanent, that is, a faulty line due possibly to a short or heavy ground connection on the line conductors, causes the calling subscriber line to be placed in calling condition thereby causing the finder to operate and connect the permanent line to the first selector through the associated metering circuit in the same manner as if the calling subscriber had initiated a call. Relays 620 and 610 in metering circuit MD are operated by the timer T after a predetermined time to cause the release of the parent office apparatus and the local switch-over in sub-office D to incoming connector LCD as previously described thereby freeing the trunk connecting sub-office D to parent office 24.

The forcible release of an extended connection, or of a permanent, by metering circuits MC, MB and MA are quite similar to that described for metering circuit MD. For example, the relays 1010 and 1020 or metering circuits MA, MB and MC correspond to relays 610 and 620 in metering circuit MD and are operated in the same manner by the common timer T over pulse 1 and pulse 2 leads after a predetermined time. The relay 1010 connects high frequency signalling current to line conductors 1005 and 1006 and such signalling current is transmitted back over the trunk conductors to the calling sub-office to cause transistor T9 (Fig. 9) to operate relay 980. Relay 980 operates switching relay 960 in the same manner as previously described to disconnect the calling subscriber line from the parent office trunk and to connect the calling line to the local incoming selector in the calling sub-office. This switch-over by relay 960 causes the release of the apparatus in the calling sub-office and the apparatus in the parent office used in extending the connection to be restored to normal for common use. When the relay 960 switches the calling line over to the local selector, the subscriber no longer hears ring-back tone and is thereby advised that the extended connection has been released. Faulty sub-office lines, commonly called permanents, cause the metering circuits MA, MC and MC to operate in the same manner as just described to release the connection to the parent office and two switch over to the local sub-office selector.

Forcible release of an extended connection by metering circuit MP, Fig. 13, is slightly different than that described for the other metering circuits. For example, the timer T grounds pulse 1 lead to operate relay 1320 by way of contacts 1331 and 1332. Relay 1320 locks itself at contacts 1322 by way of contacts 1364 to grounded conductor 1307 and at contacts 1323 connects a relay 1310 to pulse 2 lead of timer T. Five minutes after grounding pulse 1 lead the timer T grounds pulse 2 lead to operate relay 1310 over contacts 1332, 1323 and 1312. Relay 1310 at contacts 1313 locks to ground at contacts 1324 and at contacts 1311 disconnects grounded conductor 1307 from conductor 1303. The removal of ground from conductor 1303 opens the holding circuit to finder FP to cause the finder to restore in the well-known manner. When the finder restores the calling subscriber's loop over conductors 1301 and 1302 is opened with the result that the operated switch train is released in the well-known manner thereby freeing the operated selectors and connector in the extended connection. When the finder FP restored it disconnected ring-back tone from the calling subscriber line. In case the calling subscriber does not immediately hang up it will be realized that the calling line is still in calling condition and therefore another finder switch is operated to connect the calling line through another first selector D. This other selector then transmits dial tone to the calling subscriber and when the calling subscriber realizes that dial tone has been substituted for ring-back tone he will understand that the extended connection to the called line has been released.

*Simultaneous local calls to sub-offices*

If two calls from subscriber lines in sub-office D to called lines in sub-office D are in progress at substantially the same time, the first of these calls to operate the fourth selector S4 to the first level will cause such a call to be switched over locally to the local connector LCD in the manner previously described. The second of these calls may operate a second selector like S4 an instant later to its first level to attempt to have such second call is extended through parent office apparatus to a second trunk line connected to sub-office D and to a local incoming connector in sub-office D to complete the said call.

A brief description of the operation of the selectors, such as selector S4, and metering circuits, such as MD will now be given to explain the reasons and manner in which the second of two simultaneous calls completes its connection to the second called line through the parent office switches without releasing such switches. For this purpose it will be assumed that the first call has seized selector S4 and operated it to its first level in the manner previously described. Relay 760 of this selector is operated in series with common relay 600 of the first repeater MD over conductor 605, vertical wiper VW, vertical bank contact 771 and contacts 791, 729, 746 and 753. Relay 760 at contacts 763 connects high frequency signalling current from induction coil 71C to control conductors 707 and 607 and causes transistor T6 to operate relay 640 as described. Common relay 600 operates in series with relay 760 and at contacts 641 grounds common conductor 608 by way of contacts 602 to prepare the circuit for operating relay 650. Relay 640 at contacts 641 operates relay 650 by way of contacts 601, 606 and 641. Relay 650 locks operated to control conductor 607 and at contacts 654 grounds common conductor 609 to operate common relay 603. Relay 603 at contacts 602 disconnects ground from common conductor 608 to prevent relays, such as relays 650 in other metering circuits MD, from being operated.

Relay 650, being locked operated to conductor 607, is maintained operated until ground is removed from conductor 607. Ground is removed from conductor 607 after the local switch-over in the calling sub-office when the operated switches of the switch train in the parent office is released in response to such local switch-over. The common relay 603 is therefore held operated for a short interval until relay 650 restores. During the interval common relay 603 is held operated, a second call from a second calling subscriber in sub-office D to a second called line in the same sub-office D may be in progress.

In this second call it will be assumed that a second selector S4 is operated to its first level shortly after common relay 603 is operated by the first call as described above. In this second selector S4 the relay 760 is also operated in series with common relay 600 and relay 760 of the second selector S4 connects high frequency signalling current to control conductor 707 of the second selector S4 and to the control conductor, corresponding to control conductor 607, of a second metering circuit MD included in this second call. In this second metering circuit MD relay 640 is operated through transistor T6 in response to the application of high frequency signalling current to conductor 607 of the second metering circuit MD. Relay 640 of the second metering circuit closes its contacts 641, but since common relay 603 is held operated by relay 650 of the first metering circuit no circuit is completed for the relay 650 of the second metering circuit because contacts 602 are maintained open by relay 603.

In selector S4 of the second call it will be remembered that at the same time relay 760 is operated to transmit signalling current the rotary magnet RM is operated to cause this selector to hunt for an idle repeater RD. When this selector finds an idle repeater RD relays 710 and 720 operate and the latter relay at contacts 729 opens the circuit to relay 760. Relay 760 restores and disconnects the signalling current from conductors 707 and 607. In the second metering circuit the disconnection of signalling current from conductor 607 causes relay 640 to restore to open the circuit to relay 650 at contacts 641. In case relay 640 in the second metering circuit restores before the common relay 603 restores then relay 650 of the second metering circuit is not operated. In this case no signalling current is transmitted back to sub-office D with the result that the calling line is not switched over locally to the incoming connector LCD as is normally done. Instead this second call is further extended through the operated second selector S4, through a second repeater RD and over a second trunk to a second repeater TRD in sub-office D to an incoming connector ICD. The remaining digits dialled by the second calling subscriber then operates connector ICD to complete the call to the second called line. In this case the second call includes two trunk lines connecting the sub-office D to its parent office 24 and the operated selector switches in the parent office. A connection of this type occurs very seldom since the two calls must be in progress at the same time and because common relay 603 is held operated by the first call for only a short duration or for a duration equivalent to the release time of the operated switches and of relay 650.

Fig. 16 shows a metering circuit MD' which is a modification of the metering circuit MD shown in Fig. 6. The modified metering circuit MD' of Fig. 16 is substantially the same as that shown in Fig. 6 except that no common relays, such as 600 and 603, are required, and that the tuned filter TF16 of the transistor network is tuned to pass only the high frequency signalling current of a given frequency. This modified metering circuit MD' is to be substituted for metering circuit MD and is to be used in extending calls from sub-office D. In this case the tuned filter TF16 is tuned to a given frequency which is individual to the sub-office D.

When a metering circuit such as MD' is used, it is also neecssary to substitute the fourth selector shown in Fig. 17 for the previously described selector of Fig. 7.

The selector of Fig. 17 is substantially identical to that shown in Fig. 7 except for the means of connecting high frequency signalling current to the control conductor 707. In the selector of Fig. 17 the vertical bank contacts accessible to the vertical wiper VW are connected to different sources of high frequency signalling current of different frequencies, and a different frequency of high frequency signalling current is individually assigned to the different sub-offices connected to the parent office. Therefore when the fourth selector Fig. 17 is substituted for seelctor S4 the first vertical bank contact will be connected to a source of high frequency signalling current having a given frequency individual to sub-office D.

A brief description will now be given of the operation of the metering circuit of Fig. 16 and the fourth selector of Fig. 17 when substituted, respectively, for metering circuit MD and selector S4. Since the circuit operations of these modifications are substantially the same as that previously described only sufficient description will now be given to describe the difference in operation. When the fourth selector of Fig. 17 is seized by a call originating from sub-office D by way of metering circuit MD', Fig. 16, the line relay 1730, release relay 1740 and slow-to-release relay 1750 are operated. Slow-to-release relay 1750 is preferably operated from direct ground over control lead 707 from the preceding selector. At contacts 1758 relay 1750 grounds conductor 707 by way of contacts 1741 to hold the preceding switches operated and grounds conductor 607 of metering circuit MD', Fig. 16, to maintain relays 1670 and 1630 operated; the relays 1670 and 1630 having been operated when the incoming first selector ISD was seized through metering circuit MD' on the initiation of a call from sub-office D. In response to the calling subscriber dialling the fourth digit 1, indicative of a local call back to the sub-office D, the vertical wiper is operated to engage the first level vertical bank contact to select the first source of high frequency signalling current F1 having a given frequency individually assigned to sub-office D.

Slow-to-release relay 1750 restores shortly after the vertical movement due to the termination of the pulses transmitted to both the vertical magnet VM and to relay 1750. At contacts 1758 relay 1750 disconnects direct ground from conductor 707 leaving ground through impedance I connected to conductor 707. Ground potential through impedance I is sufficient to hold the preceding switches and relays operated. At contacts 1759 and 1750 connects the high frequency signalling current source F1 by way of first level vertical bank contact, vertical wiper VW, condenser C17, contacts 1749, 1759 and 1741 to conductor 707'. This application of high frequency signalling current from source F1 is transmitted over control conductor 707', back over the control conductors of selectors S3, S2 and ISD to control conductor 607' of metering circuit MD', Fig. 16. Since the tuned filter TF16 is tuned to the frequency of source F1 the transistor T16 is responsive thereto to operate relay 1640. Relay 1640 at contacts 1641 operates relay 1650 from grounded conductor 607' and relay 1650 locks operated over contacts 1653. At contacts 1651 and 1642 relay 1650 connects the source of high frequency signalling current to line conductors 505' and 506'. This application of high frequency signalling current is then transmitted over the line conductors back to sub-office D to cause the apparatus in sub-office D to switch over locally and release the connection to the parent office as previously described. The local switch over in the calling sub-office therefore occurs only when the selector of Fig. 17 transmits the frequency which is individually assigned to the calling sub-office. That is, on a call from one sub-office to another sub-office, the frequency of the signalling current transmitted back to the metering circuit individual to the calling sub-office is the frequency of the called sub-office, which frequency is different than the frequency of the calling sub-office. In this case the tuned filter in the metering circuit individual to the calling sub-office will not pass the frequency of the signalling current assigned to the called sub-office with the result that the transistor T16 does not respond to this different signalling current and the relay 1640 is therefore not operated.

The features of the invention having been described and ascertained, what is considered to be new and desired to have protected by Letters Patent will be pointed out in the appended claims.

What is claimed is:

1. In a telephone system, a sub-office, a parent office, a trunk connecting said sub and parent offices, a calling line in said sub-office, a called line, means including said trunk for extending a connection between said calling and called lines, a source of signalling current in said parent office, means for connecting said source to said trunk during said call to transmit signalling current from said parent office over said trunk to said sub-office, a numerical switch in said sub-office, a first means in said sub-office responsive to the receipt of said signalling current and operative in case said call has not been answered by said called line before the receipt of said signalling current for disconnecting said calling line from said trunk and for connecting said calling line to said numerical switch, and a second means in said sub-office responsive to the receipt of said signalling current and operative in case said call has been answered by the called line before the receipt of said signalling current for assessing a charge against said calling line.

2. In a telephone system as claimed in claim 1 including a transistor in said sub-office controlled by said signalling current for controlling said first or said second means dependent upon the unanswered or answered condition of said call at the time said signalling current is received.

3. In a telephone system, a parent office, a sub-office, a calling line in said sub-office, a trunk line in said sub-office, seizing means responsive to a call on said calling line for seizing said trunk line, switching apparatus in said parent office, transmitting means in said parent office for transmitting signalling current, connecting means operated in response to the seizure of said trunk line for extending said calling line over said trunk line to said switching apparatus and to said transmitting means in said parent office, said switching apparatus in said parent office controlled by said calling line over said trunk line and said connecting means for extending said calling line to a called line in case said called line is in said parent office, an answer supervisory relay in said trunk line operated in response to the called subscriber answering a call extended from said calling line to a called line in said parent office, a source of charge assessing current in said trunk line connected to said calling line in response to the operation of said answer supervisory relay, said switching apparatus in said parent office controlled by said calling line over said trunk line and said connecting means for operating said tranmitting means to transmit signalling current back over said connecting means to said trunk line in case said called line is in said sub-office; switching means in said trunk line responsive to the receipt of said transmitted signalling current for splitting said trunk line to disconnect said calling line from said connecting means, said transmitting means and said switching apparatus; said disconnection causing said transmitting means to be disabled to thereby stop further transmission of said signalling current, a local line in said sub-office connected to said calling line in response to the splitting of said trunk line by the operation of said switching means, said answer supervisory relay being disconnected from the connection including said calling line and said local line to disable said answer supervisory relay in response to the splitting of said trunk line by the operation of said switching means, directive controlled means connected to said local line controlled by said calling line over said local line after operation of said switching means for extending said calling line to a called line in said sub-office, and other means in said directive controlled means for connecting said source of charge assessing current to said calling line in response to the called subscriber answering a call extended from said calling line to a called line in said sub-office.

4. In a telephone system, a first office, a second office, a third office, automatic switching apparatus in each said office, a first trunk line including a first repeater connecting said first and second offices, a second trunk line including a second repeater connecting said second and third offices, a calling line, a called line in said third office, means including said switching apparatus for establishing a connection over said trunk lines and said first and second repeaters in serial relation from said calling line to said called line, a first charge assessing means in said first repeater operated to register the called office of said called line during the establishment of said connection, means in said first repeater responsive to the called subscriber on said called line answering for transmitting high frequency charge assessing pulses of a frequency above the audible voice range back to said calling line in accordance with said registration on said first charge assessing means, a second charge assessing means in said second repeater for transmitting high frequency charge assessing pulses of a frequency above the audible voice range, means in said second repeater responsive to the called subscriber on said called line answering for causing said second charge assessing means to transmit said high frequency charge assessing pulses back to said first repeater, and a repeating coil in said first repeater blocking said transmission of said high frequency charge assessing pulses from said second charge assessing means so that only said charge assessing pulses from said first repeater are transmitted back to said calling line.

5. In a telephone system, a first office, a second office, a third office, automatic switching apparatus in each said office, a first trunk line including a first repeater connecting said first and second offices, a second trunk line including a second repeater connecting said second and third offices, a calling line, a called line in said third office, means including said switching apparatus for establishing a connection over said trunk lines and said first and second repeaters in serial relation from said calling line to said called line, a first charge assessing means in said first repeater operated to register the called office of said called line during the establishment of said connection, answer means in said first repeater responsive to the called subscriber on said called line answering for transmitting meter controlling pulses back to said calling line in accordance with said registration on said first charge assessing means, a second charge assessing means in said second repeater for transmitting meter controlling pulses, a second means in said second repeater also responsive to the called subscriber on said called line answering for causing said said second charge assessing means to transmit said meter controlling pulses back to said first repeater, and blocking means in said first repeater for blocking said transmission of said meter controlling pulses from said second repeater so that only said meter controlling pulses from said first repeater are transmitted to said calling line.

6. In a telephone system, a first office, a second office, a third office, automatic switching apparatus in each said office, a first trunk line including a first repeater connecting said first and second offices, a second trunk line including a second repeater connecting said second and third offices, a called line in said third office, a first calling line in said first office, a second calling line in said second office, means including said switching apparatus in said second and third offices for establishing a connection over said second trunk line and said second repeater from said second calling line to said called line, a second charge assessing means in said second repeater for transmitting high frequency charge assessing pulses of a frequency above the audible voice range, a second answer means in said second repeater responsive to the called subscriber on said called line answering for causing said second charge assessing means to transmit said high frequency charge assessing pulses back to said second calling line, means including said switching apparatus in said first, second and third offices for establishing a connection over said trunk lines and said first and second repeaters in serial relation from said first calling line to said called line, a first charge assessing means in said first repeater operated to register the called office of said called line during the establishment of said connection from said first calling line to said called line, a first answer means in said first repeater responsive to the called subscriber on said called line answering said last mentioned established connection for transmitting high frequency charge assessing pulses of a frequency above the audible voice range back to said first calling line in accordance with said registration on said first charge assessing means, said second answer means in said second repeater also responsive to the called subscriber on said called line answering for causing said second charge assessing means to transmit said high frequency charge assessing pulses back to said first repeater, and a repeating coil in said first repeater blocking said transmission of said high frequency charge assessing pulses from said second charge assessing means so that only said charge assessing pulses from said first repeater are transmitted to said first calling line.

7. In a telephone system, a called line, an automatic switch, a first motor magnet in said switch for operating said switch in a first direction, a second motor magnet for operating said switch in a second direction, a stepping circuit in said switch for controlling said motor magnets, means for seizing said switch, a transfer relay in said switch operated responsive to said seizure for connecting said first motor magnet to said stepping circuit, pulsing means for operating said first motor magnet over said stepping circuit to operate said switch in its first direction, means for restoring said relay after movement of said switch in said first direction, means for disconnecting said first motor magnet from said stepping circuit and for connecting said second motor magnet to said stepping circuit in response to the restoration of said relay, reoperation of said pulsing means operating said second magnet over said stepping circuit to operate said switch in its second direction to extend a connection to said called line, a source of ringing current in said switch, a switching relay in said switch operated in case said called line is idle to connect said source to said called line, means controlled by the operation of said switching relay for reoperating said transfer relay, a ring cut-off relay in said switch operated in response to the called subscriber on said called line answering to disconnect said source from said called line, a meter controlling circuit prepared by the reoperation of said transfer relay and completed in response to the operation of said ring cut-off relay, and means controlled by the operation of said ring cut-off relay for releasing said transfer relay to open said meter controlling circuit.

8. In a telephone system as claimed in claim 7 including contacts on said switching relay for opening said stepping circuit to both said first and second motor magnets in response to the operation of said switching relay.

9. In a telephone system, a calling line, a called line, means responsive to a call on said calling line for completing a connection from said calling line to said called line, a meter for said calling line, a first metering circuit for operating said meter, a first metering means responsive to the called party on said called line answering for momentarily completing said first metering circuit to operate said meter for a first unit charge, a second metering circuit for operating said meter, a second metering means also operated responsive to the called party answering and effective after said first unit charge for momentarily completing said second metering circuit to operate said meter for a second unit charge, and a third metering means effective after said second unit charge for periodically completing said second metering circuit to periodically operate said meter for additional unit charges during the time said connection is maintained.

10. In a telephone system as claimed in claim 9 wherein said first metering means is momentarily operated by a reversal of battery when the called party answers, and wherein said second metering means and said third metering means include means for transmitting high frequency pulses of a frequency above the audible voice range and a transistor operative responsive to said high frequency pulses to complete said second metering circuit and operate said meter.

11. In a telephone system, a calling line, a called line, means responsive to a call on said calling line for completing a connection from said calling line to said called line, a meter for said calling line, a first metering circuit for operating said meter, a first metering means responsive to the called party on said called line answering for momentarily completing said first metering circuit to operate said meter for a first unit charge, a second metering means also operated responsive to the called party answering and effective after said first unit charge for again momentarily completing said first metering circuit to operate said meter for a second unit charge, a third metering means effective after said second unit charge for periodically completing said first metering circuit to periodically operate said meter for additional unit charges during the time said connection is maintained, said first metering circuit and said first, second and third metering means being effective only in case said calling and called lines are in different offices, a second metering circuit for operating said meter, and a fourth metering means effective only in case said calling and called lines are in the same office in response to the called party on said called line answering for completing said second metering circuit to operate said meter for a single unit charge.

12. In a telephone system as claimed in claim 11 wherein said first, second and third metering means include means for transmitting high frequency pulses of a frequency above the audible voice range and a transistor operative responsive to said high frequency pulses to complete said first metering circuit.

13. In a telephone system, a calling line, a first and a second station on said line, a first meter individual to said first station, a second meter individual to said second station, a source of metering current having a first pole of one polarity and a second pole of an opposite polarity, a metering circuit including said first and second meters connected in serial relation for operating said meters, a called line, means for completing a connection from either station on said calling line to said called line in response to a call originated on said calling line, selecting means for selecting said first pole of said source during the establishment of said connection in case said first station originated said call or for selecting said second pole of said source during the establishment of said connection in case said second station originated said call, a first rectifier connected in said metering circuit in shunt of said first meter for blocking current flow from said first pole of said source to thereby direct the current flow from said first pole through said first meter to enable the operation of said first meter and for freely passing current flow from said second pole of said source to thereby by-pass said first meter to disable the operation of said first meter, a second rectifier connected in said metering circuit in shunt of said second meter for blocking current flow from said second pole of said source to thereby direct the current flow from said second pole through said second meter to enable the operation of said second meter and for freely passing current flow from said first pole of said source to thereby by-pass said second meter to disable the operation of said second meter, and metering means for connecting the selected pole of said source to said metering circuit in response to the called subscriber on said called line answering whereby said rectifiers cause the operation of only one of said meters dependent upon the polarity of the pole of said source connected to said metering circuit.

14. In a telephone system as claimed in claim 13 wherein said connection to said called line includes a zone determining means, means for operating said zone determining means during the establishment of said connection to said called line to register the zone of said called line, means controlled by said operated zone determining means in response to the called subscriber answering for transmitting periodic metering pulses back over said connection to said metering means, the periodicity of said metering pulses being dependent upon the zone registered by the operation of said zone determining means, and said metering means operating the selected meter in response to each metering impulse.

15. In a telephone system as claimed in claim 14 wherein said periodic metering pulses comprise high frequency signalling pulses of a frequency above the audible voice range and said metering means includes a transistor operated in response to the receipt of said high frequency metering pulses for operating said selected meter.

References Cited in the file of this patent

UNITED STATES PATENTS

| | | |
|---|---|---|
| 2,326,679 | Retallack | Aug. 10, 1943 |
| 2,603,712 | Ostline | July 15, 1952 |
| 2,697,133 | Lomax | Dec. 14, 1954 |
| 2,816,172 | Gatzert | Dec. 10, 1957 |